(12) United States Patent
Koob et al.

(10) Patent No.: US 6,821,530 B2
(45) Date of Patent: Nov. 23, 2004

(54) POLYMER COMPOSITE COMPOSITIONS

(75) Inventors: Thomas J. Koob, Temple Terrace, FL (US); Daniel J. Hernandez, Wesley Chapel, FL (US)

(73) Assignee: Shriners Hospitals for Children, Tampa, FL (US)

( * ) Notice: Subject to any disclaimer, the term of this patent is extended or adjusted under 35 U.S.C. 154(b) by 0 days.

(21) Appl. No.: 10/440,845

(22) Filed: May 19, 2003

(65) Prior Publication Data

US 2003/0204023 A1 Oct. 30, 2003

Related U.S. Application Data

(63) Continuation of application No. 09/872,367, filed on Jun. 1, 2001, now Pat. No. 6,565,960.
(60) Provisional application No. 60/208,543, filed on Jun. 1, 2000.

(51) Int. Cl.$^7$ .............................. A61K 9/54; B32B 3/26; C08G 63/48
(52) U.S. Cl. ........................ 424/458; 424/460; 424/469; 514/2; 514/782; 514/783; 514/801; 528/129; 528/137; 528/270; 525/54.1; 525/398; 525/480; 525/540; 524/841; 524/843; 524/17; 428/297.4; 428/304.4; 428/317.9; 428/318.4; 428/322.7; 428/492
(58) Field of Search ............................... 424/458, 460, 424/469; 514/2, 782, 783, 801; 528/129, 137, 270; 525/54.1, 398, 480, 540; 524/841, 843, 17; 428/297.4, 304.4, 317.9, 318.4, 322.7, 492

(56) References Cited

U.S. PATENT DOCUMENTS 4,496,397 A   1/1985  Waite ........................ 106/161
5,015,677 A   5/1991  Benedict et al. ............... 524/17

OTHER PUBLICATIONS

Dunn et al., "Optimization of extruded collagen . . . ", 1993, J. Biomedical Materials research, vol. 27; 1545–1552.
Gade et al., "The stabilization of fibrillar collagen matrices . . . ", 1991, J. Biomedical Materials research, vol. 25; 799–811.
Goldstein et al., "Development of a Reconstituted Collagen Tendon Prosthesis", Sep. 1989, J.Bone and Joint Surgery, vol. 71–A, No. 8; 1183–1191.
Kato et al., "Regeneration of Achilles Tendon with a Collagen Tendon Prosthesis", Apr. 1991, J.Bone and Joint Surgery, vol. 73–A, No. 4;561–574.
Kato et al., "Mechanical properties of collagen fibres: a comparison . . . ", Jan. 1989, Biomaterials, vol. 10; 38–42.
William C. McMaster, M.D., "Mechanical Properties and Early Clinical Experience . . . ", 1986, Bulletin of the Hospital for Joint Diseases Orthopaedic Institute, vol. 46, No. 2; 175–184.
Bruce K. Milthorpe, "Xenografts for tendon and ligament repair", 1994, Biomaterials, vol. 15, No. 10; 745–751.
Smith et al., "Evaluation of glutaraldehyde–treated tendon xenograft", Jan. 1986, J.Hand Surgery, vol. 11A, No. 1; 97–106.
Strausberg et al., "Development of a Microbial System for Production . . . ", 1989, American Cancer Society; 453–483.
Young et al., "Use of Mesenchymal Stem Cells in a . . . ", 1998, J.Orthopaedic Research, vol. 16, No. 4; 406–413.
Yu et al., "Role of L–3,4–Dihydroxyphenylalanine in Mussel Adhesive Proteins", 1999, J.Am.Chem.Soc., vol. 121, No. 24; 5825–5826.
Yu et al., "Synthetic Polypeptide Mimics of Marine Adhesives", 1998, Macromolecules, vol. 31, No. 15; 4739–4745.

*Primary Examiner*—Samuel A. Acquah
(74) *Attorney, Agent, or Firm*—Fish & Richardson P.C.

(57) ABSTRACT

The invention relates to methods of treating mixtures containing polymeric materials, e.g., collagen, to form a polymer that intercalates into the polymeric material. The treatment provides greater tensile strength to the mixture, among other advantages. The polymer is formed of a monomeric unit having at least one catechol group that is oxidized to a quinone upon polymerization.

49 Claims, 27 Drawing Sheets

SYNTHESIS OF THE 2-ARM

SYNTHESIS OF THE 3-ARM

FIG. 59    CARBON 13 NMR
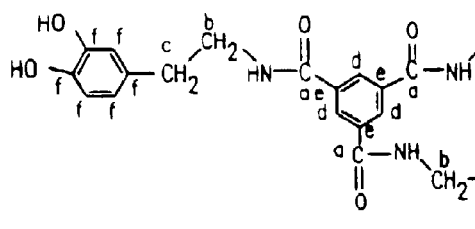
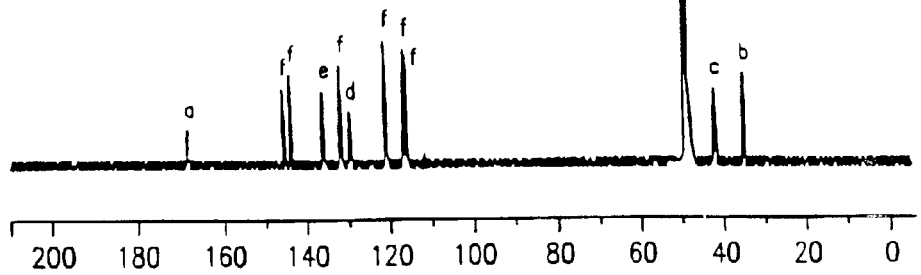
FIG. 60    PROTON NMR
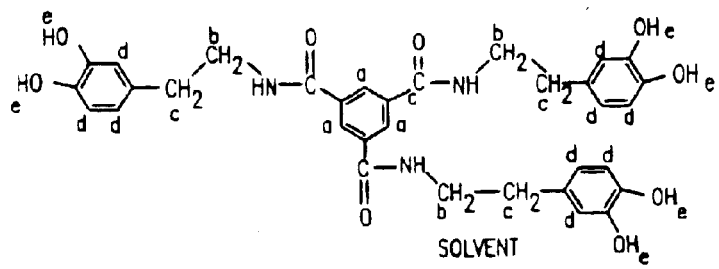
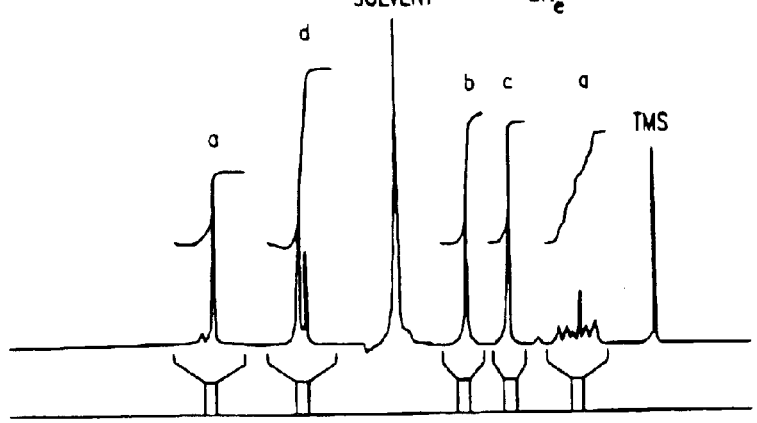

POLYMER COMPOSITE COMPOSITIONS

CROSS-REFERENCE TO RELATED APPLICATIONS

This application is a continuation of Ser. No. 09/872,367 filed Jun. 1, 2001, now U.S. Pat. No. 6,565,960, claims priority from U.S. provisional application Ser. No. 60/208,543, filed on Jun. 1, 2000, which is incorporated herein by reference in its entirety.

FIELD OF THE INVENTION

The invention relates to polymer composite compositions.

BACKGROUND OF THE INVENTION

Soluble collagen isolated from tissue sources such as tendon and skin forms native fibrils at 37° C. in physiological buffers. Although these fibrils can be extruded to form synthetic fibers of various dimensions, the tensile strength of these fibers is relatively weak due to a lack of intermolecular cross-linking between collagen polypeptides. This physical weakness limits the use of these fibers in tendon and ligament reconstruction. To strengthen these collagen fibers, cross-linkers such as glutaraldehyde and carbodiimide have been used to re-establish the intermolecular cross-link. A drawback of glutaraldehyde cross-linked materials for use in vivo, however, is that glutaraldehyde and its reaction products are toxic to cells.

SUMMARY OF THE INVENTION

The invention is based on the discovery that polymeric materials, e.g., collagen, including collagen fibers, can be strengthened by adding particular catechol-containing compounds (especially compounds having two or more catechol groups) to the polymeric material and forming a polymer of the compounds that intercalate within the polymeric material, e.g., forming a polymer composite. It is believed that the resulting polymer forms a scaffold-like structure throughout the polymeric material without the necessity of cross-linking the individual polymeric materials, e.g., collagen polypeptides. This scaffolding provides synthetic polymer fibers having a tensile strength, stiffness, and strain at failure that is comparable to or better than natural polymeric material fibers.

Accordingly, the invention features a method of treating a polymeric material, e.g., collagen, by providing a mixture comprising the polymeric material and a monomer having a first catechol group; oxidizing the mixture; and polymerizing the monomer via the first catechol group to form a polymer in which the first catechol group has been oxidized to a quinone group, and the polymer intercalates into the polymeric material. The method optionally includes removing unpolymerized monomer from the mixture after the polymerizing step. The monomer can further contain a reactive group, such as a second catechol group or an aldehyde group. Alternatively, the monomer can contain, other than the first catechol group, a reactive group and a linker of at least three carbon atoms between the first catechol group and the reactive group, where no more than one peptide bond, or alternatively no peptide bond, separates the first catechol group from the reactive group. In another example, the monomer can contain a first catechol group and a reactive group, provided that the reactive group is not a carboxyl group or a primary amine. The reactive group can participate in a covalent bond with a collagen polypeptide (e.g., when the reactive group is an aldehyde, amino, or carboxyl group) or with another monomer (e.g., when the reactive group is a catechol group). When the reactive group is a second catechol group, the monomer can form a homopolymer of the monomer.

Specific examples of monomers include 2,3-dihydroxybenzaldehyde, 3,4-dihydroxybenzaldehyde, rosemarinic acid, nordihydroguaiaretic acid, and the multi-armed structures described in the Examples.

A polymeric material is any polymer that can be synthetic, natural, or derived from natural sources, e.g., marine or terrestrial animal or plant (e.g., bovine, porcine, equine, skate, or sea cucumber). The polymeric material may be in any form including solid, liquid, or gel. Polymers include, for example, collagen, gelatin (included denatured gelatin), alginates, chitosan, silk, and cellulose.

The collagen can be of any form and from any origin. For example, the collagen can be sea cucumber dermis collagen, bovine tendon collagen, molecularly engineered collagen, or gelatin (e.g., in any suitable form including hydrogels, liquids, or foams). In addition, the collagen can be digested with a protease before the oxidizing and polymerizing steps. The collagen can be in the form of microfibrils, fibrils, natural fibers, or synthetic fibers. The polymeric material, e.g., collagen, can be at least 50% (e.g., at least 75, 90, or 95%) by weight of the mixture.

In the oxidation step, oxygen can be introduced into the mixture in the form of dissolved molecular oxygen or in the form of periodate (e.g., sodium meta-periodate). The oxidation step can be carried out more rapidly by the introduction of chemical oxidants, like periodate. Oxygen introduced merely by atmospheric exposure or in vivo are suitable methods for carrying out the oxidation step. Alternatively, in areas where exposure to air is not possible or desirable, oxygen or other oxidants can be introduced from exogenous sources via, for example, tube, feed line, or cannula (e.g., arthroscopically).

In another aspect, the invention includes a method of increasing the tensile strength or the protease resistance of a composition containing collagen by adding a monomer as described above; and treating the mixture using the methods described above.

In another aspect, the invention features a composition containing a polymeric material, e.g., collagen, and a polymer that intercalates into the polymeric material, e.g., collagen, the polymer formed of monomers, each monomer having a first quinone group, a second quinone group, and a linker of at least three carbon atoms between the first quinone group and the second quinone group, where no more than one peptide bond separates the first quinone group from the second quinone group, alternatively where at least one peptide bond separates the first quinone group from the second quinone group, or alternatively where there is no peptide bond between the first quinone group and the second quinone group. Alternatively, the monomer has a quinone group and a reactive group, provided that the reactive group is not an amino or carbonyl group participating in a peptide bond within the monomer, or alternatively wherein the reactive group is an aldehyde or a second catechol.

In another aspect, the invention features a composition containing a polymeric material, e.g., collagen, and a polymer that cross-links with the polymeric material, e.g., collagen, the polymer formed of monomers, each monomer having a first quinone group, a second quinone group, and a linker of at least three carbon atoms between the first quinone group and the second quinone group, where no more than one peptide bond separates the first quinone group from the second quinone group, alternatively where at least one peptide bond separates the first quinone group from the second quinone group, or alternatively where there is no peptide bond between the first quinone group and the second quinone group; and wherein a functional group (e.g., sulfur or nitrogen or oxygen atom), from the polymeric material, e.g., collagen, chemically reacts to form a bond (either reversible or irreversible) between the monomer and the polymeric material, e.g., collagen. Alternatively, the monomer has a quinone group and a reactive group (e.g., an aldehyde or aldehyde functional equivalent, such as imine), provided that the reactive group is not an amino or carbonyl group participating in a peptide bond within the monomer.

Although the polymers of monomers described above have a first and a second quinone group, the quinone group may be reacted with another functional group in the polymer or may be cross-linked with another group in the polymeric material (e.g., collagen) to ultimately form a quinone derivative. Such quinone derivatives are deemed to be quinone groups in the polymers of monomers of the invention. For example, if a quinone group reacts with an amino group from the polymeric material, an imine (a quinone derivative) forms. It is also possible for two quinones to react, in which case a coupled quinone results. In such instances, the resulting product is considered to have two quinone groups, however, they are separated by a substituted-ethylene group formed from two of the quinone groups of the original first and second quinone.

Another aspect of the invention involves a method of making a polymer composition comprising combining collagen and a polymer that intercalates into the collagen, the polymer comprising monomers, each monomer comprising a catechol group, a reactive group (e.g., a catechol group, a quinone, an aldehyde, or aldehyde functional equivalent), and a linker of at least three carbon atoms between the catechol group and the reactive group.

In another aspect, the invention involves a method of treating a polymeric material, the method comprising: providing a mixture comprising the polymeric material and a monomer comprising a first catechol group and a reactive group selected from the group consisting of a second catechol group and an aldehyde group; oxidizing the mixture; and polymerizing the monomer via the first catechol group and the reactive group to form a polymer in which the first catechol group has been oxidized to a quinone group, wherein the polymer intercalates into the polymeric material. The catechol groups can be, for example, nordihydroguaiaretic acid, 2-Arm, 3-Arm, 4-Arm, or 9-Arm.

Another aspect of the invention involves a composition comprising a polymeric material, e.g., collagen, and a polymer made by the polymerization of a catechol-containing monomer. In one aspect, the catechol-containing monomer is a monomer comprising a first catechol group and a reactive group selected from the group consisting of a second catechol group and an aldehyde group. The catechol-containing monomer can be nordihydroguaiaretic acid, 2-Arm, 3-Arm, 4-Arm, or 9-Arm.

Another aspect of the invention is a composition comprising: a catechol-containing monomer treated collagen fiber; and a catechol-containing monomer treated collagen foam. In such compositions, the fiber can be surrounded by the foam, and can be such that the foam comprises pores of a size to allow infiltration of cells into the foam. These compositions can further comprise cells (e.g., fibroblasts, mesenchymal stem cells, chondrocytes, or molecularly engineered cells), and the catechol-containing monomer can be nordihydroguaiaretic acid, 2-Arm, 3-Arm, 4-Arm, or 9-Arm.

In another aspect, the invention involves a method of engineering tissue (e.g., tendon) comprising use of the composition comprising: a catechol-containing monomer treated collagen fiber; and a catechol-containing monomer treated collagen foam, and the variations described above.

Another aspect of the invention is a method of making a composition of the invention, comprising combining a catechol-containing monomer treated collagen fiber; and a catechol-containing monomer treated collagen foam. The combining and treatment steps can be performed in any order, thus one aspect is the method of making the composition, wherein the the catechol-containing monomer treated collagen fiber is combined with collagen foam, and the resulting composition is treated with a catechol-containing monomer.

The polymer can be a homopolymer of the monomers, each monomer attached to at least one other monomer via a covalent bond formed between a ring carbon of a quinone group of one monomer and a ring carbon of a quinone group of another monomer. The monomer can include a 2,3-dimethylbutylene group, a 1,3,5-tricarboxylic acid group, or a 5-nitroisophthalic acid group between the first quinone group and the second quinone group, or two or more additional quinone groups. As described above in regard to the methods of the invention, the source, form, and proportion of collagen in the mixture can be varied. In addition, the composition can be in the form of a synthetic fiber having a tensile strength of at least 80 MPa.

An additional aspect of the invention features a compound having three catechol groups and a linker, where each catechol group resides at a terminal carbon of the linker. Such compounds are described in the Examples below.

"Microfibrils," "fibrils," "fibers," and "natural fibers" are the naturally-occurring structures found in a tendon. Microfibrils are about 3.5 to 50 nm in diameter. Fibrils are about 50 nm to 50 $\mu$m in diameter. Natural fibers are above 50 $\mu$m in diameter. A "synthetic fiber" refers to any fiber-like material that has been chemically or physically created or altered from its naturally-occurring state. For example, an extruded fiber of fibrils formed from a digested tendon is a synthetic fiber, but a tendon fiber newly harvested from a mammal is a natural fiber. Of course, synthetic fibers can include non-collagenous components, such as hydroxyapatite or drugs that facilitate tissue growth. For example, the compositions can contain growth factors such as basic fibroblast growth factor, tumor growth factor beta, bone morphogenic proteins, platelet-derived growth factor, and insulin-like growth factors; chemotactic factors such fibronectin and hyaluronan; and extracellular matrix molecules such as aggrecan, biglycan, and decorin.

As used herein, a "terminal carbon" is a carbon atom that is attached to no more than one other carbon atom within a molecule. A "reactive group" is a chemical moiety that facilitates formation of a covalent bond between the reactive group and (1) a catechol or quinone group, or (2) a functional group on a collagen polypeptide.

As used herein, "intercalates" or "intercalation" is the immersion or dispersal of one substance into at least a portion of another substance.

The methods and compositions of the invention are useful in producing less immunogenic, less inflammatory, high strength, and biocompatible compositions, e.g., collagenous compositions, such as prostheses for, e.g., repair or replacement of tendons and ligaments in a mammal (e.g., a human, dog, cat, or horse). The prosthesis need not be a fiber and can be, for example, a prosthetic disk for replacing a ruptured intervertebral disk. In addition, because polymers formed from, e.g., nordihydroguaiaretic acid (NDGA), are not susceptible to protease degradation in vivo, the advantages associated with the polymer will be maintained after implantation of the collagenous composition or a device containing it inside the body.

The new compositions are also useful in tissue engineering applications. For example, the composition can include one or more fibers (e.g., collagen, collagen treated with a catechol-containing monomer described herein such as NDGA) surrounded by additional collagen material (e.g., collagen foam) such that the composition has suitable porosity such that cell infiltration can occur. In one aspect, the invention is a composition having one or more fibers surrounded by additional collagen material (e.g., collagen foam) and cells (e.g., fibroblasts, mesenchymal stem cells, chondrocytes or molecularly engineered cells) infiltrated therein. The resulting composition can be used as a skeleton or support for colonization of cells, and thus as a mechanically competent tissue engineering composition.

Unless otherwise defined, all technical and scientific terms used herein have the same meaning as commonly understood by one of ordinary skill in the art to which this invention belongs. Although suitable methods and materials for the practice or testing of the present invention are described below, other methods and materials similar or equivalent to those described herein, which are well known in the art, can also be used. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

FIG. 59 a $C^{13}$ NMR spectrum for the 3-arm molecule described in the Examples.

FIG. 60 is a proton NMR spectrum for the 3-arm molecule described in the Examples.

DETAILED DESCRIPTION

Figure 1:
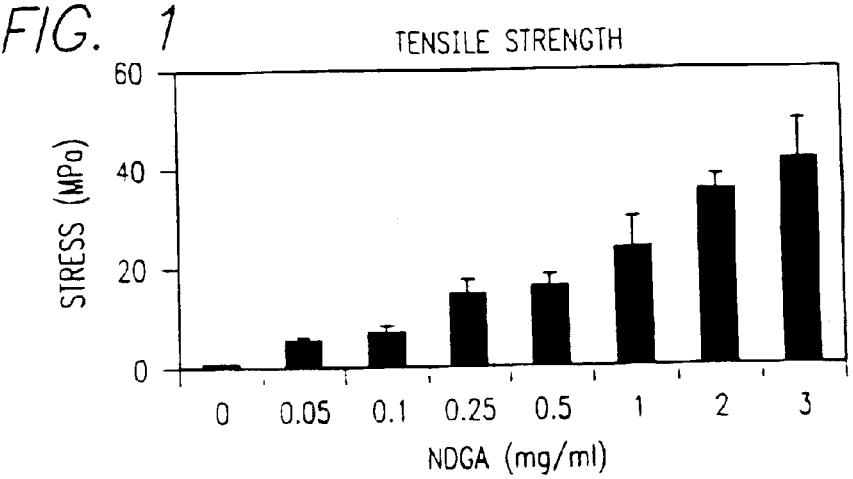
FIGS. 1–3 are bar graphs of various concentrations of NDGA versus tensile strength, stiffness, and strain at failure values, respectively, for a single treatment of collagen with NDGA. N=5 for each bar. Error bars indicate one standard deviation.

The invention relates to methods of manufacturing or treating polymeric materials, including collagenous compositions, such as collagen fibers, to achieve increased tensile strength or other beneficial properties, as detailed below. The methods can be applied to synthetic or naturally-occurring materials (e.g., collagenous materials, such as a natural fiber harvested from a tendon, as well as to chemically or enzymatically treated collagen, such as gelatin (denatured collagen)).

Advantageously, the catechol-containing monomers, and their method of use for treating polymeric materials, is useful for "designing" improved polymers (e.g., collagen, gelatin), that is, polymers with specific desired characteristics, such as, thermal stability, tensile strength, moldability, elasticity, biodegradability (or lack thereof), compressive strength, or non-antigenicity. Based on the adjusting the specific catechol-containing compound, and the ratio of compound to polymer used, these characteristics can be modulated to achieve the desired characteristic(s). Additionally, polymers having essentially equivalent characteristics (e.g., tensile strength) can be achieved by using any of a number of combinations of polymeric material and catechol-containing monomer. For example, gelatin in various concentrations, either 2.5%, 5%, or 10% in water can be each be made into polymers having essentially equivalent mechanical characteristics by treating the gelatin with NDGA at 1 mg/mL, 0.5 mg/mL, or 0.25 mg/mL, respectively. Thus, depending on the level of NDGA desired, the selection of a particular formulation is possible, effectively, without loss of desired mechanical characteristics.

It is believed that the benefits of the methods and compositions of the invention arise from the nature of the polymerization chemistry. The monomeric units each contain at least one catechol group that, during oxidation to a quinone, become susceptible to formation of an intermolecular, inter-quinone carbon-carbon bond. The polymer produced by this reaction is a quinone-containing polymer lattice embedded in the collagen, thereby supporting the physical integrity of the collagen. While the monomeric units can contain other reactive groups to facilitate cross-linking between collagen polypeptides via the polymer, this cross-linking is not necessary for the benefits associated with the polymer. Reactive groups include aldehydes, which react with the lysine side chains in the collagen polypeptide.

For example, NDGA is a molecule that contains two catechol groups, each at an end of a 2,3-dimethylbutylene linking group. Other than the catechols, NDGA contains no other reactive groups. Embedding NDGA into collagen, followed by polymerization, results in a quinone-containing homopolymer intercalated into the collagen without substantial formation of covalent bonds between the polymer and the collagen polypeptides. In certain embodiments, the absence of non-catechol reactive groups, such as aldehydes, tends to reduce the toxicity associated with the polymer. However, toxicity can be reduced by other means, such as extensive washing of the compositions before implantation. In addition, catechols such as NDGA are polymerized under physiological conditions (at room temperature and in aqueous solvents) that prevent destruction of the collagen polypeptides.

Variations in the methods and compositions are described below.

Compounds for Polymerization

The one or more catechol groups in the compound to be polymerized can be any moiety that contains a dihydroxybenzene group. For example, the benzene ring can contain any other moiety that does not prevent the catechol from forming intermolecular, inter-quinone carbon-carbon bonds in the presence of oxygen. Thus, the resulting polymer contains cross-linked quinones having any additional substituent attached to the quinone that does not affect the inter-quinone polymerization process.

Similarly, the reactive group of the compound can contain any functional group that facilitates polymerization of the compound or cross-linking of the compound or polymer to a collagen polypeptide. When the reactive group is a second catechol group, the compound is thought to form a homopolymer that does not substantially form covalent bonds with the collagen polypeptides. However, when the reactive group is, e.g., an aldehyde, carboxyl group, or primary amine, the compound can form covalent cross-links with collagen (via the reactive group) as well as with another catechol-containing compound (via the catechol group).

breach a tear in a tendon or ligament. A linker containing a bond susceptible to degradation (e.g., peptide bonds) in vivo would be useful for the latter purpose, while a linker such as a straight or branched alkane that is resistant to degradation in vivo would be useful for the former purpose.

Specific examples of compounds useful in the invention include NDGA (available from Sigma Chemical Co., St. Louis, Mo.), rosemarinic acid (available from Cayman Chemical Co., Ann Arbor, Mich.), 3,4-dihydroxybenzaldehyde, 2,3-dihydroxybenzaldehyde, compounds designated "2-Arm", "3-Arm", "9-Arm" and a four-catechol compound having the following structure ("4-Arm"). See, FIGS. 53–56.

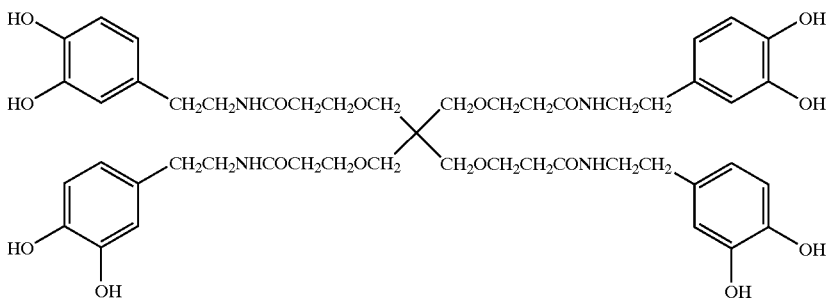

Primary amines and/or carboxyl groups in the monomer can be used to cross-link the collagen via carbodiimide-catalyzed peptide bond formation. In the case of an aldehyde reactive group, the aldehyde forms peptide bonds with the lysine residues within the collagen polypeptide.

A compound suitable for use in the methods or for producing the new compositions optionally includes a linker between one or more catechol groups and one or more reactive groups. The linker can be any moiety that does not interfere with the ability of a catechol group to react with another catechol group or with the ability of the reactive group to react with collagen or another catechol-containing compound. For example, the linker can be (1) a straight or branched hydrocarbon chain containing 1 to 30, alternatively 1 to 12, carbon atoms and can include methyl, ethyl, propyl, isopropyl, butyl, isobutyl, sec-butyl, tert-butyl, n-pentyl, 2-methylhexyl, 3-ethyloctyl, and 4-ethyldecyl; (2) a straight or branched hydrocarbon chain containing 2 to 12 carbon atoms and one or more (e.g., 1–6) double or triple bonds, e.g., allyl, 2-butenyl, 2-pentenyl, 2-hexenyl, 2-butynyl, 2-pentynyl and 2-hexynyl; (3) a divalent hydrocarbon chain containing 1–6 carbon atoms; (4) a $C_{1-6}$ alkylene chain optionally containing a double bond or a triple bond and further optionally substituted with alkoxy, hydroxyl, halo, carboxyl, amino, nitro, cyano, cycloalkyl, heterocycloalkyl, aryl, heteroaryl, aminosulfonyl, alkylsulfonylamino, alkylcarbonyloxy, alkyloxycarbonyl, alkylcarbonyl, formyl, alkylcarbonylamino, or aminocarbonyl; (5) an aromatic hydrocarbon ring (e.g., phenyl, naphthyl); or (6) a combination of the above.

The particular linker within the compound can be selected based on the intended use of the composition. For example, in many cases, the composition is intended to remain in the body of the subject for as long as possible, such as when a synthetic collagenous disk is to replace a ruptured intervertebral disk. In other cases, the composition is intended to facilitate growth of new tissue and to degrade after implantation, such as when the composition is used to The four-catechol compound can be made as follows. Four equivalents of 3,4-dibenzyloxyphenylamine is added to one equivalent of the quadravalent acid in dimethylformamide containing four equivalents of dicyclohexyl carbodiimide (DCC) and four equivalents of 4-hydroxybenzotriazole (HBT). The reaction mixture is stirred at room temperature overnight. The reduced DCC is then filtered, and the dimethylformamide (DMF) is removed under reduced pressure. The resulting product is then taken up in dichloromethane (DCM) and washed 3× with water, 10% HCl (cold), and saturated sodium carbonate. The DCM was then dried with magnesium sulfate and removed under vacuum. A typical yield for this procedure is 50–70%. The resulting solid from the above procedure is then dissolved in ethanol or ethanol/ethyl acetate and placed in a glass bomb with 0.5 g of Pd-carbon. The bomb is then flushed with hydrogen gas (50 psi) and allowed to react overnight at room temperature. The solvent is filtered and the resulting liquid is stripped down to yield the final catechol-containing product. A typical yield for the final product is about 90%. The 2-Arm, 3-Arm and 9-Arm compounds can be made using essentially the same procedure, but adjusting the proportion of catechol-containing reagent and the carboxylic acid containing reagent used. Physicochemical analytical characterization (e.g., nuclear magnetic resonance (proton, carbon-13), high performance liquid chromatography, capillary zone electrophoresis) results obtained for the products are consistent with that expected for the desired products.

Synthetic chemistry transformations and protecting group methodologies (protection and deprotection) useful in synthesizing the inhibitor compounds described herein are known in the art and include, for example, those such as described in R. Larock, *Comprehensive Organic Transformations*, VCH Publishers (1989); T. W. Greene and P. G. M. Wuts, *Protective Groups in Organic Synthesis*, 2d. Ed., John Wiley and Sons (1991); L. Fieser and M. Fieser, Fieser and Fieser's *Reagents for Organic Synthesis*, John Wiley and Sons (1994); and L. Paquette, ed., *Encyclopedia* of *Reagents for Organic Synthesis*, John Wiley and Sons (1995), and subsequent editions thereof.

To facilitate polymerization of the compound via the catechol group by oxidation, the ambient molecular oxygen or oxygen radical levels can be increased in the reaction mixture. For example, in an aqueous reaction mixture, the density of dissolved oxygen in the mixture can be increased by exposing the mixture to an atmosphere enriched for molecular oxygen. Alternatively, the catechols can be oxidized by adding a periodate compound, such as sodium meta-periodate. Other standard oxidizers can be used. It is noted that no special measures for facilitating catechol oxidation are necessary, and ambient atmospheric oxygen is sufficient for polymerization if the mixture is reacted for an appropriate length of time.

It is thought that the oxidation of the catechol groups proceeds concurrently with the inter-quinone polymerization process, similar to what is seen for formaldehyde-resorcinol polymerization of plastics.

Collagenous and Polymeric Material

The collagens suitable for the new methods and compositions can be any form of a collagen polypeptide. For example, the species origin of the collagen polypeptide can be from any eukaryotic organism, including invertebrates (e.g., sea cucumbers, starfish, sea urchins, worms, and sponges) and vertebrates (e.g., hagfish, sharks, skates and rays, bony fish, and mammals such as monkeys, chickens, pigs, and cows), and from any tissue, including skin, tendon, cartilage, or ligament. Also suitable are collagen polypeptides produced recombinantly (e.g., in a human cell line, bacterium, or yeast). In addition, the collagen can be, but need not be, free of any tertiary or quaternary structure, such as in gelatin, a denatured form of collagen.

Alternatively, the collagen can be in the form of a complex biological structure, such as in a freshly harvested tendon fiber. Where the collagen is already formed into a complex structure, it may be necessary to incubate the collagen in the presence of the compound before oxidation and polymerization to allow the compound to infiltrate the collagen.

To allow formation of a prosthesis in any shape or size, bulk collagen (e.g., bovine tendon collagen) is solubilized by digestion with a protease (e.g., papain). The soluble collagen is then extruded into a synthetic fiber or otherwise shaped, where spontaneous formation of fibrils lends weak integrity to the prosthesis. The shaped collagen is then infiltrated with a catechol-containing compound, which is subsequently oxidized and polymerized. The resulting polymer intercalating into the shaped collagen provides the beneficial physical and biochemical properties described herein.

The methods of treating the polymeric materials are general, and thus useful in a variety of methods for making materials for biomedical and other applications. Other aspects of the invention relate to the polymer compositions, methods of making them, and methods of improving characteristics of the polymeric materials relevant for biomedical applications (e.g., tensile strength, biocompatibility, biodegradation (or lack thereof), porosity (e.g., for cell infiltration and tissue engineering), elasticity, compressive strength, thermal stability, moldability, or non-antigenicity, etc.) using the compounds and methods herein.

Gelatin gels or liquids treated with catechol-containing monomers are gelatin materials that are resistant to liquification at 37° C. and thus mechanically competent compositions, particularly for in vivo applications. Gelatin-based materials resulting from treatment of the gelatin with the catechol-containing compounds are useful in a variety of biomedical applications. For example, NDGA polymerized gelatin hydrogels are significantly stronger and stiffer than untreated gelatin gels (e.g., untreated gelatin hydrogel has a compressive stiffness of 0.70 MPa, compared to 4.71 MPa for NDGA treated gelatin hydrogel), they are stable at 37° C., they are nearly elastic under dynamic compression loads (rebounds completely after compression to over 80%, while untreated gels fracture when compressed to 80%), and they can undergo large deformations without compromising their mechanical properties. These hydrogels can be used alone or in combination with other materials such as glycosminoglycans and collagen fibrils for applications including, for example, as a space filling biomaterial for reconstructive surgery (e.g., cranial and facial reconstruction), a biomimetic cartilage for repair of focal lesions, a resorbable carrier for phased release of cytokines such as bone morphogenetic proteins (BMPs) for bone repair, or a patterning scaffold for musculoskeletal regeneration.

The NDGA-treated hydrogels also demonstrate selective biodegradability with various proteinases. For example, papain and three bacterial proteinases (collagenase, protease V8, and protease K) completely solubilized NDGA polymerized hydrogels. Bovine cathepsins B and C had no effect on the gelatin hydrogels. These results indicate that NDGA polymerized gelatin is susceptible to proteinase digestion. Only the bacterial enzymes, however, were effective at solubilizing the gel.

Gelatin in liquid form can be used as well. Typically, gelatin remains a viscous fluid at 37° C. Thus, use of liquid gelatin for biomedical applications in vivo is not possible when the application requires compressive load capacity or other strength property (e.g., tensile strength or elasticity) of the material. Liquid gelatin, however, can be treated with the catechol-containing monomers to stabilize the liquid gelatin, resulting in a polymerized gelatin that is thermally stable (e.g., over 37° C., between about 37 to about 80° C.) and has improved mechanical properties (e.g., compressive stiffness, fracture load) relative to untreated liquid gelatin. In this manner, liquid gelatin can be a useful material in liquid form if gel formation or polymerization is then catalyzed after placement in situ. For example, it can be used as an injectable space filling material for reconstructive surgery (e.g., cranial or facial), injected to fill voids without surgical intervention, it can be molded to irregular shapes for tissue augmentation during reconstructive surgery, or it can form a polymerizable scaffold in which to deliver and then immobilize cells, cytokines or therapeutic agents.

Gelatin foams (e.g., GELFOAM® available from Pharmacia, Peapack, N.J.) are an additional area for application of the polymerization compounds and methods of the invention. Gelatin foams are useful as delivery systems for therapeutic agents, cytokines, and musculoskeletal cells, particularly mesenchymal stem cells. The potential use of the gelatin foam in tissue engineering is suspect because it is extremely friable and lacks compressive stiffness and resilience. The gelatin foams can be prepared from standard gelatin (e.g., prepared according to know procedures or those described herein at 4° C.), by lyophilization of the gelatin followed by catechol-containing monomer (e.g., NDGA, 4-Arm, or 9-Arm) treatment. Alternatively, the gelatin can be subjected to catechol-containing monomer treatment for polymerization, then lyophilization to a foam.

The NDGA-treated 5% gelatin foams were significantly stiffer than untreated and NDGA-treated GELFOAM®. The compressive stiffness of the NDGA polymerized foams was over 300-fold higher than that of GELFOAM®. Thus, NDGA treated gelatin foams can provide a useful scaffold for tissue engineering of cartilage and bone, a scaffold that is superior with respect to mechanical properties than GELFOAM®, or foams produced from other synthetic biomaterials. NDGA polymerization produces gelatin-based materials that are mechanically distinct from those currently available for tissue engineering of cartilage and bone. Gelatin foams treated with NDGA have compressive properties at least an order of magnitude greater than those of other biological materials such as GELFOAM®, alginate, and chitosan, as well as synthetic scaffolds such as poly-lactic-glycolic acids (PLGA). NDGA-treated gelatin-foams can also provide novel approaches for optimizing integration of tendon constructs into bone.

The catechol-containing monomer treated collagen fibers can also form the basis of other strengthened polymer compositions for tissue engineering applications to tendon repair. While tendon fibroblasts attach, migrate and proliferate on these treated collagen fibers normally, the fibers can sometimes be too dense for cell infiltration. Development of mechanically competent, porous fibers is necessary for the tissue engineering of tendon. The catechol-containing monomer treated collagen fibers combined with catechol-containing monomer treated collagen foams are useful for producing biologically based, biocompatible fibers with material properties comparable to those of native tendon fibers.

Two competing physical characteristics in the construction of a suitable biomaterial for the tissue engineering of tendon are at play. The higher the porosity of the material, the weaker the fiber; however, the higher porosity would allow more effective cell loading. The dilemma then is to fabricate a strong but porous fiber into which cells can be effectively loaded. This can be addressed by using a catechol-containing monomer (e.g., NDGA, 2-Arm, 3-Arm, 4-Arm, or 9-Arm) treated collagen fiber as a core scaffold, which can then be subjected to treatment with catechol-containing monomer treated collagen foams. The core fiber conveys strength to the resulting composite fiber, and the foam provides the necessary porosity to allow infiltration of the cells (e.g., fibroblasts, mesenchymal stem cells, chondrocytes or molecularly engineered cells) into the biomaterial. Together, the two collagen materials provide a useful way of addressing the aforementioned competing characteristics, and as they are both collagen-based, avoids the introduction of additional foreign materials, thus avoiding material compatibility issues.

Another aspect of the invention is a polymeric material (e.g., collagen) composition wherein the composition includes the polymeric material and the catechol-containing monomer (including those having another reactive group such as one or more additional catechol, quinone, or aldehyde functional groups), and wherein the composition is stored in a nonoxidative environment or container (e.g., in the absence of any air or oxidant, in the presence of a reducing agent such as ascorbate, vitamin E, or other antioxidant or free-radical scavenger compound). This composition can be stored until the appropriate time for polymerization, whereupon merely by introducing the composition to oxidative conditions (e.g., exposure to air, oxygen, or an oxidant) or for example, by allowing diffusion of the antioxidant, the polymerization process is allowed to proceed resulting in the new polymerization compositions.

Measuring Beneficial Properties

Biocompatibility. If the collagenous compositions of the invention are to be implanted in the body of a subject, the composition should be biocompatible. To assess biocompatibility, cells (e.g., a fibroblast cell line) can be seeded onto the composition in a culture dish. If the fibroblasts are able to replicate and attach to the composition, the composition is likely to be biocompatible. Alternatively, the composition can be implanted into the body of a subject (e.g., a mouse, rat, dog, pig, or monkey) for a specified time, then removed to evaluate the number and/or health of the cells attached to the composition. The ability of the composition to support growth of fibroblasts is particularly important when infiltration of cells and deposition of an extracellular matrix on the composition are desired in vivo.

Biocompatibility can also be assessed by evaluating the immune response, or lack thereof, against the composition. A suitable in vitro test is to contact human monocyte/macrophages to the composition, which is typically in the form of small particles of about 1 to 10 $\mu$m in diameter. The monocyte/macrophage culture is then examined for signs of an inflammatory response, including (1) phagocytosis of the particles, (2) increased lysozomal activity, and/or (3) increased prostaglandin $E_2$ in the culture. For in vivo testing, the composition can be implanted into an animal (e.g., a rabbit), and the animal monitored for signs of, for example, increased lymphocyte, neutrophil, or macrophage cell number locally or systemically; increased concentrations of cytokines locally or systemically; fever; and immune cell infiltration of the composition. The quantitation of specific cell types, such as monocytes, helper T cells, and B cells, is accomplished using standard methods such as fluorescence-assisted cell sorting. In addition, B cell activation can be evaluated by culturing B cells from the animal in which the composition had been implanted, contacting the B cells with the composition, and determining whether the B cells proliferate in response to the composition. Other standard methods for evaluating an immune response in an animal can be used.

Another measure of biocompatibility is the susceptibility of the composition to proteolytic digestion in vivo. As discussed above, the desired level of protease resistance depends on the intended use of the composition. For measuring the level of protease resistance of the composition, the composition is incubated with a protease (e.g., collagenase or papain) for a specified amount of time, then evaluated for any decrease in a physical property (e.g., tensile strength) of the composition or the presence of any degradation product of the collagen or polymer.

Physical properties. The compositions of the invention exhibit beneficial physical properties. These properties include high tensile strength, high stiffness (or elastic modulus), and low strain at failure.

A high tensile strength is desirable in, e.g., a prosthetic tendon, to avoid rupture of the prosthesis under stress in vivo, such as when the muscle to which the prosthesis is attached is contracted. Similarly, a high stiffness is necessary to stabilize the relative positions of the parts (e.g., muscle to bone) to which the prosthesis is attached. A high stiffness means that a synthetic fiber does not stretch much under applied loads, which is important for a tendon because nearly all of the force from a muscle is transferred to the insertion site with little loss of energy in extending the tendon. Moreover, the proper full excursion of the limb as the muscle contracts requires that the tendon does not extend. A low strain at failure indicates that the fiber does not extend under load before failure. High tensile strength with no fiber stretching will provide the most efficient transfer of energy from the muscle to the bone insertion. To measure these physical properties, any suitable apparatus having (1) two clamps for attaching to the prosthesis, (2) a force transducer attached to one of the clamps for measuring the force applied to the prosthesis, (3) a means for applying the force, and (4) a means for measuring the distance between the clamps. For example, tensiometers can be purchased from manufacturers MTS, Instron, and Cole Parmer. To calculate the tensile strength, the force at failure is divided by the cross-sectional area of the prosthesis through which the force is applied, resulting in a value that can be expressed in force (e.g., Newtons) per area. The stiffness is the slope of the linear portion of the stress/strain curve. Strain is the real-time change in length during the test divided by the initial length of the specimen before the test begins. The strain at failure is the final length of the specimen when it fails minus the initial specimen length, divided by the initial length.

In general, prosthetic fibers formed from the compositions of the invention have a tensile strength of at least about 30 MPa (e.g., at least about 40, 50, 60, 70, 80, or 90 MPa), a stiffness of at least about 200 MPa (e.g., at least about 300, 400, 500, or 600 MPa), and a strain at failure of less than about 20% (e.g., less than about 15 or 10%).

An additional physical property that is associated with the extent of cross-linking in a composition is the shrinkage temperature. In general, the higher the temperature at which a collagenous composition begins to shrink, the higher the level of cross-linking. The shrinkage temperature of a fiber can be determined by immersing the fiber in a water bath, raising the temperature of the water bath, and observing the temperature of the water bath at which the fiber shrinks. Tension on the fiber may be required for observing the shrinkage. The shrinking temperature for the compositions of the invention can be at least about 60° C. (e.g., at least 65 or 70° C.).

For compositions that are not elongated in shape, such as in a disk, the fracture pressure can be an indication of physical strength. The fracture pressure is the minimum force per area at which a material cracks.

EXAMPLES

The invention will be further described in the following examples which do not limit the scope of the invention described in the claims.

Example 1

Bovine Tendon Collagen/Polymer Compositions
Materials and Methods

Materials: Nordihydroguaiaretic acid (NDGA), tyrosine, dopamine, and 3,4-dihydroxyphenylalanine (DOPA) were purchased from Sigma Chemical Co. (St. Louis, Mo.). Pepsin was purchased from Worthington Biochemical Corp. SpectraPor2 dialysis tubing was obtained from Fisher Scientific. SDS/PAGE gels were purchased from Novex.

Collagen: Type I collagen was purified from 8–9 month old fetal bovine tendon using standard procedures as follows. Tendons were minced and extracted with 3% acetic acid, pH 2.5, for 24 hours at 4° C. The acid-extracted collagen was separated from the insoluble residue by centrifugation at 37,000×g for 30 minutes. The residue was then digested with pepsin in 3% acetic acid, pH 2.5, for 24 hours at 4° C. The digest was centrifuged at 37,000×g for 30 minutes. The supernatant was collected, to which NaCl was slowly added to 0.7 M while stirring and on ice. The resulting precipitate was collected by centrifugation as described above and then redissolved in 3% acetic acid, pH 2.5. NaCl was again added to 0.7 M, and the precipitate was collected by centrifugation as described above. The purified type I collagen was redissolved in 3% acetic acid, pH 2.5, and stored at 4° C. The purity of the type I collagen was assessed by SDS/PAGE using 4–20% linear gradient Tris-glycine gels.

Preparation of collagen fibers: Fibers were prepared by first dialyzing 10 ml of the purified collagen against water in 0.32 ml/cm dialysis tubing, and then dialyzing against 30 mM $NaH_2PO_4$, 140 mM NaCl, pH 7.4 (PBS) at 37° C. overnight. The collagen fiber gel was extruded into de-ionized water, clamped at one end, and hung vertically in air to dry at room temperature.

NDGA treatment of fibers: Dried fibers were hydrated in 0.1 M $NaH_2PO_4$, pH 7.0, for 30 minutes. Fibers were then treated with NDGA, which was suspended in 1 N NaOH. Complete solubilization of NDGA at concentrations greater than 10 mg/ml required addition of 10 μl 10 N NaOH. One milliliter of the NDGA solution was added directly to the phosphate buffer in which the fibers were suspended. The fibers were agitated in the NDGA solutions for 24 hours. The fibers were removed, briefly rinsed with water, and hung vertically to dry. Subsequent treatments with NDGA were performed as described above.

Biochemical analyses of NDGA-treated fibers indicated the presence of significant amounts of unreacted, soluble NDGA cross-linking intermediates. By washing the NDGA treated fibers with ethanol, these contaminants were efficiently removed. For the experiments described in this example, all fibers were extensively washed with 70% ethanol for at least 6 hours, followed by extensive washing with PBS for 18 hours at room temperature.

As a comparison for the NDGA cross-linked fibers, other fibers were treated for 18 hours with 2.5% glutaraldehyde at neutral pH in the phosphate buffered saline. The fibers were subsequently washed in the phosphate buffer lacking glutaraldehyde and dried.

Tendon fibers: Bovine digital extensor tendons were obtained fresh from 12–14 week-old calves. Tendons were sectioned in 2 cm long specimens and lyophilized. Collagen fibers approximately equal in size to the fabricated collagen fibers were manually separated from the dry tissue. These fibers were mechanically tested in tension using an identical protocol as that for the fabricated fibers, the protocol being described in more detail below. Rabbit digital extensor tendons were obtained from skeletally mature rabbits and immediately tested in tension as described below, except that compression clamps were used to secure the tendons to the transducer and piston.

Mechanical tests: Dried fibers were mounted in nylon spacers. The ends of the fibers inside the spacer were glued in place with cyanoacrylate (Permabond 102, AIN Plastics, Tampa, Fla.). The glue was allowed to set for 24 hours at room temperature. The distance between the spacers was set at a nominal 2 cm gauge length. For mechanical tests, clamped fibers were hydrated one of two ways depending on the type of analysis to be performed. For measurement of tensile strength, a 2 mm region in the middle of the fiber was hydrated in the phosphate buffer; the remainder of the fiber being kept dry. This protocol was used for tensile strength measurements because, when the entire fiber was hydrated, failure inevitably occurred at the clamp at loads approximately half that of fibers hydrated only in the middle. To determine the stiffness, the entire fiber between the two clamps was hydrated in the buffer. Actual clamp to clamp distance was measured after hydration to the nearest 0.01 mm with a dial caliper. The diameter of the hydrated fiber was measured with a dial caliper to estimate the cross-sectional area.

The clamps were mounted in recessed holes in aluminum jigs produced from ¼ inch stock. Uniaxial tensile tests were performed on a tensiometer fabricated in the laboratory. Distance was continually measured with a linear variable differential transformer (LVDT; Lucas Control Systems Products, Schaevitz Sensors, Hampton, Va.) mounted on a piston (LVDT-1). Load was measured with an LVDT force transducer (Lucas Control Systems Products). To measure the displacement of the force transducer core, an LVDT was placed in line with the core, and the distance was recorded (LVDT-2). A strain rate of 10%/sec was applied to all tensile tests. The millivolt analogue outputs were digitized with a Quatec A-D PCM-CIA card and imported directly into Microsoft Excel. Tensile strength was taken as the highest load attained before failure, normalized to the cross-sectional area. The linear portion of the stress/strain curve was used to calculate the elastic modulus (also known as stiffness).

Results

Figure 2:
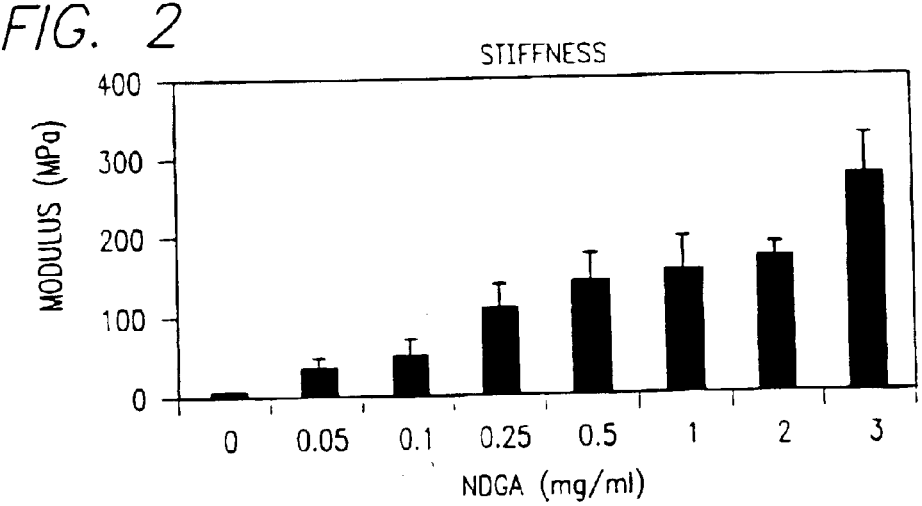
Figure 3:
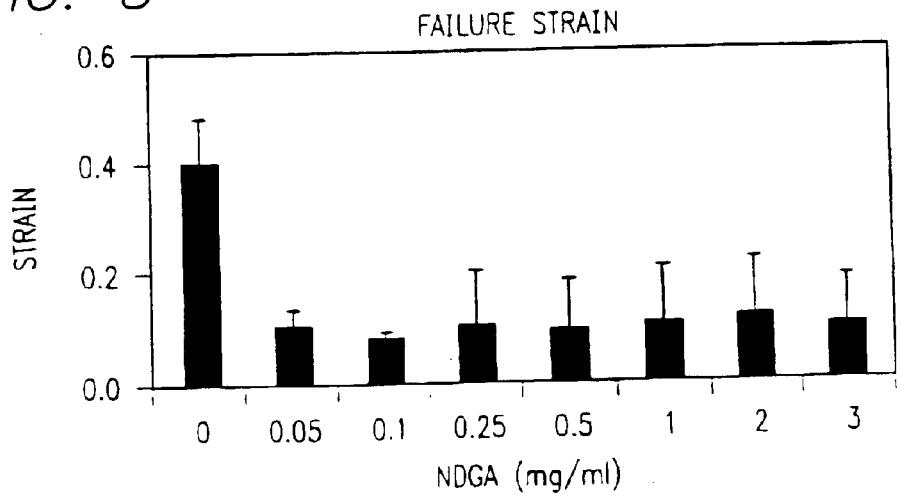

A single treatment with NDGA significantly increased the tensile strength and stiffness of bovine type I collagen fibers (FIGS. 1 and 2). The extent of this increase was directly related to the concentration of NDGA to which the fibers were exposed. The maximum tensile strength achieved at 3 mg NDGA/ml was over 10-fold higher than that of the control, untreated collagen fibers. The stiffness of maximally cross-linked fibers was 100-fold higher than that of control fibers. Strain at failure was significantly reduced from 40% to approximately 9% at all NDGA concentrations (FIG. 3).

Figure 4:
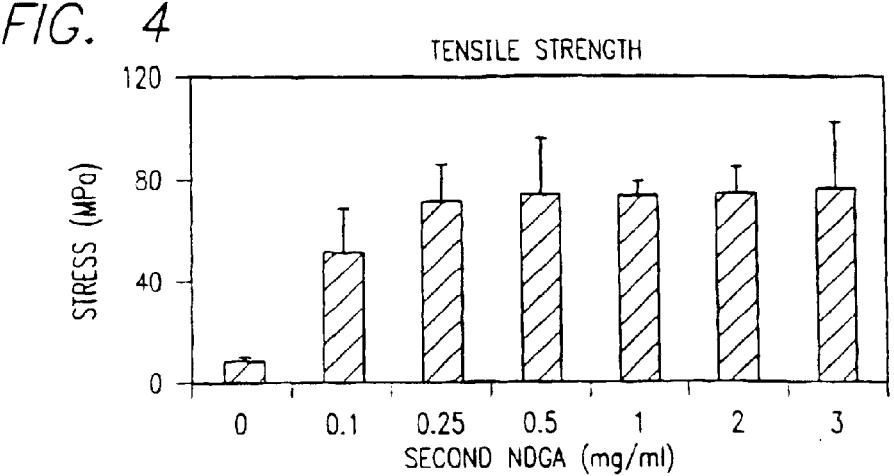
FIGS. 4–6 are bar graphs of various concentrations of NDGA versus tensile strength, stiffness, and strain at failure values, respectively, for a first treatment of collagen with 0.1 mg/ml NDGA and a second treatment of NDGA at various concentrations. N=5 for each bar. Error bars indicate one standard deviation.
Figure 5:
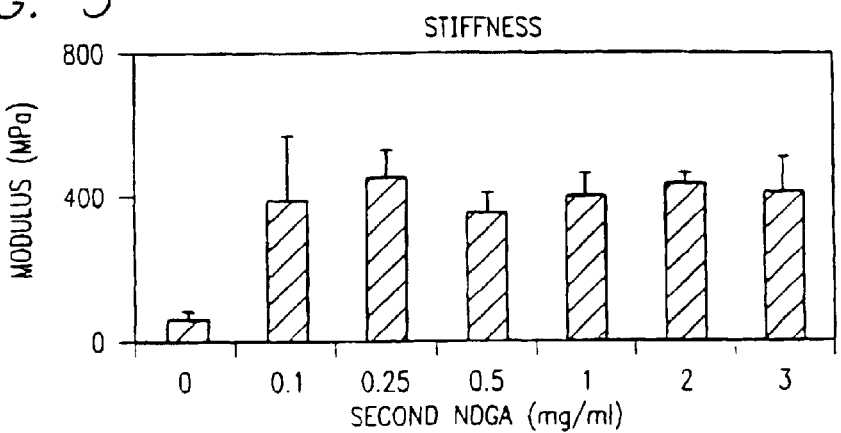
Figure 6:
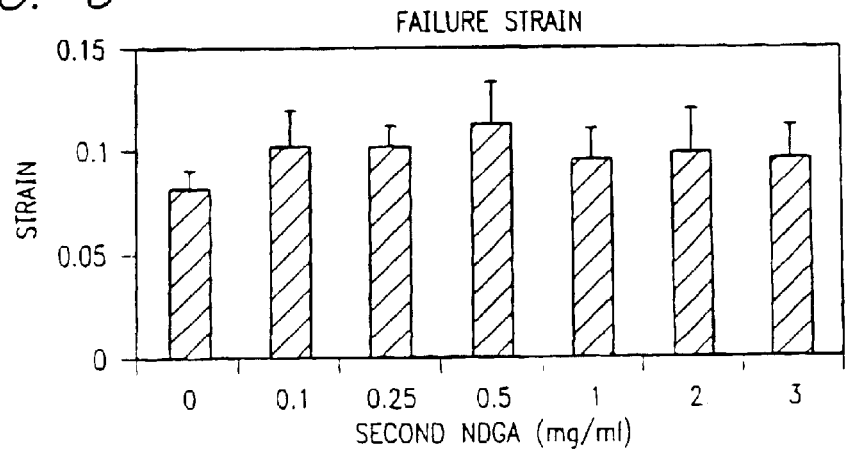
Figure 7:
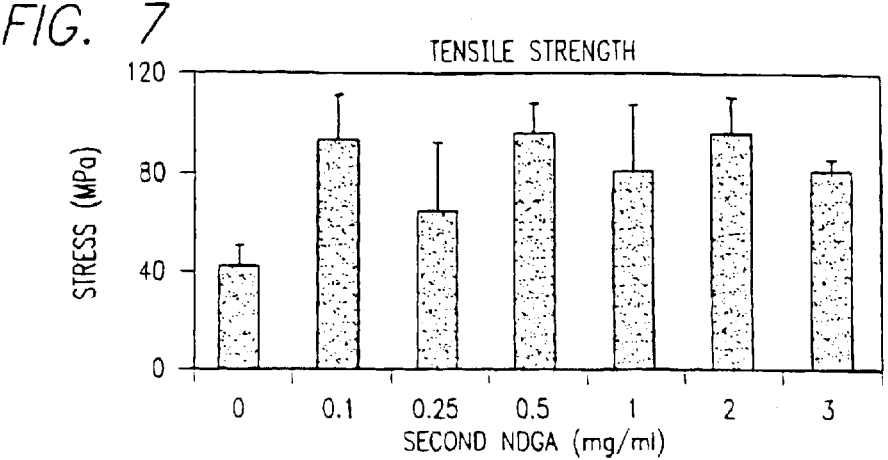
FIGS. 7–9 are bar graphs of various concentrations of NDGA versus tensile strength, stiffness, and strain at failure values, respectively, for a first treatment of collagen with 3 mg/ml NDGA and a second treatment of NDGA at various concentrations. N=5 for each bar. Error bars indicate one standard deviation.
Figure 8:
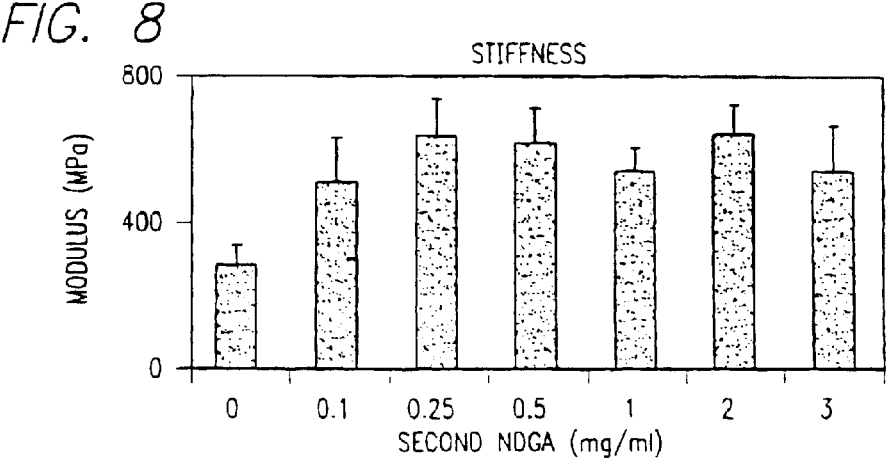
Figure 9:
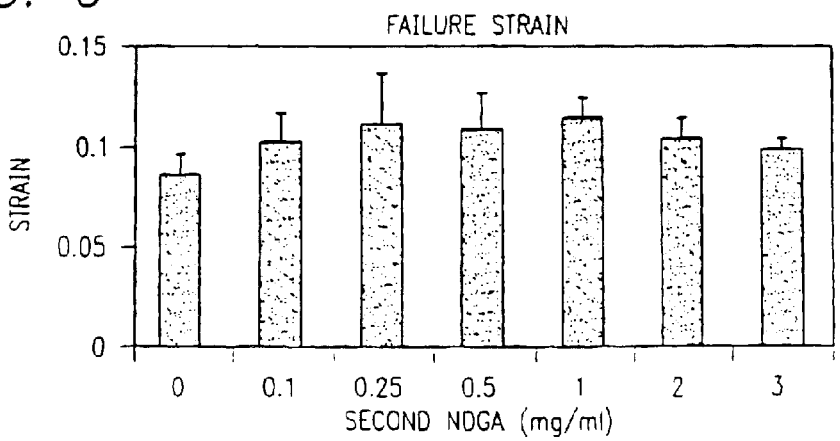

Fibers first treated with 0.1 or 3.0 mg NDGA/ml were washed with ethanol to remove soluble, unreacted NDGA cross-linking intermediates (see below) and subsequently treated a second time with freshly prepared solutions of NDGA at various concentrations. The second NDGA treatment significantly increased the tensile strength and stiffness of the fibers (FIGS. 4 and 7). However, the magnitude of the increase was independent of the NDGA concentration used for the second treatment. The second exposure to NDGA of the fibers pretreated with 0.1 mg/ml increased the tensile strength and stiffness by 10- and 8-fold, respectively (FIGS. 4 and 5). Exposure of fibers pretreated with 3 mg/ml increased strength and stiffness by 2-fold (FIGS. 7 and 8). Strain at failure did not appear to change (FIG. 9). The greatest tensile strength and stiffness were achieved by first treating with 3.0 mg NDGA/ml, followed by a second treatment of NDGA at concentrations between 0.1 and 3.0 mg/ml (FIGS. 7 and 8). A third treatment with NDGA was no more effective at increasing the beneficial material properties of the fibers than two treatments alone.

Figure 10:
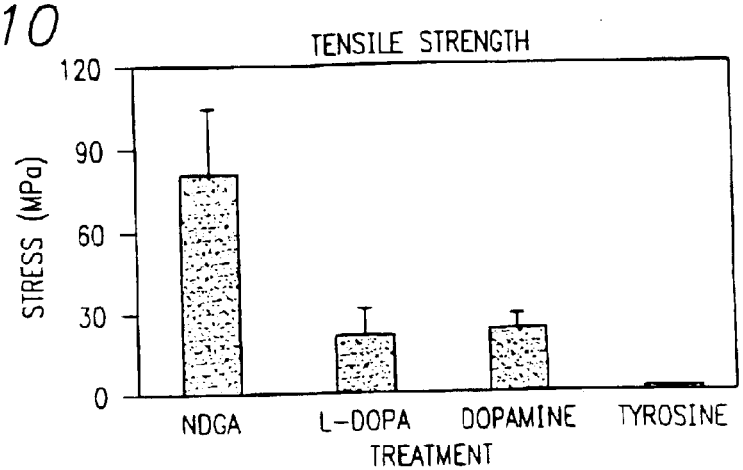
FIGS. 10 and 11 are bar graphs of fibers subjected to various treatments versus tensile strength and stiffness values, respectively. N=5 for each bar. Error bars indicate one standard deviation.
Figure 11:
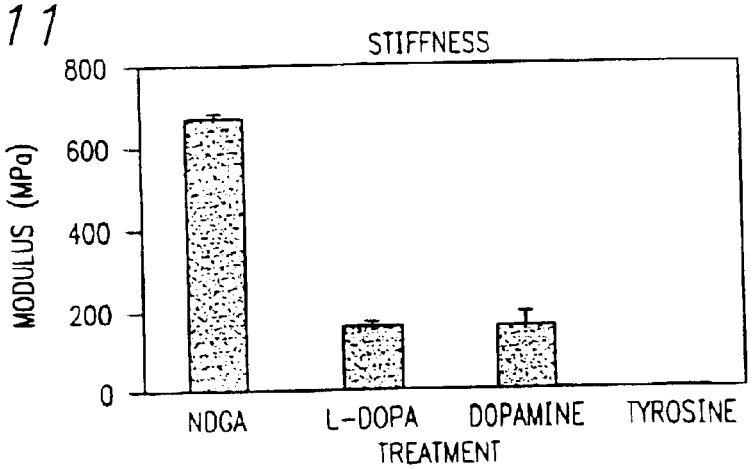

To determine whether other biologically relevant catechols mimicked the effects of NDGA, collagen fibers were treated with DOPA and dopamine according to the procedure described above. Tyrosine was used as a control for the effects of monophenols. The tensile strength and stiffness of L-DOPA and dopamine treated fibers were greater than that of control fibers treated with tyrosine (FIG. 10). However, NDGA-treated fibers were still 4-fold stronger and stiffer than those treated with L-DOPA and dopamine (FIGS. 10 and 11).

In further studies, biochemical analysis indicated that ethanol treatment effectively eliminated unreacted NDGA products. Fibers washed with ethanol were again washed in a small volume with ethanol, PBS, or sodium borate buffer (pH 8.2) containing 50 mM boric acid, 10 mM sodium tetraborate. The eluents were then analyzed for the presence of NDGA by capillary zone electrophoresis. The effect of ethanol on the material properties of the fibers was then examined to determine whether ethanol adversely affected the polymerization process. Removing soluble intermediates with ethanol increased the tensile strength of the NDGA treated fibers by approximately 50% (Section A of Table 1). Stiffness was not affected by the ethanol treatment, whereas strain at failure was increased slightly.

TABLE 1

| | Tensile strength (MPa) | Stiffness (MPa) | Strain at failure |
|---|---|---|---|
| A | | | |
| NGDA/Control | 61.9 ± 17.5 | 510 ± 83 | 0.07 ± 0.01 |
| NDGA/Ethanol | 90.7 ± 15.3 | 582 ± 126 | 0.11 ± 0.01 |
| B | | | |
| Control/NDGA | 28.8 ± 6.6 | 244 ± 43 | 0.12 ± 0.02 |
| Oxygen/NDGA | 91.2 ± 10.1 | 696 ± 38 | 0.11 ± 0.01 |
| Nitrogen/NDGA | 58.3 ± 23.8 | 449 ± 168 | 0.07 ± 0.03 |
| C | | | |
| Control | 0.7 ± 0.3 | 4 ± 0.5 | 0.40 ± 0.08 |
| NDGA | 81.9 ± 5.3 | 541 ± 51 | 0.10 ± 0.01 |
| Glutaraldehyde | 61.1 ± 12.0 | 489 ± 99 | 0.08 ± 0.01 |
| D | | | |
| Control | 0.7 ± 0.3 | 1 ± 0.1 | 0.46 ± 0.09 |
| NDGA | 90.7 ± 15.3 | 582 ± 58 | 0.10 ± 0.01 |
| Tendon fibers | 46.8 ± 16.7 | 327 ± 130 | 0.19 ± 0.02 |

Section A of Table 1 shows the effect of washing NDGA cross-linked fibers with 70% ethanol. Section B shows the effects of dissolved gases on the NDGA cross-linking process. Section C is a comparison of NDGA and glutaraldehyde cross-linked fibers. Section D is a comparison of the material properties of NDGA cross-linked fibers with those of bovine tendon fibers. Tensile strength was determined from fibers hydrated in the middle of the fiber. Stiffness and strain were determined from fibers hydrated throughout the full 2 cm gauge length. Values presented are the mean±S.D. N=5 for each group.

Since catechol oxidation is accelerated in the presence of oxygen, the effect of dissolved gases on the NDGA polymerization process was examined (Section B of Table 1). The solutions in which the NDGA was dissolved were purged with oxygen or nitrogen. The control NDGA solution was purged with air. Fibers were treated twice with NDGA in the respective solutions. All of the fibers were washed with ethanol. Treatment of the fiber with NDGA in the presence of oxygen resulted in the greatest tensile strength and stiffness, attaining 300% higher levels than fibers treated in solutions in equilibrium with air and approximately 60% higher than those treated in nitrogen (Section B of Table 1). The strongest and stiffest specimens were produced when fibers were treated twice with NDGA in oxygen-saturated solutions.

The material properties of NDGA polymerized fibers were compared to those of native bovine tendon fibers and glutaraldehyde cross-linked collagen fibers (Sections C and D of Table 1). The tensile strength and elastic modulus of NDGA treated fibers were significantly greater than those of glutaraldehyde cross-linked fibers. The ultimate tensile strength of NDGA cross-linked fibers was nearly twice that of native bovine tendon fibers. The modulus of these fibers was 80% greater than the stiffness of bovine tendon fibers.

In summary, intercalation and polymerization of NDGA in collagen forms compositions with a tensile strength higher than what is achieved with previously known collagen cross-linkers. In fact, the tensile strength exceeds that of natural collagen fibers. In addition, the stiffness and strain at failure of the compositions are comparable or superior to natural collagen fibers. Table 2 summarizes the physical properties of the compositions in this example and previously reported collagenous compositions.

TABLE 2

| | Tensile strength (MPa) | Modulus (MPa) | Failure strain (%) | Reference |
|---|---|---|---|---|
| NDGA | 90.7 ± 15.3 | 582 ± 58 | 10 ± 1 | 1 |
| Glutaraldehyde | 61.1 ± 12.0 | 489 ± 99 | 8 ± 1 | 1 |
| | 64.2 ± 15.0 | 456 ± 83 | 15 ± 3 | 2 |
| | 31 ± 9 | 190 ± 65 | 22 ± 5 | 3 |
| | 55 ± 19 | | | 4 |
| Carbodiimide | 12 ± 4 | 45 ± 20 | 37 ± 3 | 3 |
| | 27.4 ± 5.6 | 180 ± 55 | 18 ± 4 | 2 |
| Tendon | | | | |
| Bov. digital ext. | 46.8 ± 16.7 | N/A | N/A | 1 |
| Rab. digital ext. | 42.8 ± 28.3 | 366 ± 123 | 15 ± 3 | 1 |
| Rat tail | 39.0 ± 11.1 | 570 ± 85 | 8 ± 2 | 2 |

The numbers under the "References" column are (1) this example; (2) Kato et al., Biomaterials 10:38–42, 1989; (3) Goldstein et al., J. Bone Joint Surg. 71A: 1183–1191, 1989; and (4) Dunn et al., J. Biomed. Mater. Res. 27:1545–1552, 1993.

Example 2

Biocompatibility of Collagen/Polymer Compositions

Materials and Methods

Materials: NDGA, hyaluronidase, protease (Pronase E), Dulbecco's Phosphate Buffered Saline, and Dulbeccos's Modified Eagles Medium nutrient mixture F12 Ham (DMEM/Ham F12) were purchased from Sigma Chemical Co. Fetal Bovine Serum (FBS) was purchased from GibcoBRL, Rockville, Md. Collagenase was purchased from Worthington Biochemicals Corp., Freehold, N.J. All other reagent chemicals were analytical grade and obtained from Sigma Chemical Co. or Fisher Scientific.

NDGA cross-linked fibers: Fibers produced from purified pepsin-solubilized type I fetal bovine tendon collagen were prepared by extrusion and drying as described in Example 1. Dried fibers were hydrated in PBS for 30 minutes. Fibers were then treated with 30 mg/ml NDGA as follows: NDGA was suspended in 1 N NaOH. Complete solubilization of NDGA required addition of 10 $\mu$l 10 N NaOH. One milliliter of the NDGA solution was added directly to the phosphate buffer in which the fibers were suspended to a final concentration of 3 mg/ml. The fibers were agitated in the NDGA solution for 24 hours at room temperature. In some experiments, the fibers were thoroughly washed with 70% ethanol in water, followed by extensive washing with PBS. Subsequent treatments with NDGA were performed as described above.

Cell cultures: Digital extensor tendons were excised fresh from new born calves euthanized at a local abattoir and held in Dulbecco's Phosphate Buffered Saline during dissection and preparation for culture. Tendons were minced, weighed, and then digested with 0.1% w/v testicular hyaluronidase in 0.15 M NaCl, 0.1 M $NaH_2PO_4$, pH 7.0 (5 ml/g wet tissue weight) at 37° C. for 45 minutes. The hyaluronidase wash was decanted and the tissue was next digested with 5 mg/g tissue of Pronase E and 5 mg/g tissue of collagenase in 4% bovine serum albumen in DMEM/Ham F12 medium at 37° C. overnight. Cells were isolated from the tissue residue and washed with PBS. Cells were dispersed in DMEM/Ham F12 medium, counted, and plated on 24-well culture plates. Cells were cultured in DMEM/Ham F12 containing 10% FBS unless otherwise noted.

Cytotoxicity tests: The potential toxicity of NDGA, its reaction products, and the NDGA cross-linked fibers was determined using confluent tendon fibroblasts. NDGA was tested by dissolving NDGA in DMSO, then directly diluting in the medium containing 10% FBS to the desired final concentrations. The DMSO concentration was held constant for all NDGA concentrations, and a DMSO control was used in all experiments. To test whether oxidation products formed from NDGA were cytotoxic, the medium containing NDGA was incubated without cells at 37° C. in a $CO_2$-regulated incubator for 24 hours, before cells were exposed to the medium. Fibroblasts were cultured in the presence of NDGA or its oxidation products for 24 hours, and then the number of viable cells was measured with the CYQUANT® Cell Proliferation Assay Kit (Molecular Probes).

Two types of tests were performed to determine whether fibers cross-linked with NDGA were cytotoxic to tendon fibroblasts: an elution test and a direct contact test. For the elution tests, 10×1 cm segments of cross-linked fibers were washed in 0.5 ml of PBS. Serially diluted aliquots of the PBS wash were then added directly to the culture wells containing 200 ml of culture medium and attached fibroblasts. For the direct contact tests, NDGA cross-linked fibers were sectioned into 1 cm long segments. Sections of the fiber were placed directly in the fibroblast cultures in contact with the cell layer. Cells were cultured in the presence of the eluates or fibers for 24 hours, and then the number of viable cells was measured using the CYQUANT® assay kit.

NDGA Quantitation: The amount of NDGA in the buffers, eluents, and medium was determined by capillary zone electrophoresis on a Dionex CES. A sodium borate buffer (10 mM sodium borate, 50 mM boric acid, pH 8.0) was chosen for electrophoresis because it was known that borate efficiently complexes with catechols and increases absorptivity (Waite et al., Methods. Enzymol. 107:397–413, 1984). Samples were diluted in electrophoresis buffer, loaded by electrophoresis (5000 V for 5 seconds) onto a 75 mm inner diameter×80 cm long hollow glass capillary, and electrophoresed at 20 kV. NDGA was detected by absorbance at 280 nm. The amount of NDGA in the experimental samples was calculated from the peak area following calibration of the NDGA standards dissolved directly in capillary zone electrophoresis (CZE) buffer.

Mechanical tests: Uniaxial tensile tests were performed on fibers as described in Example 1. Dried fibers were glued into nylon spacers that were subsequently inserted into aluminum holders in line with a force transducer and linear variable differential transducer. The gauge length of the fiber was 2 cm. For tensile strength measurements, a 4 mm long portion in the middle of the fiber was hydrated in PBS in order to ensure failure in the fiber rather than at the clamps. For stiffness and strain at failure, the entire 2 cm fiber was hydrated. Strain rates were 10% $sec^{-1}$. Tensile strength was taken as the maximum load attained before failure, divided by the cross-sectional area. Stiffness was calculated from the linear portion of the stress/strain curve.

Results

Figure 12:
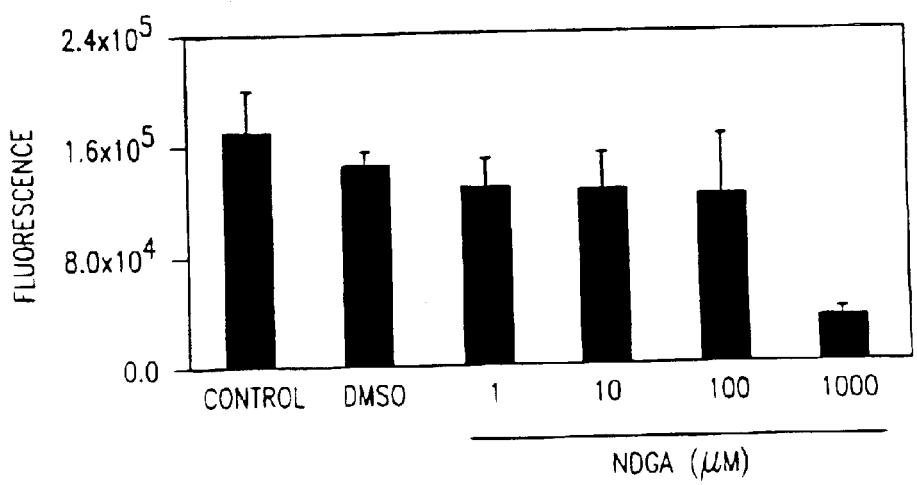
FIGS. 12 and 14 are a bar graphs of NDGA concentrations or controls versus relative fluorescence intensity, which is an indirect measure of viable cell number, using the CYQUANT® cell assay. Values shown are the average of four values±S.D.

Effect of NDGA on tendon fibroblast viability. Standard cytotoxicity tests were employed to determine whether NDGA or its oxidation products were toxic to tendon fibroblasts. Primary tendon fibroblast cultures were exposed to 1 to 1000 mM NDGA, and the number of viable cells remaining after 24 hours of exposure was measured. NDGA at 1, 10, and 100 mM had little effect on cell viability over that of the DMSO alone (FIG. 12). However, 1000 mM NDGA was toxic to the fibroblasts, resulting in an 80% reduction in viable cells after 24 hr. The control cells received neither DMSO nor NDGA.

Figure 13A:
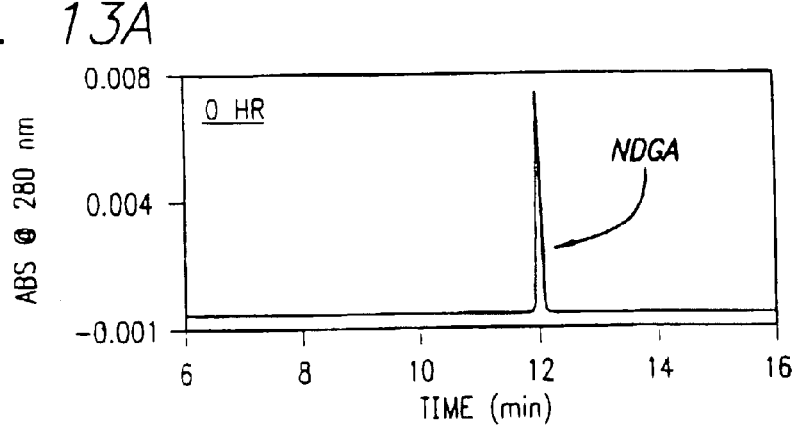
FIGS. 13A, 13B, and 16A–16C are tracings of the eluant from capillary gel electrophoresis, showing the peak for NDGA.
Figure 13B:
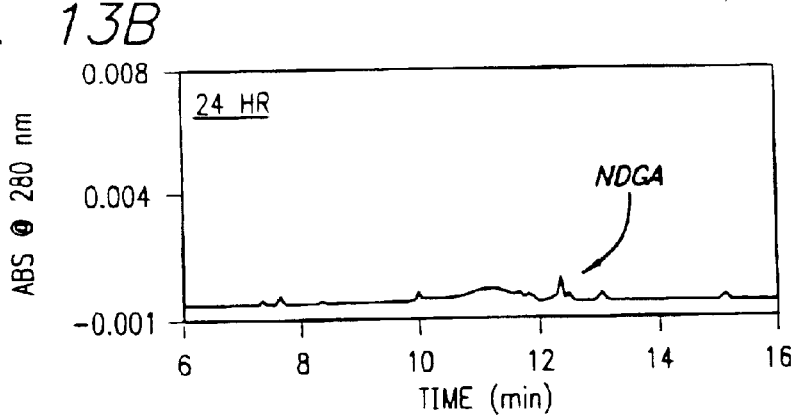

Based on capillary zone electrophoretic analysis of NDGA-containing medium, NDGA disappears from the medium with time in culture, even in the absence of cells (FIGS. 13A and 13B). NDGA was dissolved in DMSO to 10 mM and then diluted 100-fold into the medium. For the zero time point, the medium containing NDGA was diluted 3-fold with CZE buffer and electrophoresed immediately. For the 24 hour time point, the medium was incubated at 37° C. in a cell culture incubator before diluting 3-fold and electrophoresing. NDGA migrated at about 12.2 minutes, as shown in FIG. 13A. FIG. 13B shows that over 95% of the NDGA vanished by 24 hours. The fate of the NDGA is unclear. Its disappearance may involve oxidation of the catechols to quinones, since the medium developed a brown pigment similar to that formed from chemically oxidized NDGA. In the medium containing 1000 mM NDGA, less than 10% of the initial NDGA remained after 24 hours, decreasing the NDGA concentration to below 100 mM (FIGS. 13A and 13B).

Figure 14:
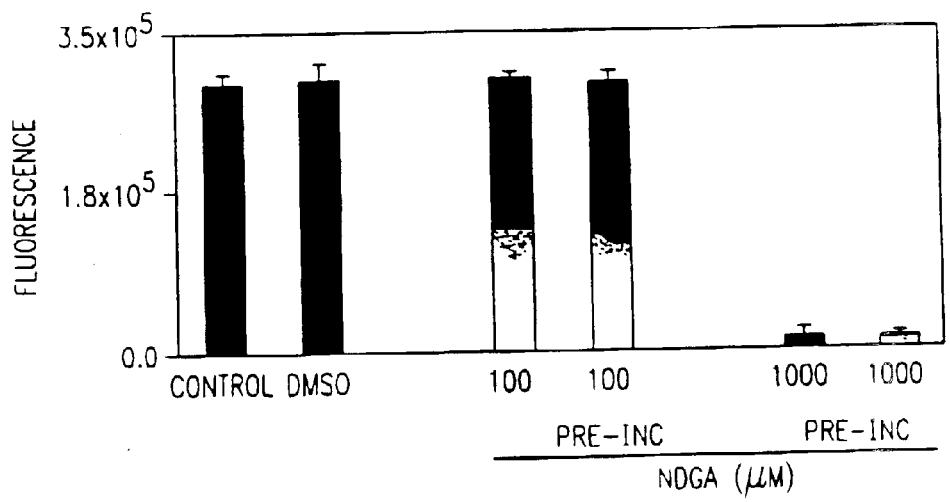

To determine whether NDGA oxidation products would affect cell viability, culture medium containing 100 or 1000 mM NDGA was pre-incubated at 37° C. for 24 hours. This conditioned medium containing oxidized NDGA was then presented to fibroblasts, and cell viability was determined. Similar effects on cell viability were observed with medium preincubated with 100 and 1000 mM NDGA without cells for 24 hours prior to the experiment (FIG. 14), indicating that NDGA oxidation products at high concentrations were equally cytotoxic to tendon fibroblasts.

Figure 15:
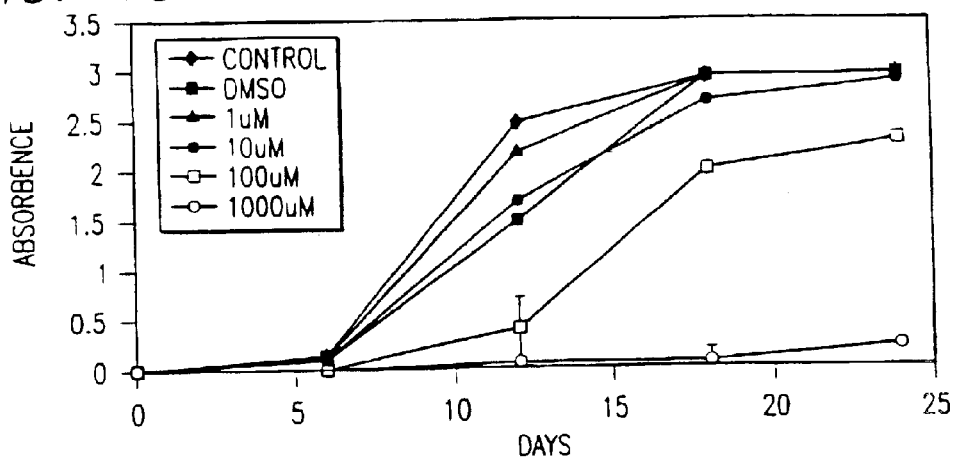
FIG. 15 is a line graph of days of culture versus absorbance, an indirect measure of cell number, using the CYQUANT® cell assay. Values shown are the average of four values±S.D.

Effect of NDGA on fibroblast replication. To determine whether NDGA or oxidation products derived from the cross-linking reaction influenced cell replication, primary tendon fibroblast cultures were treated with a single exposure at the start of culture with concentrations of NDGA from 1 to 1000 mM. Fibroblasts were subsequently cultured for 1, 2, and 4 weeks. At each time point, the number of viable cells in each treatment group was determined. The lower NDGA concentrations, 1 and 10 mM, had no effect on cell replication (FIG. 15). One hundred millimolar NDGA caused a temporary delay in replication, but after the first week, cells multiplied at a rate similar to that of the control cells. The highest NDGA concentration was toxic to the cells, as observed immediately above.

Figure 16A:
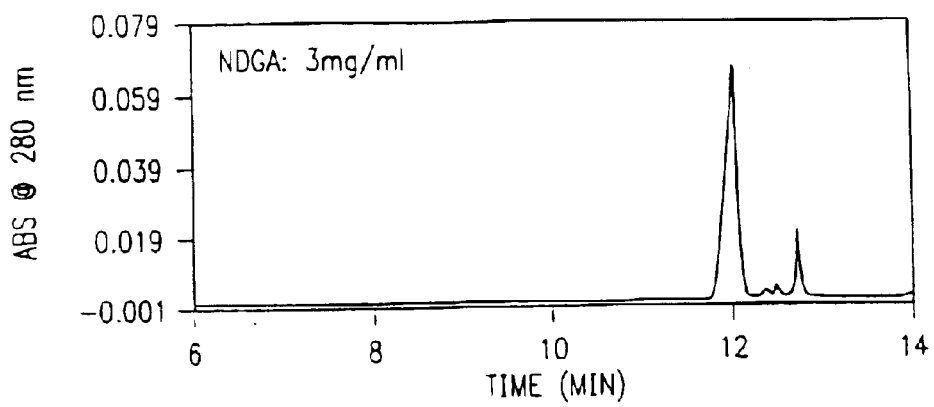
Figure 16B:
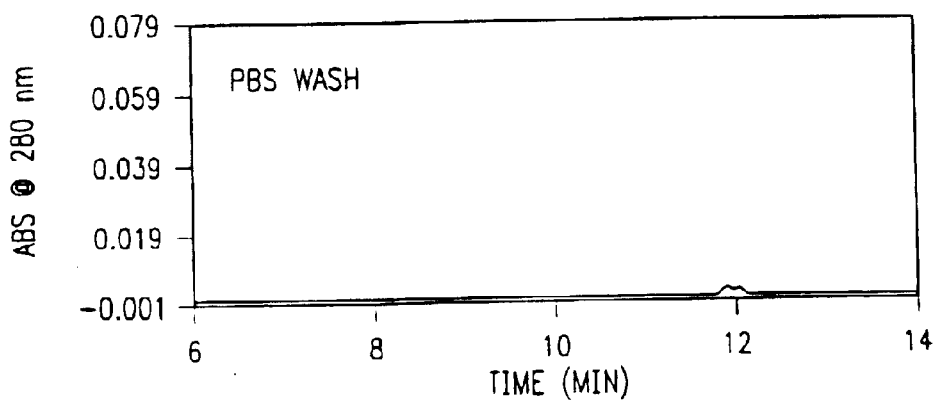
Figure 16C:
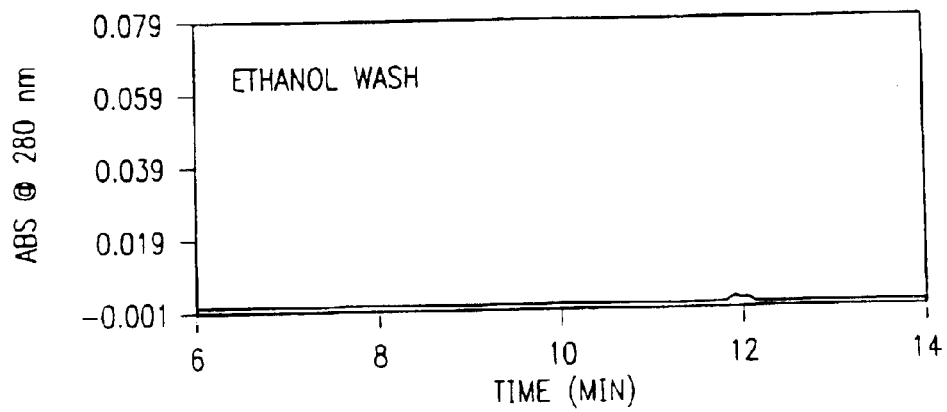

Effect of NDGA cross-linked fibers on fibroblasts. Optimal stabilization of collagenous fibers was achieved by treatment of collagen with 3 mg/ml NDGA. Based on the results discussed immediately above, showing that high concentrations of NDGA and its reaction products were toxic to fibroblasts, a remaining concern was the residual, soluble unreacted precursors or products of the NDGA-mediated cross-linking reaction. NDGA itself was not a concern for cytotoxicity of these fibers because CZE analysis of soluble compounds remaining in the fibers after cross-linking showed little unreacted NDGA remained (FIGS. 16A–16C). FIG. 16A shows the NDGA peak at the concentration used to cross-link fibers. FIG. 16B shows the NDGA peak of the PBS wash of the polymerized fiber. FIG. 16C shows the NDGA peak of the ethanol wash of the polymerized fiber. Spectrophotometric analyses of wash eluents from cross-linked fibers indicated that the fibers contained NDGA-derived compounds that were solubilized by PBS and ethanol.

Figure 17:
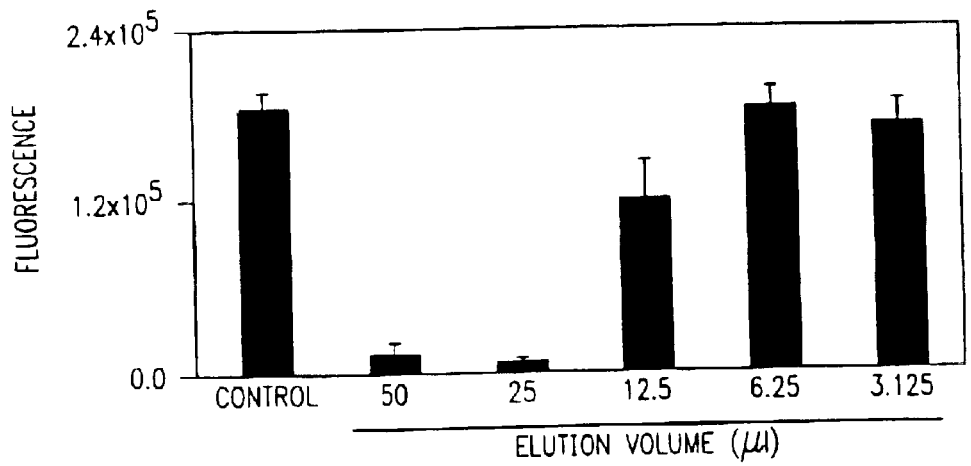
FIGS. 17 and 19 are bar graphs of elution volume versus fluorescence intensity, an indirect measure of cell number, using the CYQUANT® cell assay. Values shown are the average of four values±S.D.

To test for cytotoxicity of soluble intermediates remaining after NDGA treatment, the standard United States Pharmacopia (USP) "Elution Test" was performed. Fibers cross-linked with 3 mg/ml NDGA were hydrated and eluted with phosphate buffered saline for 24 hours. Fibroblasts in confluent cultures were then treated with various amounts of the eluant, and viability was assessed 24 hours later. The eluant was toxic to cells at high concentrations (FIG. 17), indicating that soluble NDGA cross-linking intermediates remained in the fibers.

Figure 18:
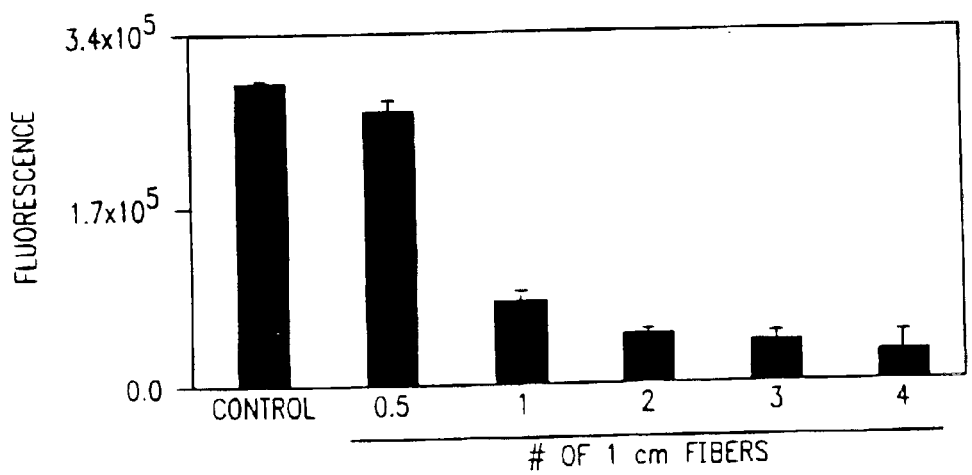
FIGS. 18 and 20 are bar graphs of number of 1 cm fibers versus fluorescence intensity, an indirect measure of cell number, using the CYQUANT® cell assay. Values shown are the average of four values±S.D.

A second test was employed to determine whether by-products leaching from cross-linked fibers were toxic to fibroblasts in vitro. For these experiments the USP "Direct Contact Test" was employed. Segments of the NDGA cross-linked type I collagen fibers were incubated directly with primary cell cultures. The number of 1 cm fiber segments varied from ½ to 4 per well in 24-well plates. FIG. 18 shows that byproducts remaining in the fibers leached into the medium and were toxic to cells.

Effect of post-fabrication processing of NDGA cross-linked fibers on cytotoxicity. The results described in this example indicated that caution must be exercised in designing tendon constructs stabilized with NDGA or other catechol-containing compounds suitable for the invention. Moreover, the toxic effects of NDGA-stabilized fibers suggested that NDGA intermediates in the polymerization process should be removed, unless toxicity would be a beneficial feature of an implantable prosthesis formed from the composition in exceptional cases. For example, toxicity may actually be beneficial when the prosthesis replaces or surrounds cancerous growths. Absent such exceptional circumstances, toxicity should be minimized. Therefore, methods to render the fibers benign for cell viability and replication were examined.

Figure 19:
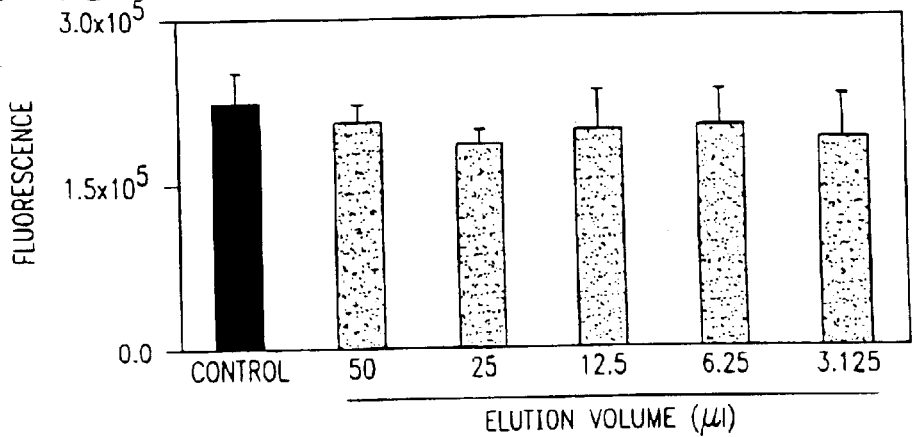

NDGA cross-linked bovine collagen fibers were thoroughly washed with phosphate buffered saline and then with 70% ethanol. The washed fibers were next incubated in phosphate buffered saline for 24 hours for the "elution test" as described above. Confluent tendon fibroblasts were exposed to various amounts of the eluant and incubated for 24 hours, after which cell numbers were determined. The eluant from the NDGA cross-linked fibers was toxic to the cells as noted above. In contrast, the eluant from the NDGA cross-linked fibers that had been thoroughly washed with phosphate buffer and 70% ethanol did not adversely affect cell viability in these tests (FIG. 19).

Figure 20:
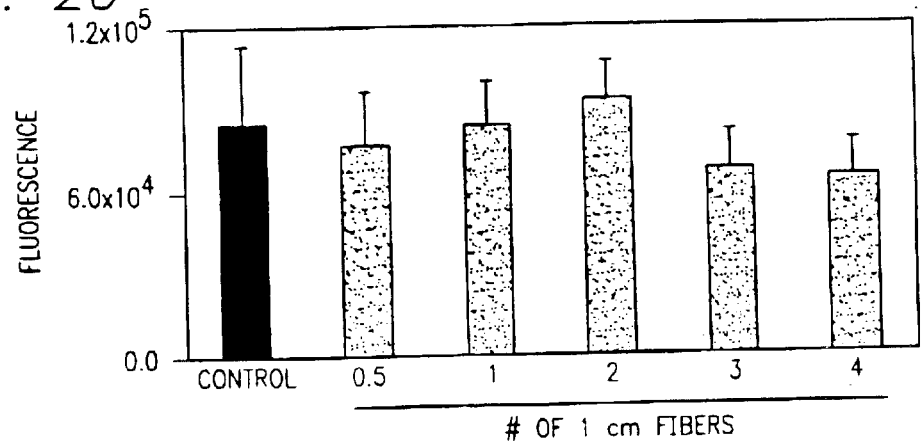
Figure 21:
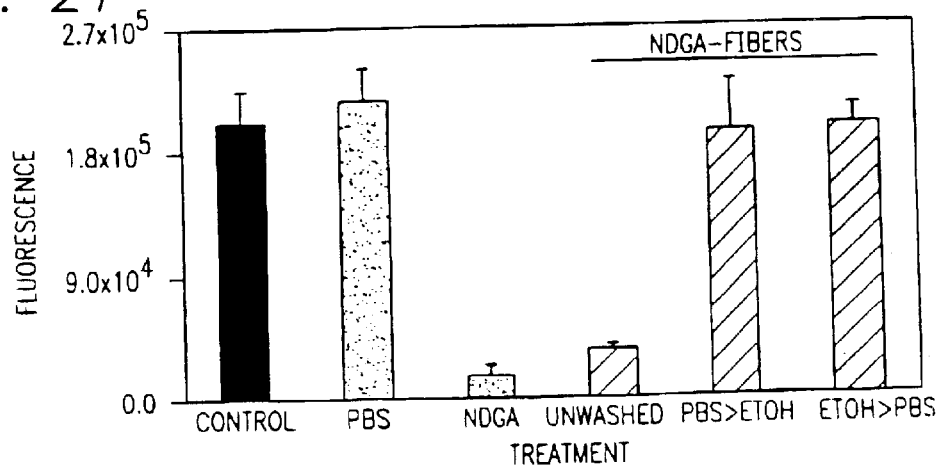
FIG. 21 is a bar graph of various post-polymerization treatments of fibers (and controls) versus fluorescence intensity, an indirect measure of cell number, using the CYQUANT® cell assay. Values shown are the average of four values±S.D. The ">" symbol indicates that the treatments were sequential from left to right.

Similar results were obtained with the direct contact test. NDGA cross-linked fibers washed with 70% ethanol and PBS did not affect fibroblast viability with the number of fibers examined (FIG. 20). The order of ethanol/PBS wash did not influence the removal of cytotoxic compounds (FIG. 21).

Figure 22:
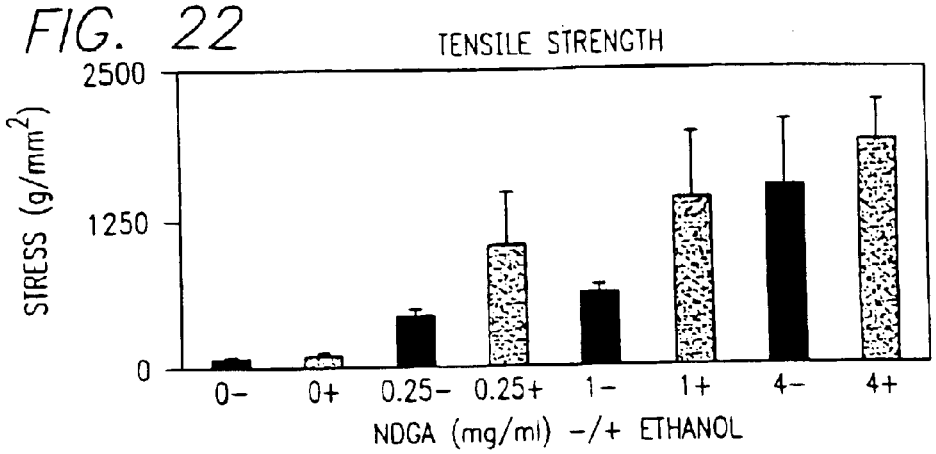
FIGS. 22–24 are bar graphs of various concentrations of NDGA versus tensile strength, stiffness, and strain at failure values, respectively, for a single treatment of collagen with NDGA. N=5 for each bar. Error bars indicate one standard deviation. The "+" and "−" symbols indicate whether the fibers were treated with ethanol.
Figure 23:
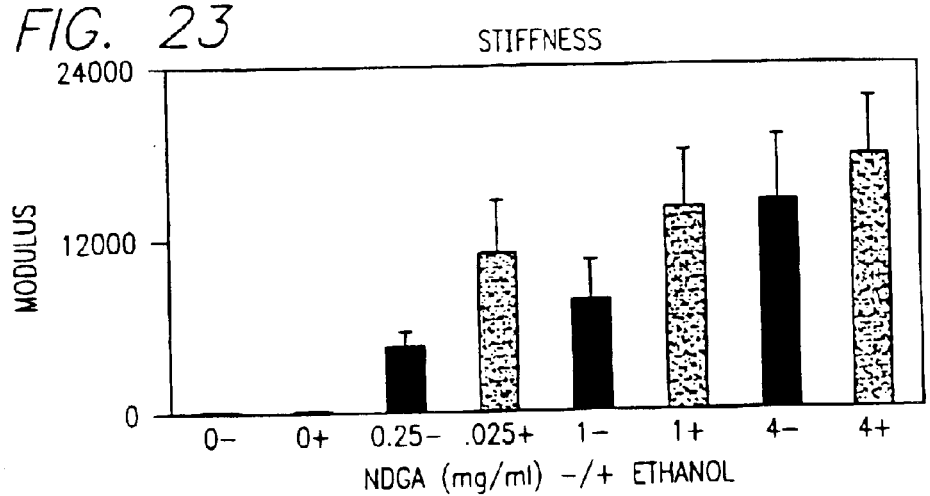
Figure 24:
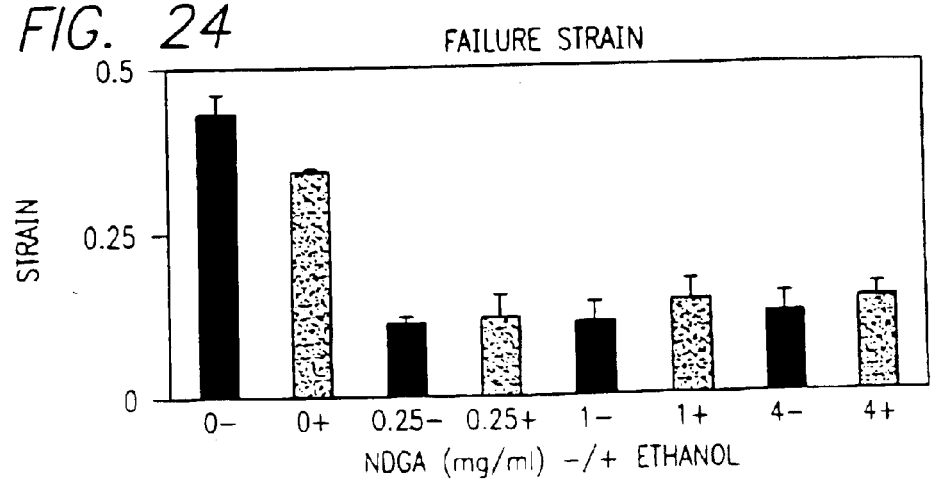
Figure 25:
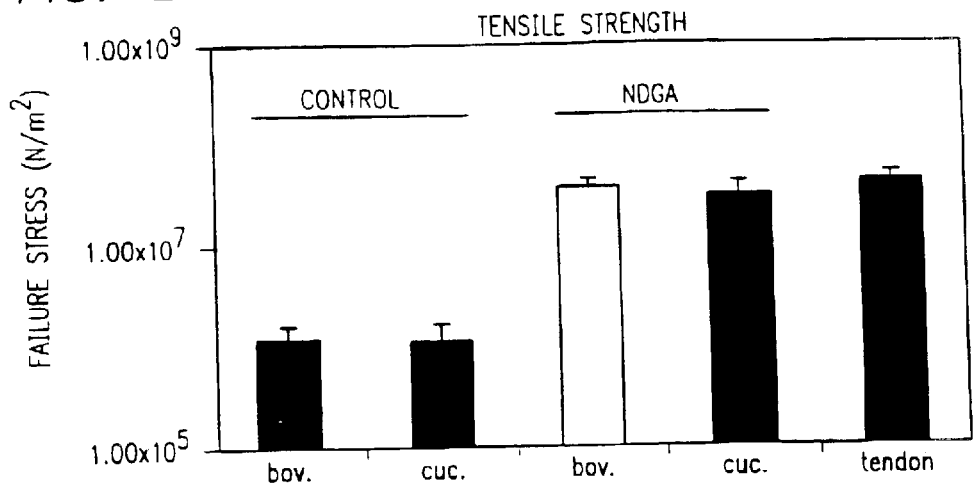
FIGS. 25–27 are bar graphs of tensile strength, stiffness, and strain at failure, respectively, for bovine (bov.) and sea cucumber (cuc.) fibers with and without NDGA treatment. N=5 for each bar. Error bars indicate one standard deviation. The "tendon" values are derived from Kato et al., Biomaterials 10:38–42, 1989.
Figure 26:
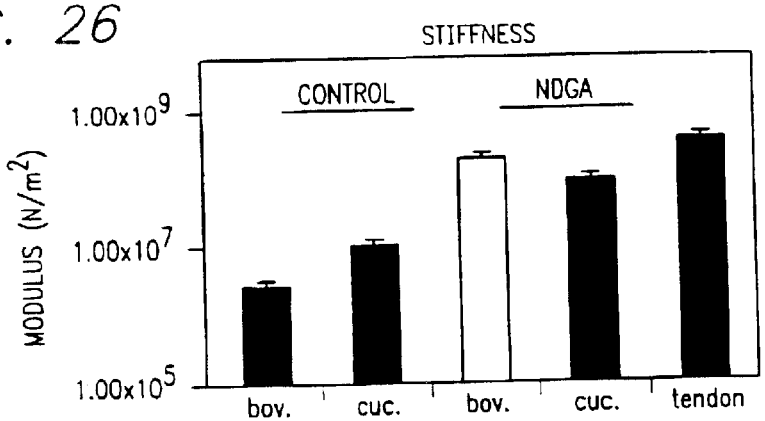
Figure 27:
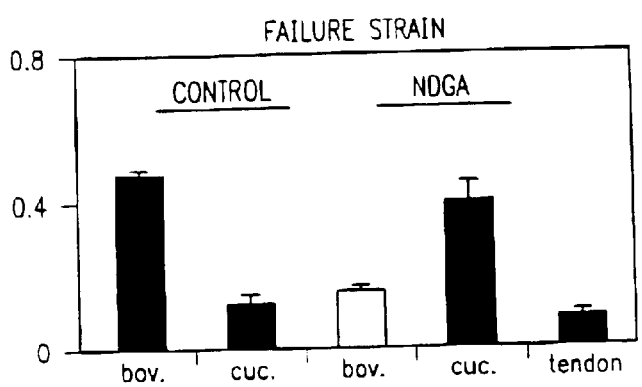

Mechanical properties of washed fibers. Uniaxial tensile tests to failure were performed on fibers with and without ethanol-PBS washes in order to determine whether the post-fabrication processing compromised the mechanical properties of the fibers. Bovine collagen fibers cross-linked with 0.25–4.0 mg/ml NDGA were washed with 70% ethanol as described above and then tested in tension (FIGS. 22–24). Ethanol washing had no effect on the tensile strength and stiffness of control fibers. Ethanol treatment increased the strength and stiffness of fibers cross-linked with 0.25 and 1.0 mg/ml NDGA. Ethanol had no effect on fibers cross-linked with NDGA at 4 mg/ml. These results establish that tensile strength and stiffness are not compromised by eliminating toxic byproducts with ethanol.

In summary, the results of this Example indicated that collagen compositions in which a quinone-containing polymer has been intercalated can be biocompatible.

Example 3

Sea Cucumber Collagen/Polymer Compositions

To determine whether collagen from a source other than bovine tendon could be used to form fibers having beneficial physical properties, collagen was isolated from sea cucumber dermis as described in Trotter et al., Cell Tiss. Res. 275:451–458, 1994. The solubilized collagen was then formed into NDGA cross-linked fibers following the methods described in Example 1, except that the soluble collagen was extruded into water for fibril polymerization, and the fibers dialyzed against 3% acetic acid to facilitate gel formation. Fibers dialyzed against 10 mM calcium chloride also facilitated sea cucumber collagen fibril formation. As a control, bovine tendon collagen fibers were produced using the same methods described in Example 1. The data in FIGS. 25–27 and 30–32 indicated that the polymerization strategy set forth in Example 1 could be applied to collagen isolated from different sources. In addition, the NDGA-treated sea cucumber fibers failed at greater strains than NDGA-treated bovine tendon fibers (Example 1), indicating potential uses for a sea cucumber collagen prosthesis in situations where elongation before failure is beneficial.

Figure 33:
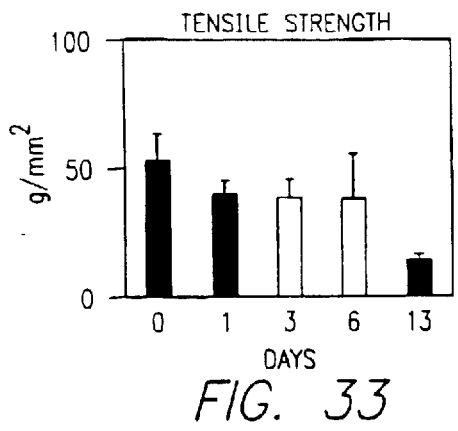
FIGS. 33–35 are bar graphs of days incubation in 3% acetic acid versus tensile strength, stiffness, and strain at failure values, respectively, for sea cucumber collagen/NDGA polymer compositions. Each bar value represents the mean of five fibers±S.D.
Figure 34:
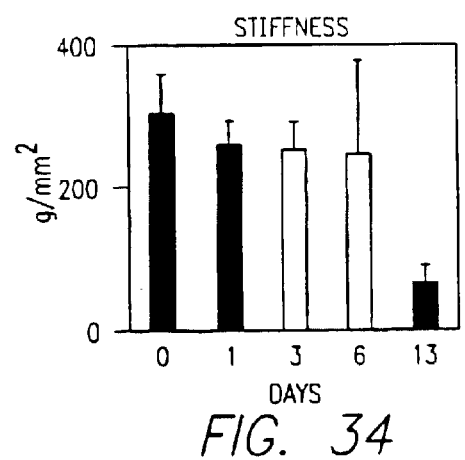
Figure 35:
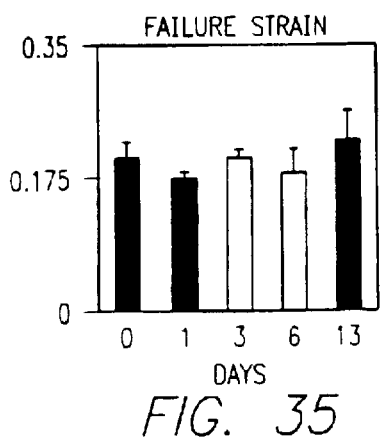

Since different processing parameters may have affected the physical properties of the sea cucumber synthetic fibers, some of these parameters were varied. The physical properties of fibers produced from incubating untreated, extruded fibrils in 3% acetic acid for various times were tested (FIGS. 33–35). The best tensile strength and stiffness values for sea cucumber collagen fibrils were achieved if the gels remained in acetic acid for less than a day before drying and subsequent treatment with NDGA.

Figure 36:
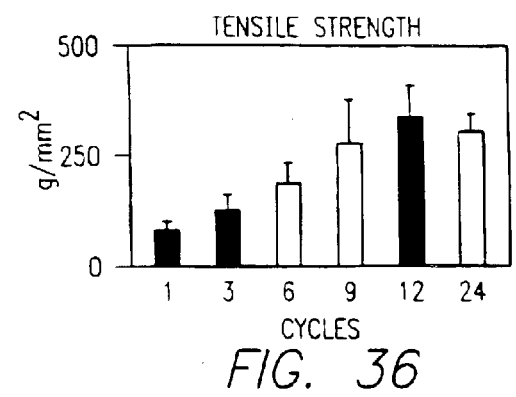
FIGS. 36–38 are bar graphs of the number of hydration/dry cycles versus tensile strength, stiffness, and strain at failure values, respectively, for sea cucumber collagen/NDGA polymer compositions. Each bar value represents the mean of five fibers±S.D.
Figure 37:
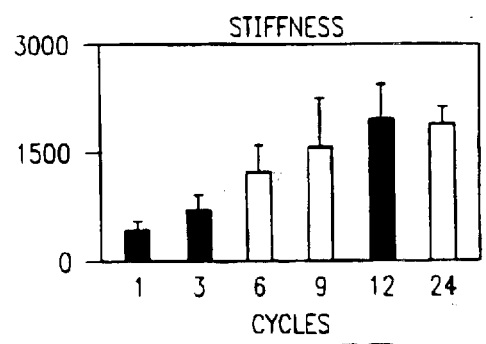
Figure 38:
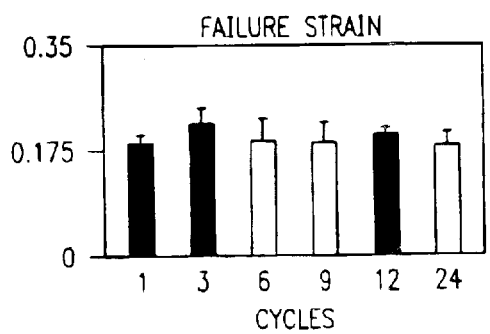

Next, the effect of the number of hydration/dry cycles to which the sea cucumber fibers were subjected before NDGA treatment was examined (FIGS. 36–38). The physical strength of the untreated fibers increased with additional cycles, up to about 12 cycles. This phenomenon was not seen for untreated bovine collagen fibers, the strength of which did not vary depending on the number of hydration/dry cycles.

These results indicate that the optimal conditions for producing collagen/polymer compositions may vary depending on the source of the collagen. However, such optimal conditions are easily determined by simply titrating various conditions, as done in this example.

Example 4

Collagen/Polymer Compositions for Seeding New Tissue Growth

An additional property associated with biocompatibility of collagenous compositions is the ability of a prosthesis to (1) seed migration of fibroblasts into the prosthesis, (2) foster deposition of an appropriate extracellular matrix, and (3) facilitate migration of differentiated cell types appropriate for the tissue to be repaired with the prosthesis. To test whether fibers prepared as described in Example 1 exhibited this property, the fibers were seeded with calf extensor tendon fibroblasts (Example 2) in tissue culture.

Materials and Methods

Materials: Nordihydroguaiaretic acid (NDGA), hyaluronidase, protease (Pronase E), Dulbecco's Phosphate Buffered Saline (DPBS), Dulbeccos's Modified Eagles Medium nutrient mixture F12 Ham (DMEM/Ham F12) and poly(2hydroxyethyl methacrylate) were purchased from Sigma Chemical Co., St. Louis, Mo. Fetal Bovine Serum (FBS) was purchased from GibcoBRL. Collagenase was purchased from Worthington Biochemicals (Freehold, N.J.). All other reagent chemicals were analytical grade and obtained from Sigma Chemical Co. or Fisher Scientific. Pepsin solubilized type I collagen was isolated from fetal bovine tendons and purified as previously described in Example 1.

Preparation of tissue culture wells: 24-well plastic culture dishes were used for all experiments examining fibroblast attachment and replication. Control wells were untreated other than the coating applied by the manufacturer. Wells to be coated with collagen and NDGA cross-linked collagen were loaded with 400 $\mu$l of pepsin solubilized type I collagen (1.8 mg/ml) that had been dialyzed into fibril forming buffer (0.1 M $NaH_2PO_4$, pH 7.0). The culture plate was incubated at 37° C. for 1 hour to initiate fibril collagen formation. The plates were then allowed to dry in the laminar flow hood overnight. The dried collagen-coated plates were rinsed three times with water. Control collagen wells were allowed to dry without further treatment. One half of the hydrated collagen coated wells were next treated with 3 mg/ml NDGA in PBS overnight. The fluid was aspirated off, and the wells were allowed to dry in the laminar flow hood overnight. The wells were then washed for 24 hours with PBS. The PBS was removed, and the wells were washed with 70% ethanol overnight. Following ethanol treatment, the collagen/polymer was allowed to dry overnight in the hood. For most experiments, a second NDGA treatment was performed as described above. Following the coating process, all tissue culture wells were sterilized by a 16-hour treatment with UV light in a laminar flow hood.

A cell attachment inhibitor, poly(2-hydroxyethyl methacrylate) (PMA), was used in the attachment experiments to verify that fibroblasts were attaching to the various surfaces. The plastic, collagen, and NDGA-treated collagen surfaces were treated with PMA according to the manufacturer's instructions. PMA was dissolved in 95% ethanol at 40 mg/ml, and 200 $\mu$l/well was used to treat the surfaces. Preliminary experiments established that 200 $\mu$l of a 40 mg/ml solution of PMA was optimal for inhibiting tendon fibroblast attachment.

Preparation of NDGA cross-linked fibers: Fibers produced from purified pepsin-solubilized type I fetal bovine tendon collagen were prepared by extrusion and drying as described in Example 1. Dried fibers were hydrated in PBS for 30 minutes. Fibers were then treated with 30 mg/ml NDGA, which was suspended in 1 N NaOH. Complete solubilization of NDGA required addition of 10 $\mu$l 10 N NaOH. One milliliter of the NDGA solution was added directly to the phosphate buffer, in which the fibers were suspended, to a final concentration of 3 mg/ml. The fibers were agitated in the NDGA solution for 24 hours at room temperature. In some experiments, the fibers were thoroughly washed with 70% ethanol in water, followed by extensive washing with PBS. Subsequent treatments with NDGA were performed as above. Control and NDGA cross-linked fibers were sterilized by a 16-hour treatment under WV light.

Cell culture: Digital extensor tendons were obtained fresh as described in Example 2. For experiments examining the capacity of fibroblasts to migrate and replicate on the NDGA cross-linked fibers, an extensor tendon explant system was employed. Full thickness calf tendons were sectioned into 1 cm long segments. A 4 cm long fiber was inserted through the middle of the explant using a spinal tap needle. A section (1.5 cm) of the fiber extended from both of the cut ends of the tendon. Explants were cultured in glass culture bottles up to eight weeks in DMEM/Ham F12 medium containing 10% FBS. Glass culture bottles were selected so as to avoid migration of fibroblasts onto the culture dish. At weekly intervals up to nine weeks, the fiber extending from one end of the explant was removed with a scalpel. The explant was divided up into three segments, each of which were analyzed separately for the number of attached fibroblasts. The explant with the remaining fiber at the opposite end was fixed in neutral buffered formalin for histological analysis.

Measurement of cell number: To measure the number of fibroblasts on the test surfaces, a CYQUANT® Cell Proliferation Assay kit was used. Medium was removed from the culture wells, the surfaces were briefly washed with DPBS to remove unattached cells, the lysis buffer was added to the wells, and the culture plate was frozen and thawed. DNA content in diluted aliquots of the lysis buffer was measured with the CYQUANT® assay.

Histology: Tendon explants with inserted fibers were fixed in neutral buffered formalin for at least 24 hours. Fixed specimens were dehydrated with an ethanol series and infiltrated with paraffin. Sections (5 mm) were stained with H & E to visualize fibroblasts attached to the control and cross-linked fibers.

Mechanical tests: Performed as described in Example 2.

Results

Figure 61:
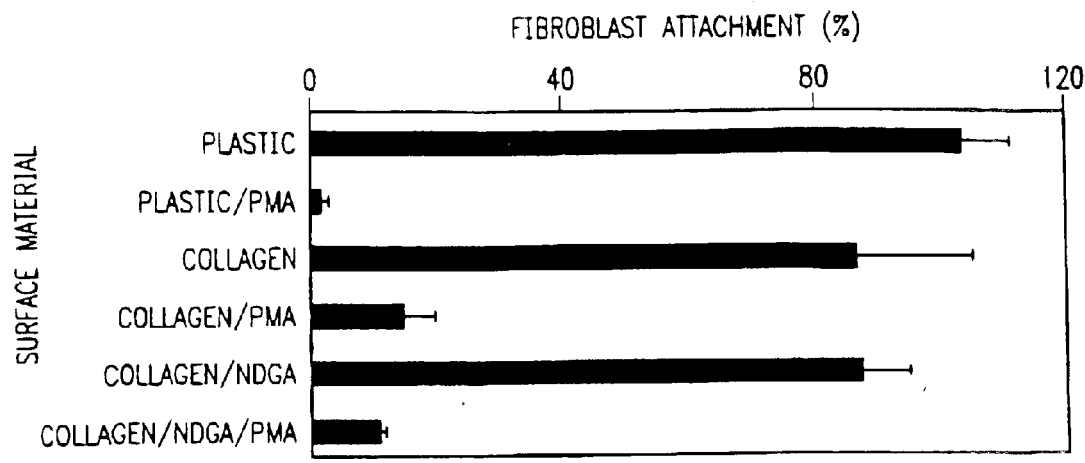
FIG. 61 is a bar graph of untreated (plastic) and treated tissue culture wells versus percentage fibroblast attachment. Error bar represent±S.D. (N=5).

Fibroblast attachment: The capacity of tendon fibroblasts to attach to the plastic culture plate wells, collagen-coated wells, and NDGA-treated collagen-coated wells was assessed using standard attachment assays as described in this Example. To verify that the assay measured attachment, additional culture wells containing the three surfaces were treated with the attachment inhibitor PMA. Fibroblasts (500,000 cells/well) were plated onto culture wells and allowed to attach for 24 hours. The number of cells attached was determined after washing the plates with DPBS (FIG. 61). 100% of the fibroblasts attached to the tissue culture treated plastic wells. PMA inhibited attachment to the plastic surface by 98%. An average of 86% of the fibroblasts attached to the wells coated with collagen fibrils. PMA reduced attachment to collagen to 14%. An average of 87% of the cells attached to the NDGA treated collagen fibrils. PMA reduced attachment to this surface to 10%. These results establish that tendon fibroblasts attach equally well to native collagen fibrils and NDGA cross-linked native collagen fibrils.

Figure 62:
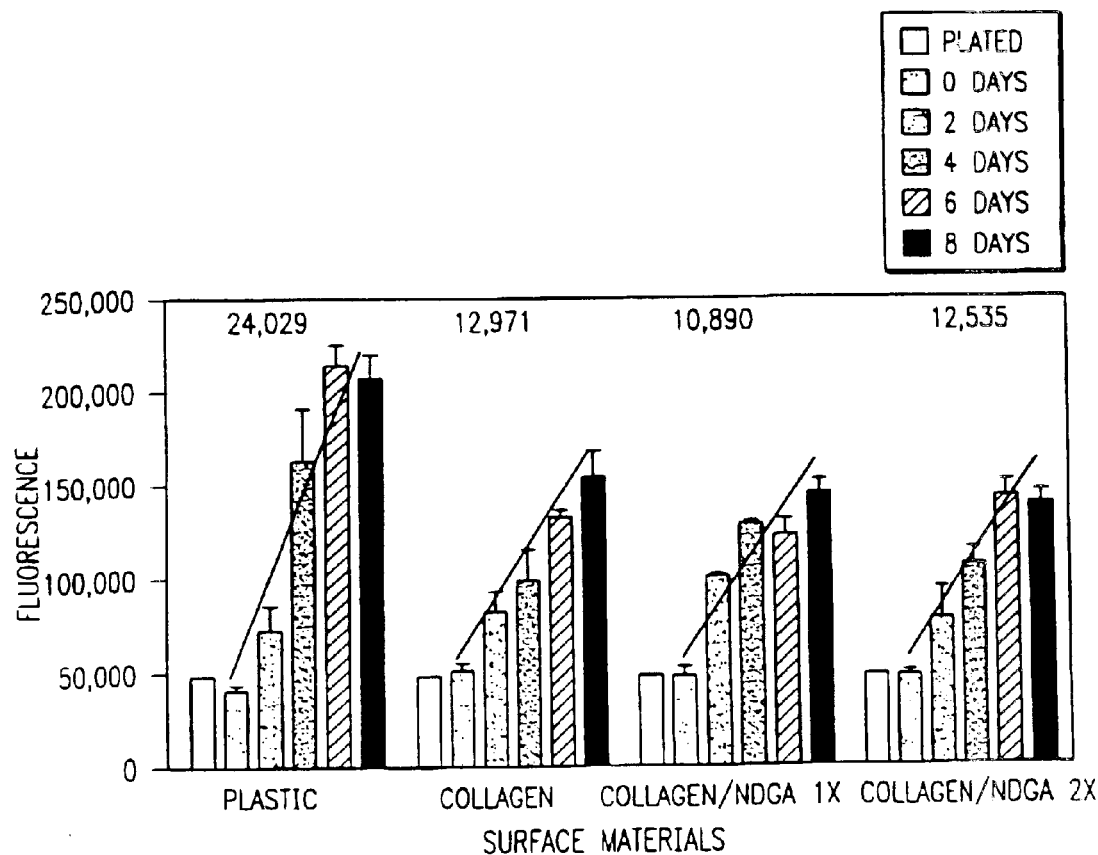
FIG. 62 is a bar graph of untreated (plastic) and treated tissue culture wells versus fluorescence, an indicate of live cells, using the CYQUANT® assay. Error bar represent±S.D. (N=4). The lines above the bars represent the linear regression analysis of the data. The slope value for each line is indicated above each group of bars.
Figure 63:
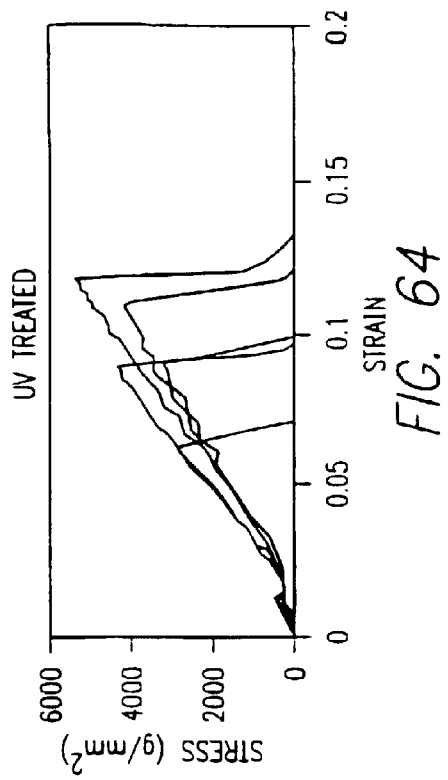
FIGS. 63 and 64 are stress/strain curves for control and UV-treated collagen/polymer fibers. Five of each type of fiber was examined.
Figure 64:
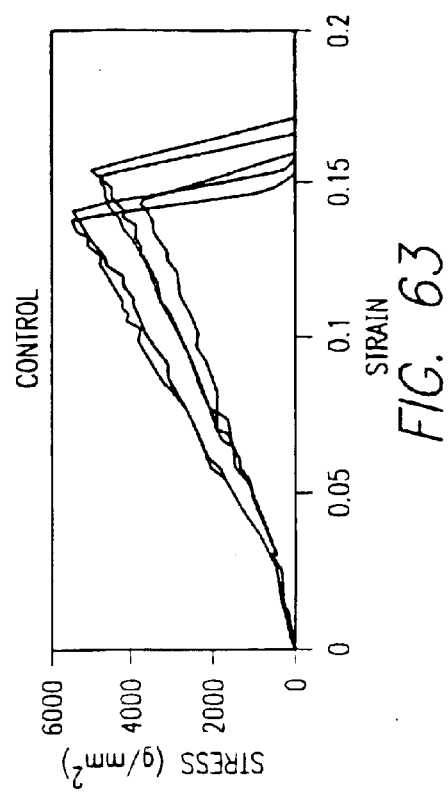
Figure 65:
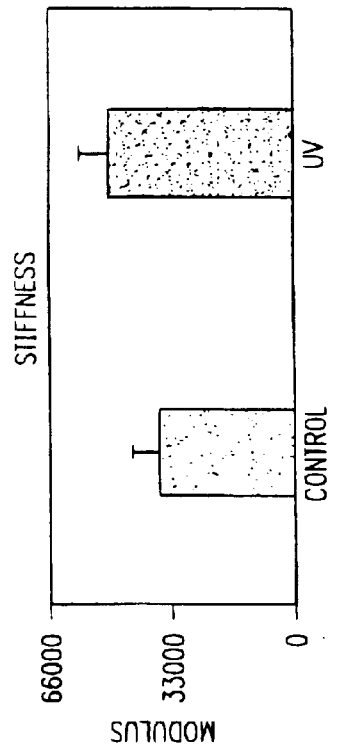
FIGS. 65 and 66 are bar graphs of control and UV-treated collagen/polymer fibers, calculated from the curves in FIGS. 63 and 64. Each value is a mean of five specimens±S.D.
Figure 66:
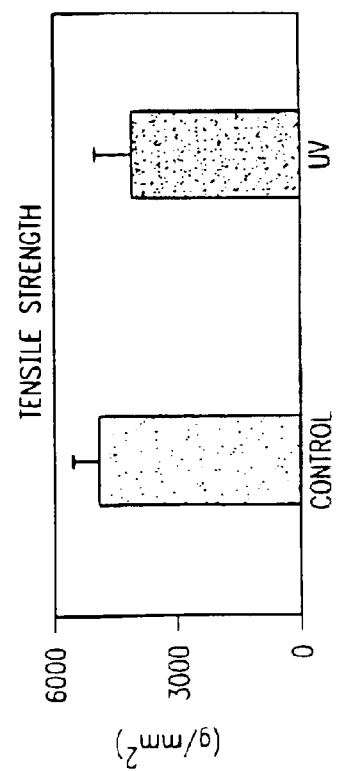

Fibroblast proliferation: Tendon fibroblasts (50,000 cells/well) were plated on plastic culture dishes and culture dishes coated with collagen fibrils or NDGA-treated collagen fibrils. Fibroblasts were allowed to attach for 24 hours, at which time the unattached cells were removed. The number of attached fibroblasts were determined (day 0). The attached cells were subsequently cultured for 2, 4, 6, or 8 days. After 24 hours and at each time point thereafter the number of cells was determined (FIG. 62). Equal numbers of fibroblasts attached to all surfaces after the first 24 hours. Fibroblasts exhibited the greatest proliferation rate on the tissue culture treated plastic. The number of fibroblasts on the untreated collagen and NDGA-treated collagens increased approximately 3 fold during the 8 days in culture. Proliferation rates were essentially identical in the three groups, indicating that NDGA treatment did not diminish tendon fibroblast proliferation on type I collagen fibrils.

Fibroblast morphology: Phase contrast microscopy of the fibroblasts attached to the three culture surfaces after 8 days in culture indicated that the cells on NDGA-treated collagen were healthy, with an appearance comparable to cells grown on untreated wells.

Fibroblast migration and proliferation on fibers embedded in tendon explants: Control and NDGA cross-linked collagen fibers were embedded in calf extensor tendon explants with 1 cm of the fiber extending from both cut ends. The explants were cultured for 1, 2, 3, 4, 6 and 9 weeks. At each time point, the portion of the fiber that extended out from the tissue was removed from the explant. The fiber was dissected into three specimens to determine the number of fibroblasts that had colonized each region of the fiber. Cells first appeared on the section of the fiber adjacent to the tendon indicating that the origin of the cells was the tendon itself, rather than cells suspended in the medium. The number of cells on more distal sections increased subsequent to the appearance of fibroblasts on the most proximal section. The number of fibroblasts on all sections continued to increase during the nine weeks in culture.

Histological assessment of the colonized control and cross-linked fibers confirmed the quantitative analyses described above. By three weeks in culture, a layer of fibroblasts was attached to the surface of control and NDGA-treated fibers. After nine weeks in culture, the surface of the fiber was populated by a layer of fibroblasts nearly ten cells thick. No differences were detected between the cell layer on the control collagen fiber and that on the NDGA-treated fiber.

The principal source of the fibroblasts that colonized the fibers appeared to be the epitenon. A continuous layer of cells coursed from the sectioned end of the tendon to the tip of the fiber. The morphology and staining characteristics of these cells matched those of the fibroblasts in the epitenon.

Effect of UV treatment on fibers: In order to eliminate the possibility of bacterial contamination derived from the collagen and cross-linking procedure, collagen coated wells and fibers were first treated with 70% ethanol and then exposed to UV light for 16 hours in a laminar flow culture hood. It had been shown that the ethanol treatment does not attenuate the mechanical properties of the fibers (see Example 2). However, UV light could have affected the polymer, altering the solubility of polymer adducts or changing the polymer chemistry. Given the results described above, however, UV treatment did not liberate toxic by-products, since fibroblasts readily colonized these fibers. The tensile properties of UV treated fibers compared to control fibers are shown in FIGS. 63–66. The tensile strength of the UV treated fibers averaged 4090±901 g/mm$^2$, compared to 4832±684 g/mm$^2$ for the control fibers. The elastic modulus of the UV treated fibers averaged 51,286±7,539, compared to 37,563±6,593.

These observations demonstrate that tendon fibroblasts can colonize collagen/polymer compositions. Moreover, the fibroblasts do not merely "cap" the ends of the synthetic fibers but continue to replicate in association with the fiber. Thus, the collagen/polymer compositions can serve as scaffolds for tendon repair.

Example 5

Durability of Collagen/Polymer Compositions

Figure 28:
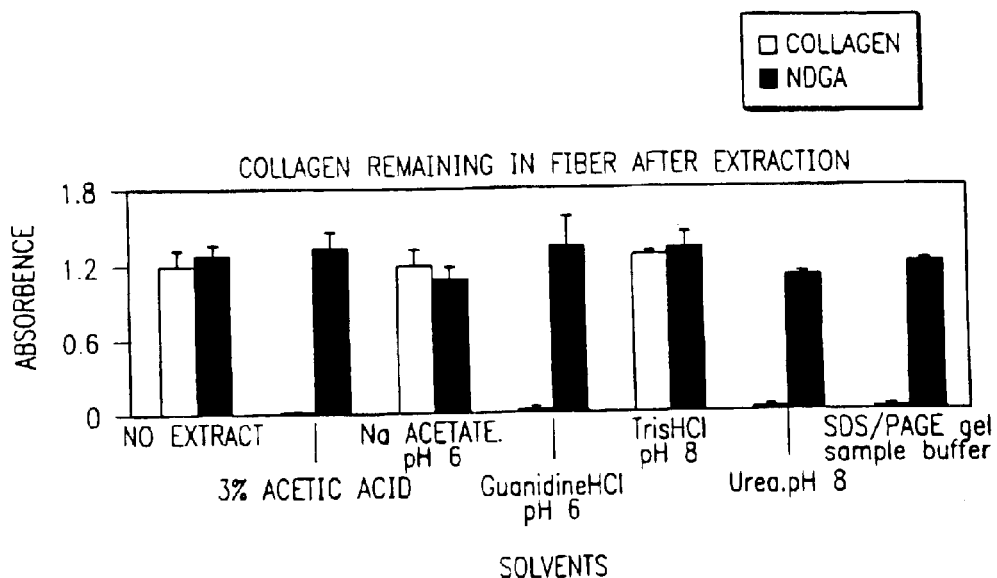
FIGS. 28 and 29 are bar graphs of absorbance, which is correlated to the amount of collagen remaining in a synthetic fiber, after extraction with various solvents (FIG. 28) or after various treatments (FIG. 29). Each bar represents the mean of five fibers±S.D.
Figure 29:
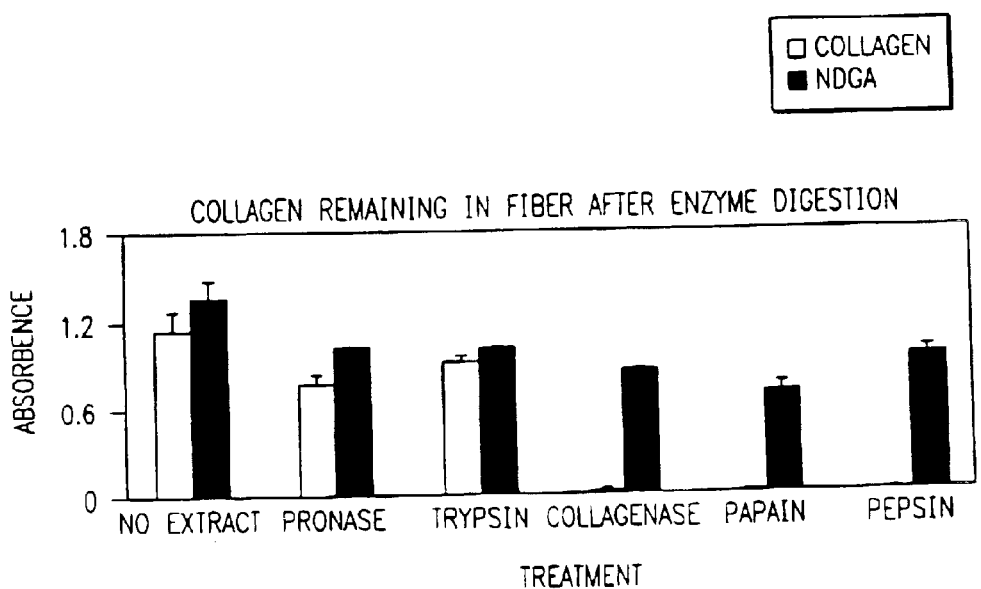
Figure 30:
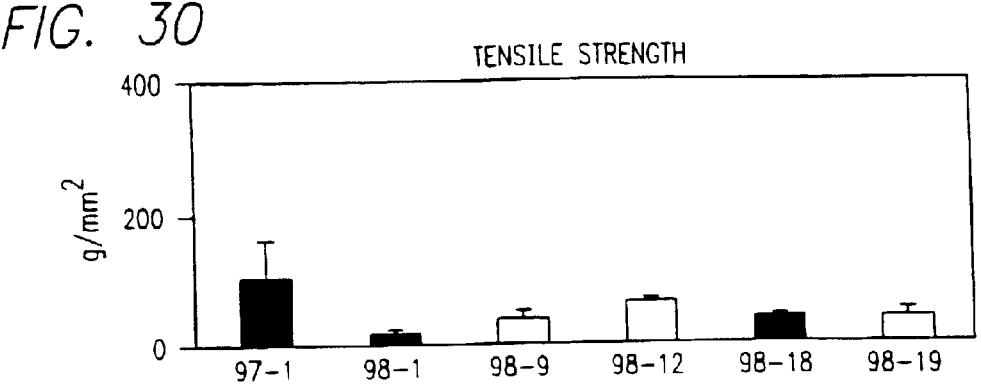
FIGS. 30–32 are bar graphs of various samples of sea cucumber collagen/NDGA polymer compositions versus tensile strength, stiffness, and strain at failure values, respectively. Each bar value represents the mean of five fibers±S.D. The numbered designations below the bar specify a particular batch of fibers.
Figure 31:
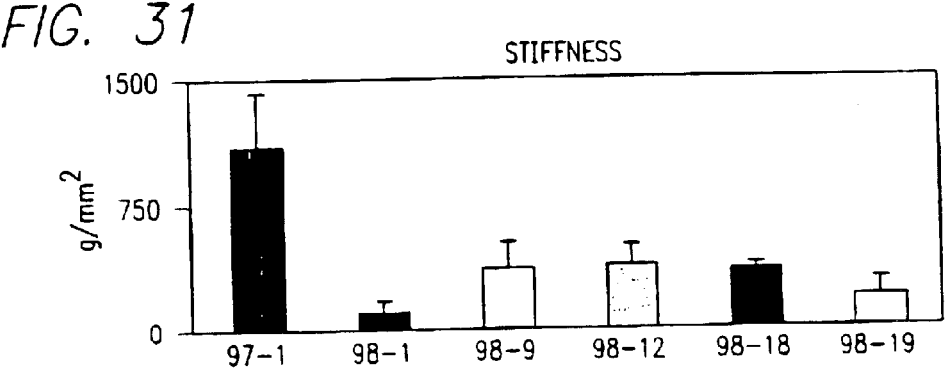
Figure 32:
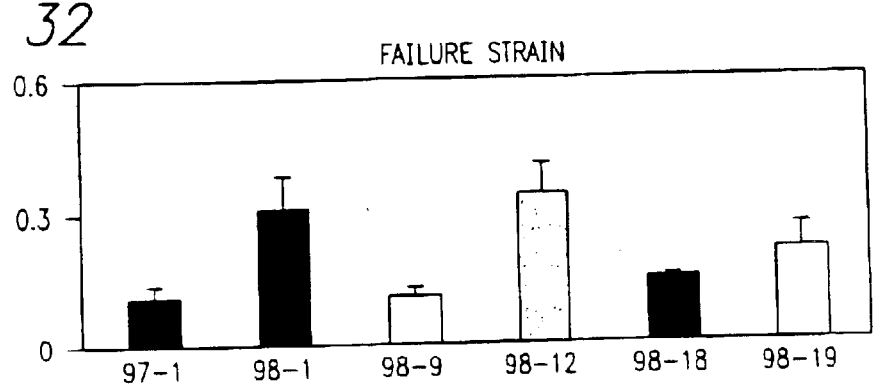

To assess the durability of collagen/polymer compositions, synthetic fibers containing polymerized NDGA were produced using the methods described in Example 1 and subjected to various extractions with chaotropic agents (FIG. 28) or to various proteolytic treatments (FIG. 29). The NDGA-treated collagen was highly resistant to solubilization and to proteolytic digestion, even under conditions that removed almost all of the collagen in the untreated fibers.

The results of this Example indicated that the collagen/polymer compositions described herein were highly resistant to the biochemical and cellular degradation after implantation in vivo and to chemical manipulation before implantation.

Example 6

Increasing the Efficiency of Polymer Formation

Since the NDGA treatment took 24 to 48 hours to produce a strengthened collagen fiber (Example 1), attempts were made to reduce the time of the treatment. Bovine collagen fibers were produced as described in Example 1, except that 0.1M sodium meta-periodate in 0.1 M $NaH_2PO_4$, pH 7.0 was added to the NDGA polymerization reaction, and the polymerization reaction was performed for only 10 minutes. The periodate compound was added to facilitate oxidation of the catechol groups and likely increased the concentration of oxygen radicals in the reaction. Thus, based on the expected chemical mechanisms at work in the polymerization process (detailed above), the increased oxygen radicals should efficiently catalyze formation of polymers.

Figure 39:
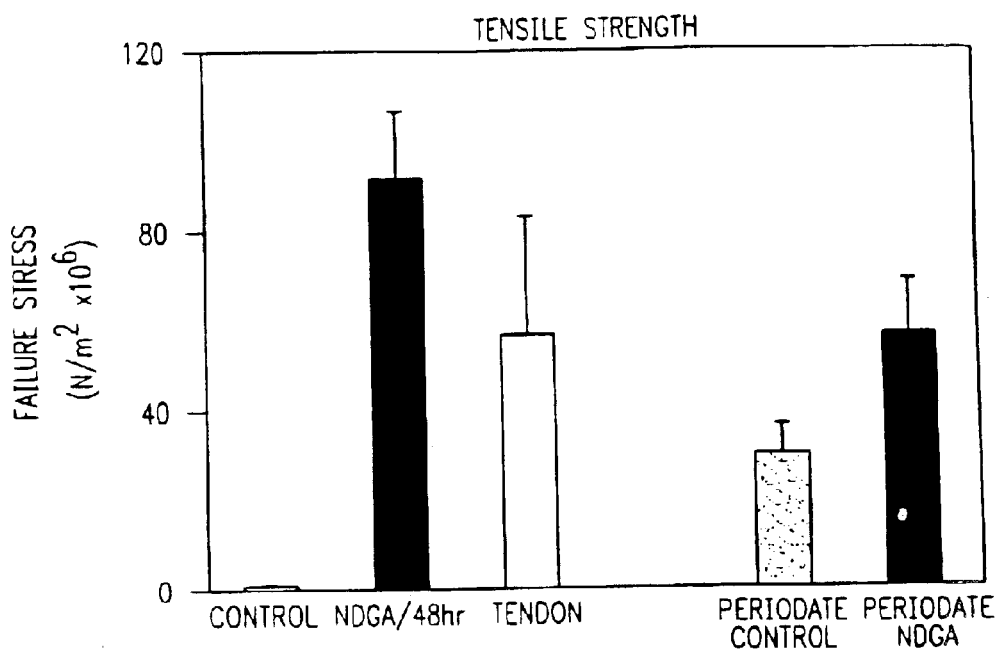
FIGS. 39 and 40 are bar graphs of different polymerization treatments versus tensile strength or stiffness values, respectively. Each bar value represents the mean of five fibers±S.D.
Figure 40:
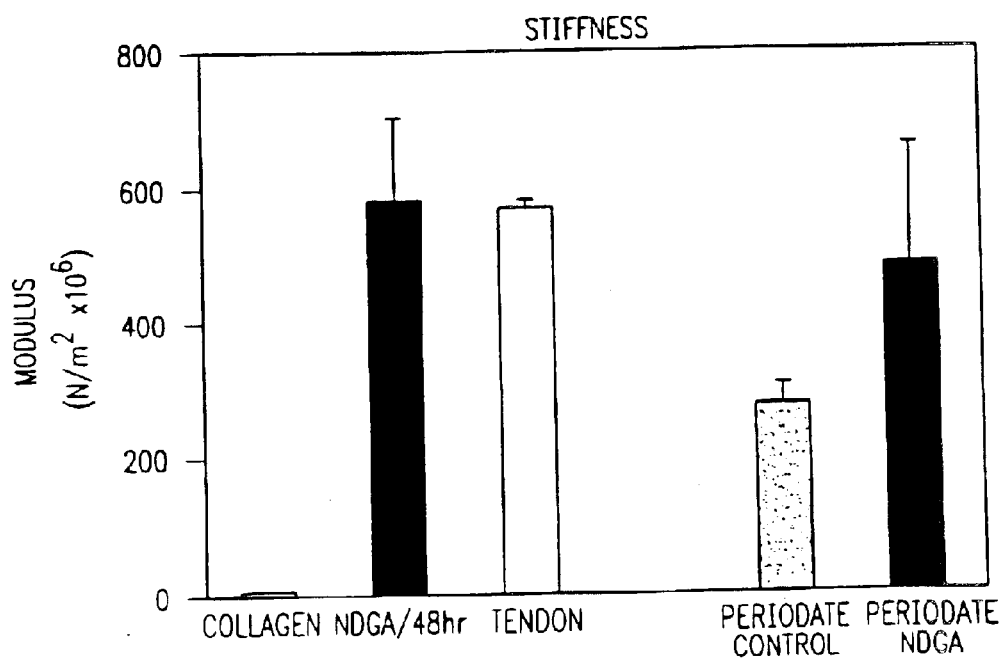
Figure 41A:
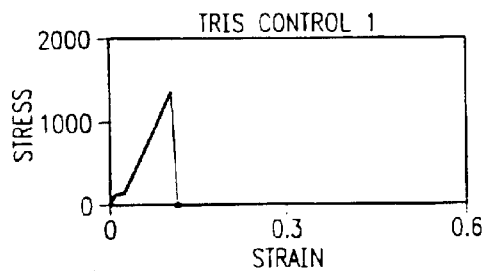
FIGS. 41A–41H are strain versus stress curves for NDGA-treated collagen fibers (FIGS. 41A, 41C, 41E, and 41G) and NDGA-treated collagen fibers plasticized with urea (FIGS. 41B, 41D, 41F, and 41H).
Figure 41B:
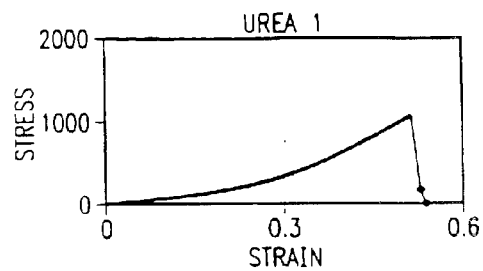
Figure 41C:
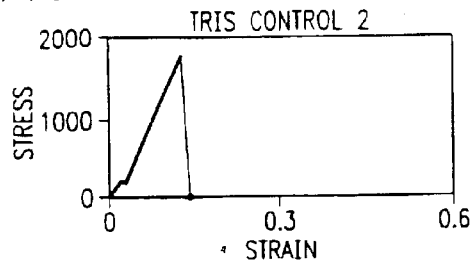
Figure 41D:
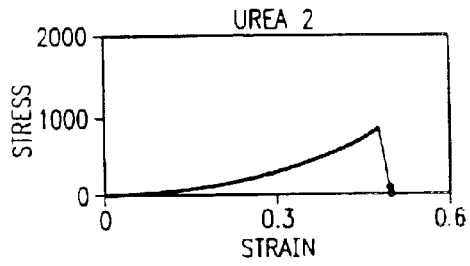
Figure 41E:
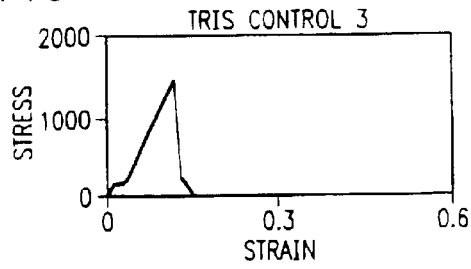
Figure 41F:
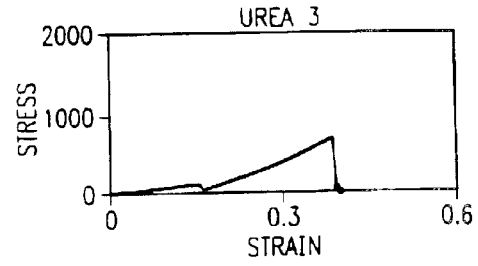
Figure 41G:
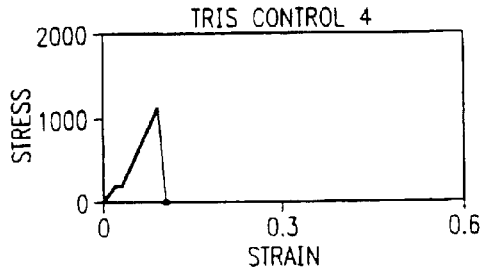
Figure 41H:
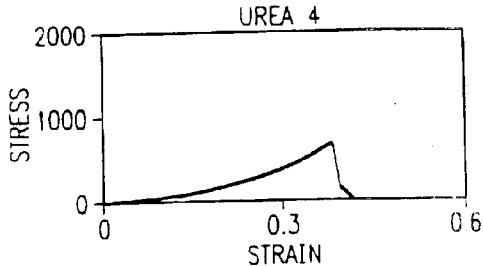

The data in FIGS. 39 and 40 indicate that periodate polymerization for 10 minutes produced strong fibers. Thus, the addition of periodate substantially reduced the amount of time required for the polymerization process.

Example 7

Plasticizing NDGA-Treated Collagen/Polymer Fibers

To explore the feasibility of modifying the tensile properties of collagen/polymer compositions, NDGA-treated bovine collagen fibers were produced as described in Example 1. The fibers were then incubated in 1 M urea, 0.1 M Tris, pH 8, for 18 hours. The stress and strain values of four fibers treated in this manner (FIGS. 41B, 41D, 41F, and 41H) were compared to four fibers without urea treatment (FIGS. 41A, 41C, 41E, and 41G). The most dramatic effect was a 4-fold increase in the strain at failure value, from 11% to 44%. Fiber stiffness was reduced by about 85%, while the tensile strength was decreased by about 40%. These results indicate that post-polymerization treatments, such as with urea, can modulate the physical characteristics of collagen/polymer compositions.

Example 8

Use of Different Catechol-Containing Compounds

To evaluate whether compounds other than NDGA were useful in the polymerization methods described in Example 1, different catechol-containing compound were substituted for NDGA in those methods. The compounds tested were 2,3-dihydroxybenzaldehyde (2,3-DHB), 3,4-dihydroxybenzaldehyde (3,4-DHB), rosemarinic acid (RMA), and a 4-arm catechol (4-arm) having the following structure.

Example 9

Use of Naturally Structured Collagen Fibers

Figure 44:
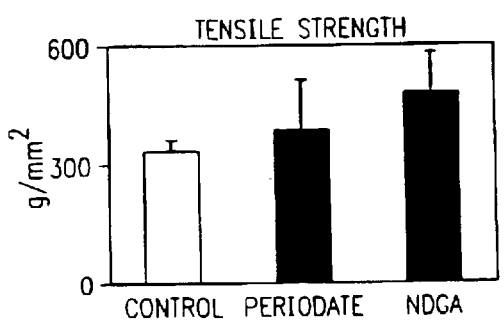
FIGS. 44 and 45 are bar graphs of porcine pericardium untreated, treated with periodate only, and treated with periodate and NDGA versus tensile strength and stiffness values, respectively. Each bar value represents the mean of five fibers±S.D.
Figure 45:
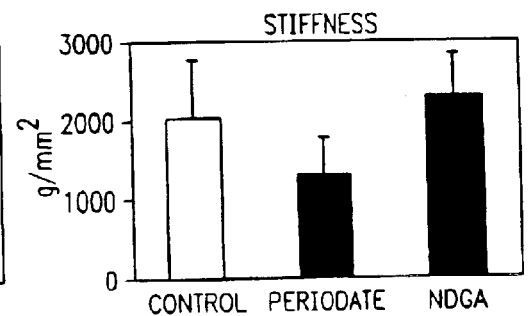

To determine whether catechol-containing compounds can infiltrate natural, structured collagenous tissue and confer beneficial properties to the tissue upon polymerization, fresh calf extensor tendons and porcine pericardium were treated with NDGA. The tendon and pericardium were saturated with NDGA in DMSO. Tissues were then treated for 10 minutes with 0.1M $NaIO_4$ and washed immediately with PBS and 70% ethanol. FIGS. 44 and 45 show the physical properties of natural, periodate-treated, and NDGA/periodate-treated pericardium. The polymerization reaction increased the tensile strength and the stiffness of the pericardium.

Figure 46:
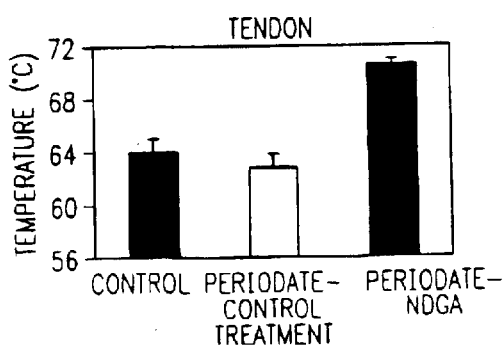
FIGS. 46 and 47 are bar graphs of different treatments versus temperature for calf digital extensor tendon and porcine pericardium, respectively. Each bar value represents the mean of five fibers±S.D.
Figure 47:
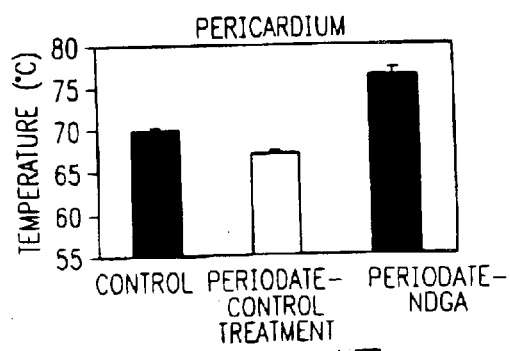

FIGS. 46 and 47 show that the NDGA treatment also increased the shrinkage temperature of both the tendon and the pericardium, indicating that the general level of crosslinking in the collagenous materials was increased by the NDGA treatment. The shrinkage temperature of native tendon was raised from 64.0° C. to 70.5° C., while the shrinkage temperature of the native porcine pericardium was raised from 69.5° C. to 75.7° C.

Figure 48:
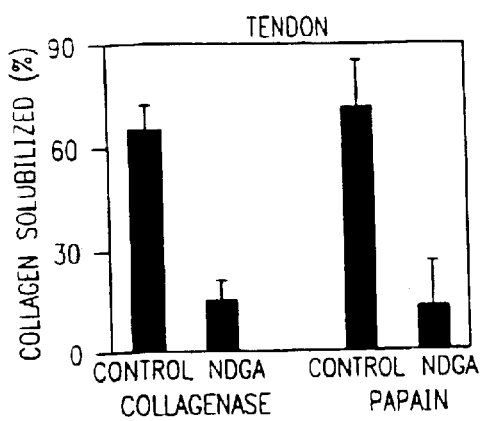
FIGS. 48 and 49 are bar graphs of different treatments versus percentage of collagen solubilized for calf digital extensor tendon and porcine pericardium, respectively. Each bar value represents the mean of five fibers±S.D.
Figure 49:
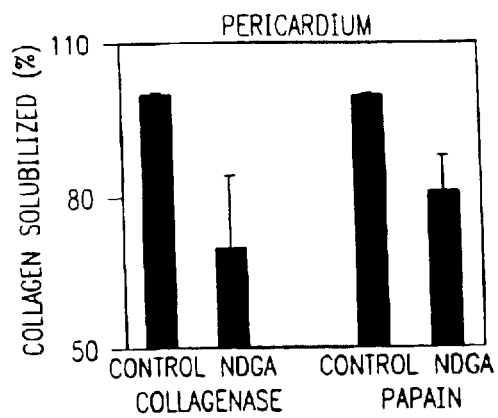

Finally, control and NDGA-treated tissues were digested with bacterial collagenase and papain for 24 hours. The solubilized collagen was separated from the tissue residue by centrifugation, after which each sample was hydrolyzed in 6N HCl. Hydroxyproline was measured calorimetrically in the acid hydrolysates. The results are summarized in FIGS. 48 and 49. Collagenase solubilized 65% of the untreated tendon, but only 15% of the NDGA-treated tendon. Papain degraded 71% of the control tendon, while only 12% of the NDGA-treated tendon was degraded. Similarly, collagenase and papain completely solubilized the untreated pericardium, and NDGA treatment reduced collagenase degradation by 30% and papain degradation by 20%.

The results of this Example indicate that fully formed, freshly harvested collagenous materials can be physically improved by infiltration and polymerization of a compound containing a catechol group. This is especially useful for treating xenographs for human use.

Example 10

Collagen/Polymer Prosthesis

To determine whether other materials could be integrated into the collagen/polymer compositions to form a prosthesis,

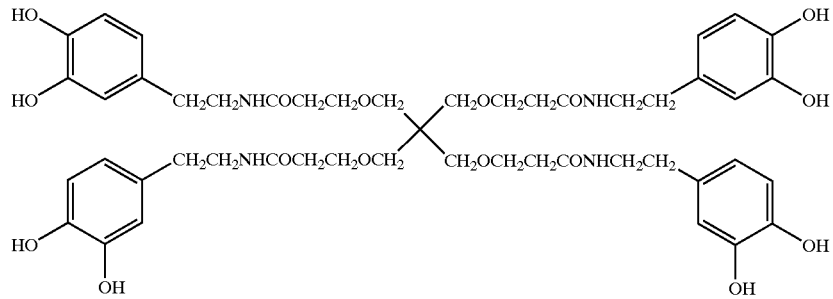

Figure 42:
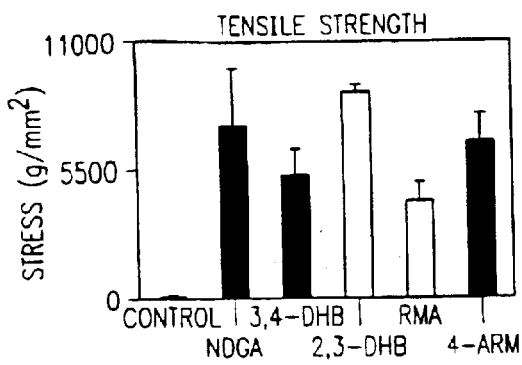
FIGS. 42 and 43 are bar graphs of fibers formed using different polymerizable compounds versus tensile strength and stiffness values, respectively. Each bar value represents the mean of five fibers±S.D.
Figure 43:
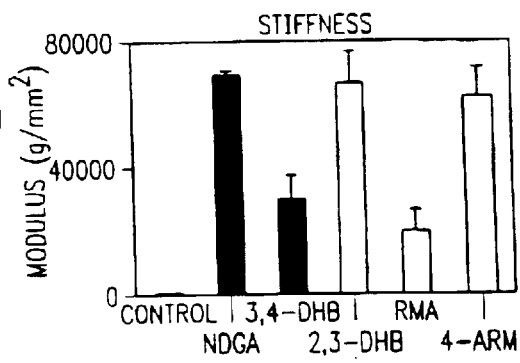
Figure 50:
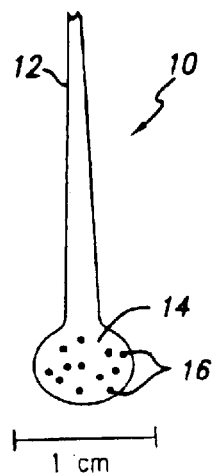
FIG. 50 is a plan view of a prosthesis of the invention.

FIGS. 42 and 43 summarize the tensile strength and stiffness of fibers formed using these various compounds. All of the catechol-containing compounds increased both the tensile strength and the stiffness of collagen fibers, albeit to different degrees.

hydroxyapatite crystals were integrated into an NDGA-treated bovine collagen fiber using the methods described in Example 1, except that hydroxyapatite crystals were mixed with the neutralized collagen molecules prior to fibril formation at 37° C. Referring to FIG. 50, prosthesis 10 contained an elongated shaft 12. A bulbous anchor 14 at one end of shaft 12 had embedded within it hydroxyapatite crystals 16.

Standard pull-out tests were performed on prosthesis 10 to determine whether the prosthesis could provide mechanically competent attachment. A polyethylene holder was fashioned to mimic an insertion site in bone similar to that utilized for surgical tendon transfer and repair of avulsed tendons. Prosthesis 10 was threaded through a conical hole, the angle of which matched the taper angle of the end of the fiber. The fiber was pulled to failure while recording the force. The fiber itself fractured before the end was pulled out of the holder, indicating that anchor 14 was stronger than shaft 12 of prosthesis 10. Failure occurred just above anchor 14, and the failure load for prosthesis 10 was higher than that of control fibers lacking hydroxyapatite. This result indicates that prostheses containing or formed of collagen/polymer compositions can be designed and tested for physical properties.

Example 11

Gelatin/Polymer Compositions

Figure 51:
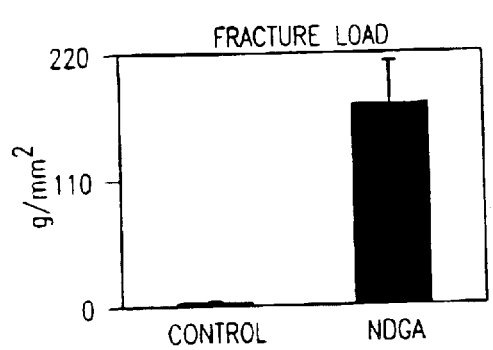
FIGS. 51 and 52 are bar graphs showing the fracture load and stiffness, respectively, for untreated and NDGA-treated gelatin disks. Each bar value represents the mean of five fibers±S.D.
Figure 52:
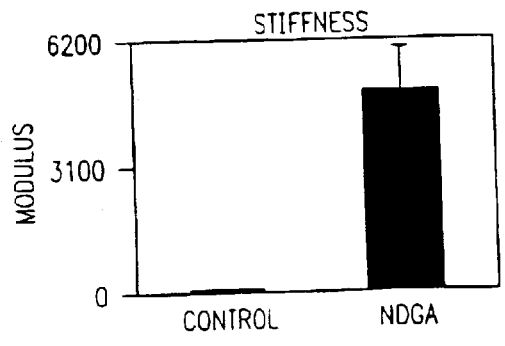
Figure 53:
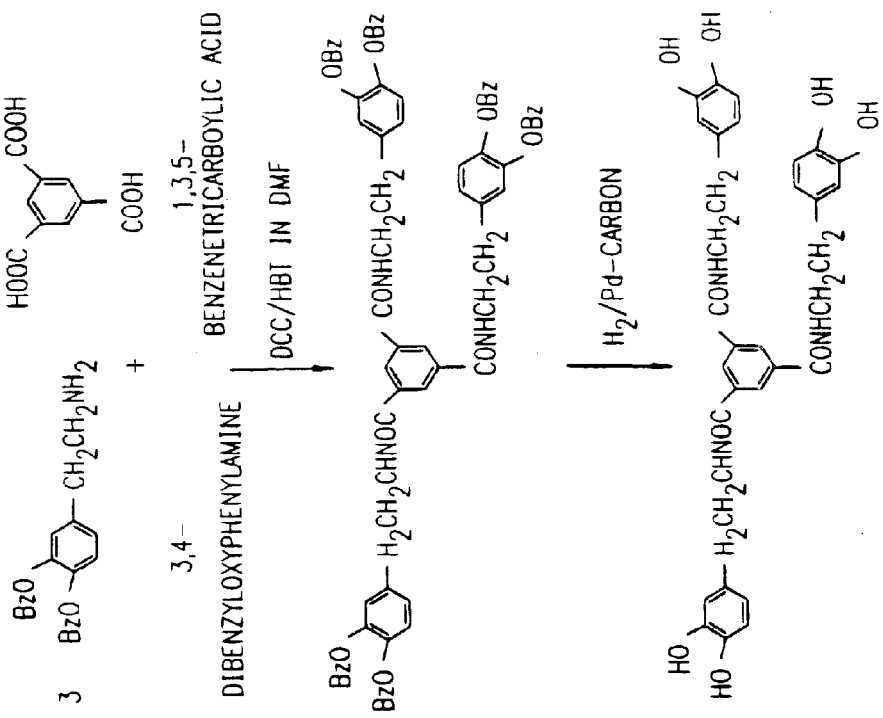
FIGS. 53–56 are synthetic schemes for 2-arm, 3-arm, 4-arm, and 9-arm monomeric compounds.
Figure 54:
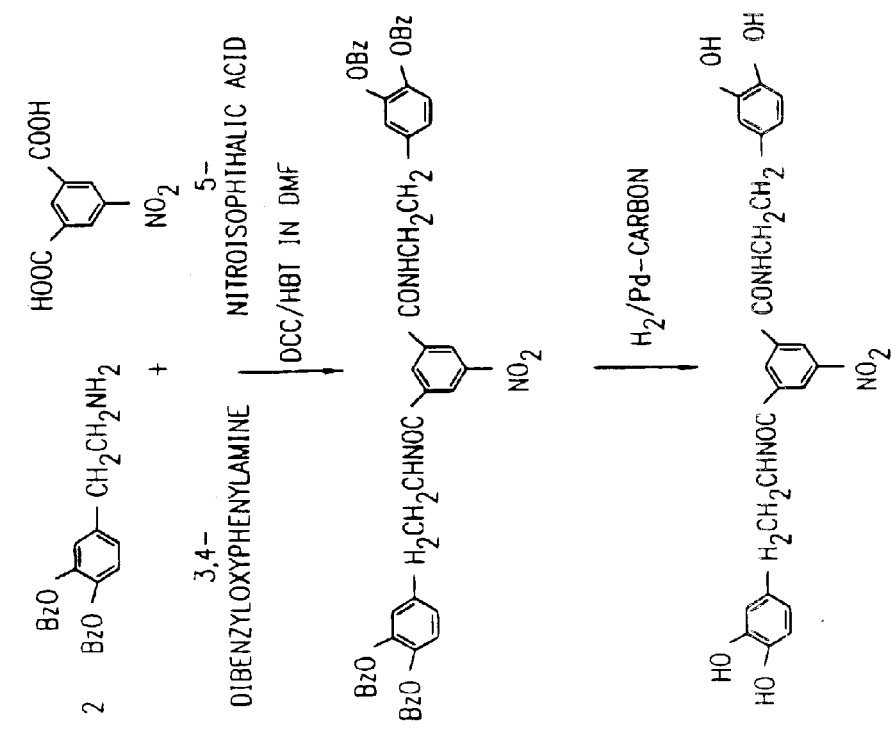
Figure 55:
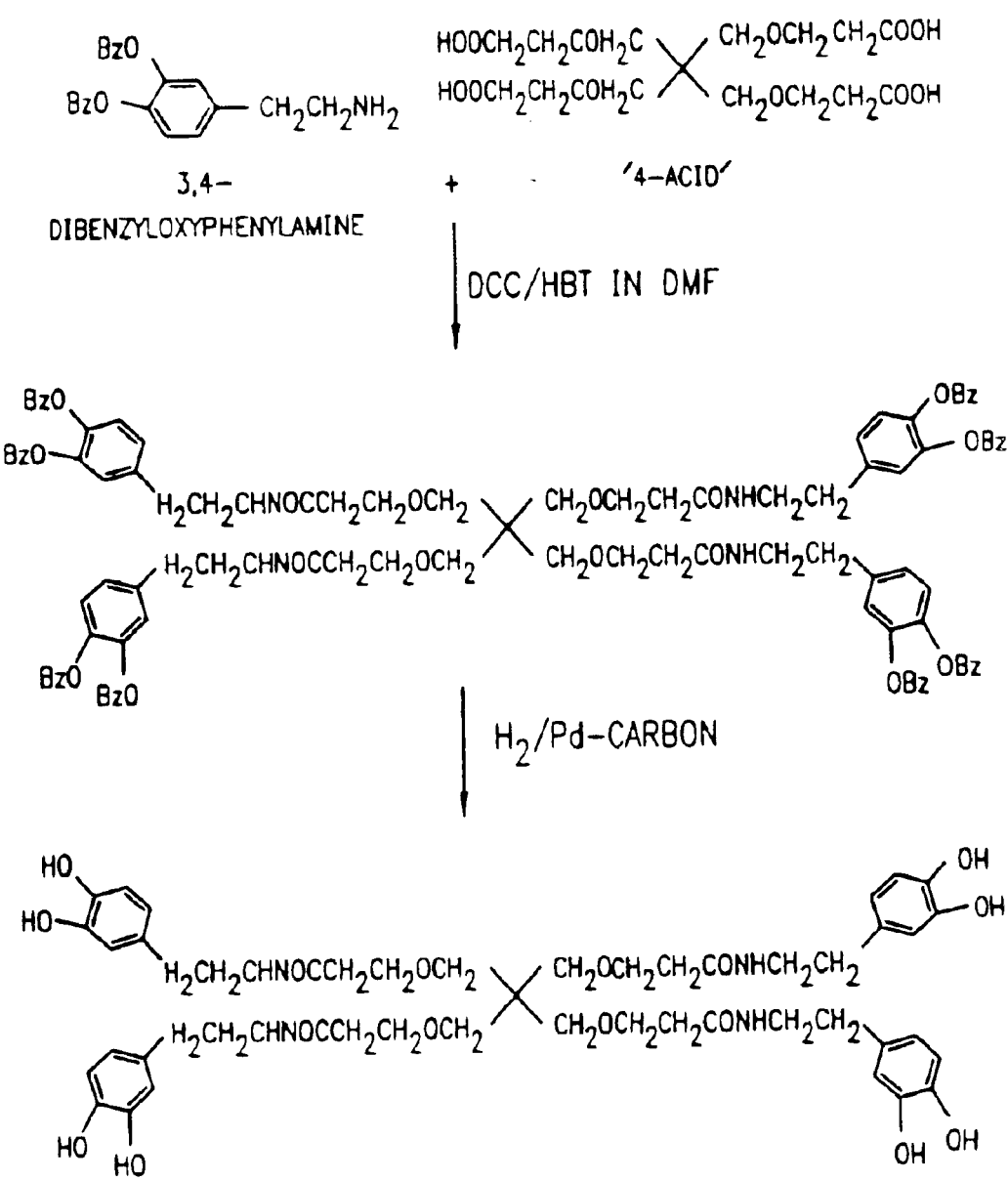
Figure 56:
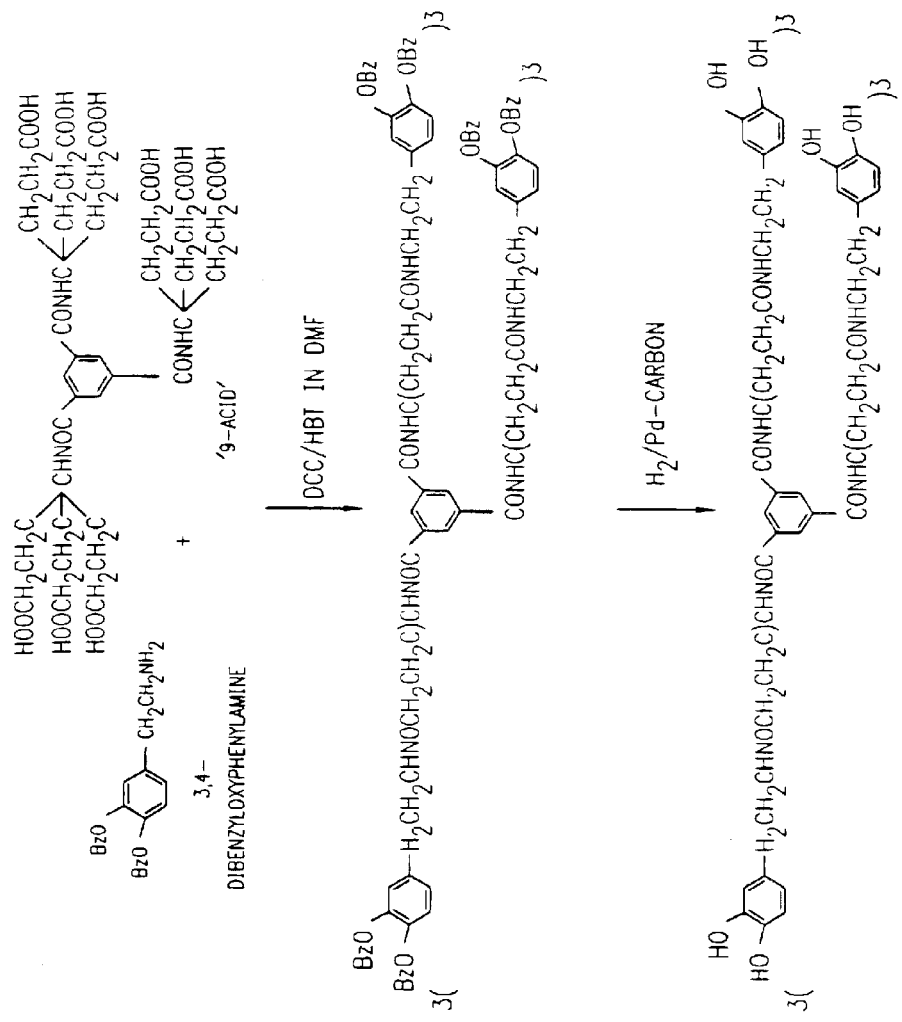

The NDGA polymerization procedures described in Example 1 were applied to gelatin (denatured collagen) gels to determine the feasibility of developing tissue scaffolds with beneficial compressive properties. Disks of 5% gelatin gel measuring 3 mm in diameter by 5 mm high were treated with NDGA as described in Example 1 for extruded collagen fibers. Untreated and NDGA-treated discs were tested in unconfined compression to failure with uniaxial tests. The NDGA-treated disks were over 150-fold stiffer than untreated disks, and the load at failure was over 55-fold greater for NDGA-treated gels when compared to the untreated disks (FIGS. 51 and 52). These results establish that (1) denatured collagen can be used in place of tendon collagen, and (2) collagen/polymer compositions can be formed into any shape, such as a disk, exhibiting increased physical strength, e.g., in stiffness or fracture load.

Example 12

Synthesis of Catechol-Containing Compounds

The "4-arm" molecule described in Example 8 was synthesized as follows. Four equivalents of 3,4-dibenzyloxyphenylamine was added to one equivalent of the quadravalent acid in dimethylformamide containing four equivalents of dicyclohexyl carbodiimide (DCC) and four equivalents of 4-hydroxybenzotriazole (HBT). The reaction mixture was stirred at room temperature overnight. The reduced DCC was then filtered, and the dimethylformamide (DMF) was removed under reduced pressure. The resulting product was then taken up in dichloromethane (DCM) and washed 3× with water, 10% HCl (cold), and saturated sodium carbonate. The DCM was then dried with magnesium sulfate and removed under vacuum. The yield this procedure was 50–70%. The resulting solid from the above procedure was then dissolved in ethanol or ethanol/ethyl acetate and placed in a glass bomb with 0.5 g of Pd-carbon. The bomb was then flushed with hydrogen gas (50 psi) and allowed to react overnight at room temperature. The solvent was finally filtered and the resulting liquid was stripped down to yield the final catechol-containing product. The yield for the final product was about 90%. This and other compounds were prepared as shown in FIGS. 53–56.

In general, the synthetic scheme was to incorporate dopamine molecules via the amine into various precursor polymers, thereby forming covalently attached end groups with free catechols. However, to couple catechols with the reactive carboxyl groups in the precursors, the hydroxyl groups of the catechol required protection during the coupling reaction. The hydroxyl groups were protected by 3,4-dibenzyloxyphenylamine via an ether linkage. The appropriate molar equivalents of the protected catechol were added to one equivalent of one of the following precursors in DMF: 5-nitroisophthalic acid (2-arm); 1,3,5-benzenetricarboxylic acid (3-arm); "4-acid" (4-arm), or "9-acid" (9-arm). The protected catechol and precursor in DMF were mixed with the proper molar equivalents of dicyclohexylcarbodiimide and 4-hydroxylbenzotriazole. Following coupling of the protected catechol with the precursor, the catechol was deprotected by removing the benzyl groups, as described for the 4-arm above.

The purity and structure of the resulting compounds were then examined. To assess purity, the samples were analyzed by capillary zone electrophoresis, using a C-1 8 reversed phase HPLC column fitted with a pulsed amperometric detector for absorbance at 280 nm, the absorbance maximum for DOPA. Structural analysis was performed by proton and carbon NMR and matrix-assisted laser desorption mass spectroscopy. The results for the 3-arm molecule is described below, though the purity was similar for any of the other compounds.

Figure 57:
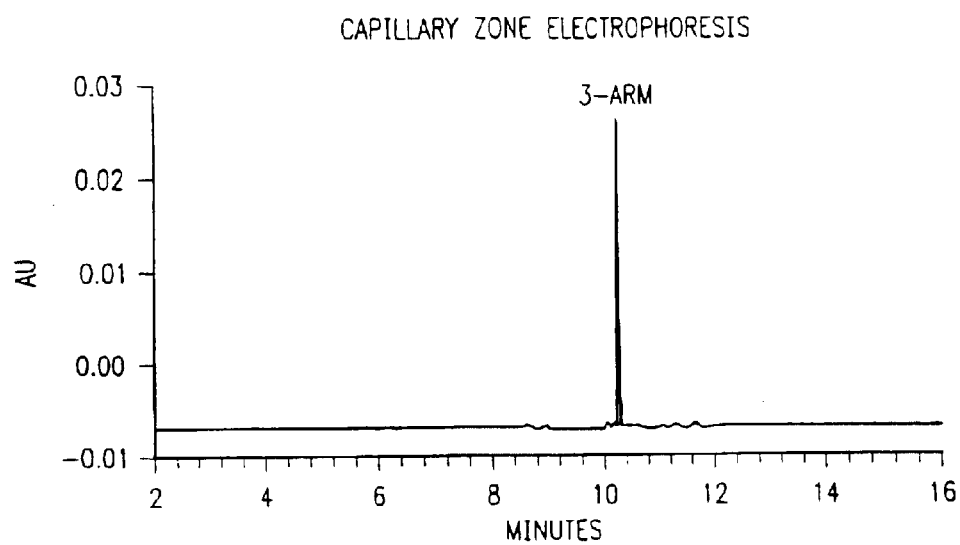
FIG. 57 is a trace of elutions from capillary zone electrophoresis for the 3-arm molecule described in the Examples.
Figure 58:
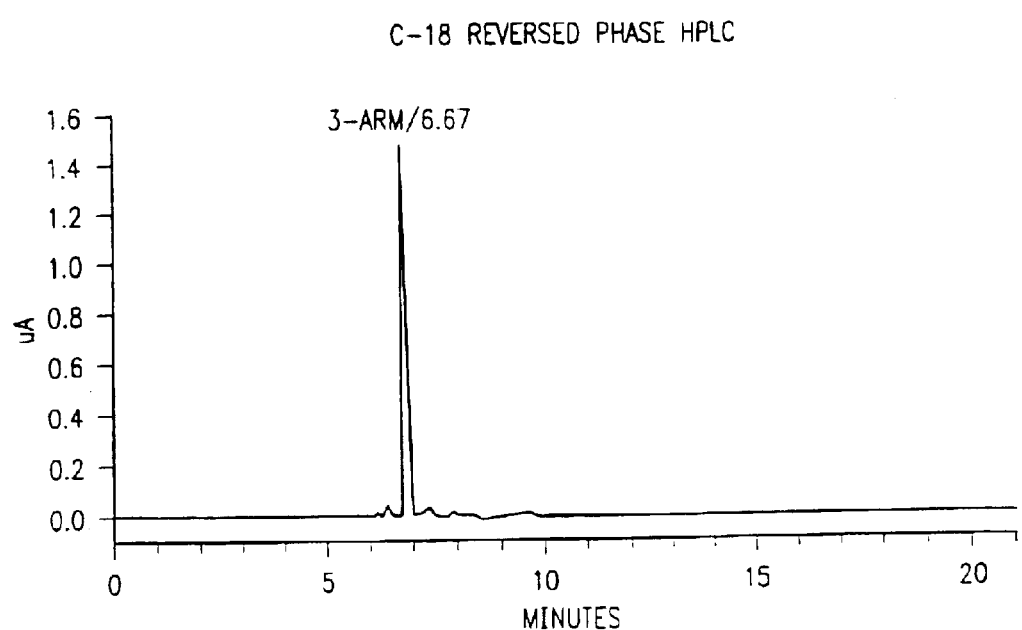
FIG. 58 is a trace of elutions from C-18 reversed phase HPLC for the 3-arm molecule described in the Examples.

For the 3-arm molecule, capillary zone electrophoresis indicated a single, major 280 nm absorbing peak migrating at 10.35 minutes (FIG. 57). Reversed phase HPLC indicated a single major peak when the elutions were monitored by pulsed amperometry (FIG. 58). $C^{13}$ NMR indicated that the molecule had the predicted carbon structure and the preparation was free of contaminants (FIG. 59). Proton NMR showed that the molecule had the predicted hydrogen structure (FIG. 60). Mass spectrometry indicated that the molecule had the molecular weight predicted from the amino acid sequence.

Example 13

In Vivo Biocompatibility of Collagen/Polymer Compositions

Materials and Methods

Materials: Source of materials are as described in Example 1. The rabbit anti-bovine type I collagen antibody was purchased from Pharmagen. Bovine collagen Type I fibrils were isolated and prepared as described in Example 1, with the addition of a sterilization under UV light for 16 hours (Example 4), followed by immersion in 70% ethanol. NDGA treatment was performed as described in Example 1.

In vivo model: For surgical placement of fibers, 3–4 kg mature female NZW rabbits were anesthetized with acepromazine and ketamine. A spinal tap needle was inserted through the skin and into the paravertebral musculature parallel with the vertebral column. The plunger was removed, a fiber was inserted in the needle and pushed with the plunger until resistance was encountered. The needle was slowly withdrawn while the plunger pushed the fiber out of the tip leaving it in the muscle. Eight fibers, each 2 cm long, were placed in each animal. For each time point three rabbits received control, uncross-linked fibers and three matched animals received NDGA cross-linked fibers. Animals were euthanized at 1, 2, 4 and 6 weeks following implantation. Serum was collected by cardiac bleed, and the muscle-fiber units were resected.

Histology: Muscle specimens containing the fibers were fixed in 10% neutral buffered formalin for 24 hours. The specimen was dehydrated through an ethanol series, and infiltrated with paraffin and sectioned at 10 mm thickness. Sections were stained with H & E or Alcian blue/van Giesen using standard methods.

Immunology: IgG from 10 ml of serum from each animal was isolated by chromatography on a HiTrap Protein G sepharose affinity column (Pharmacia) according to the manufacturer's instructions. Serum was mixed with an equal volume of the application buffer and applied to a 1 ml column. The column was washed with the application buffer, and the bound IgG was eluted with 5 ml glycine-HCl, pH 2.7, into a tube containing 400 ml of tris-HCl, pH 9. Western blots verified that the column eluant contained concentrated IgG from the rabbit serum.

Western blots: Western blots were used to probe serum for antibodies to molecular collagen. The purified type I collagen from which fibers were fabricated was electrophoresed on linear 4–20% gradient SDS/PAGE gels and Western blotted onto nitrocellulose using methods. Blots were exposed to a 1:100 dilution of the IgG preparations from each animal and developed with HRP-conjugated goat anti-rabbit antibody. Replicate blots were exposed to rabbit anti-type I collagen antibody (1:5000) as positive control for the blotting and blot development.

Dot blots: Dot blots were used to probe serum for antibodies to molecular and fibrillar collagen. Neutralized collagen (3 ng) was added to each well. For molecular collagen, the solution was added and directly attached to the membrane. For the fibrillar collagen, the apparatus was incubated at 37° C. for 1 hour, then a vacuum was applied to attach the fibrils to the membrane. IgG preparations from all rabbits were probed for antibodies according to standard dot blot methods. Positive controls were run in parallel.

Modified ELISA assays: A modified ELISA assay was utilized to determine whether antibodies were generated against the NDGA reaction products within the cross-linked fiber. This approach was necessary because the NDGA polymer was insoluble in chaotropic agents (Example 5). Two distinct protocols were used. In the first, 50 µl of the neutralized collagen solution (1.85 mg/ml) was aliquoted into each well, the plate incubated at 37° C. for 16 hours, and the fibrillar collagen dried on the plates. The collagen was hydrated in PBS, half of the wells being treated with NDGA as described above for the fibers. The plates were dried and the NDGA treatment was repeated. The modified ELISA assay was performed on the plates as follows. Plates were blocked with nonfat powdered dry milk in TBS for 16 hours. The plates were exposed to the purified IgG preparation from each animal or positive control (primary anti-type I collagen antibody) for 1 hour. Plates were washed and then exposed to the HRP conjugated goat anti-rabbit antibody for 30 minutes. Plates were then washed and 100 µl of the liquid substrate containing TMB was added to each well. The plates were developed for 30 minutes. Fifty microliters of reaction product was removed, the reaction stopped with 1 N $H_2SO_4$, and the absorbance measured at 450 nm in a microtiter plate reader. The second protocol used intact fibers as the antigen, and the assay was done essentially the same way as in the 96 well plates.

Results

Gross morphology: At the time of tissue collection for all post-surgical intervals, inflammation was not observed in any animal implanted with the control fibers or those that received the NDGA-treated fibers. At the early time points, both control and NDGA fibers were clearly visible in the resected tissue. At the later time points (4 and 6 weeks), it was difficult to locate the control fibers, and, in some cases, the control fibers could not be found. In contrast, the NDGA fibers were clearly visible and appeared intact at all sites in all animals, even after 6 weeks in situ.

Histology: Control fibers at one week following implantation were surrounded by a thick, multilayer capsule. The cells populating this capsule included eosinophils, lymphocytes, giant cells, monocytes, and fibroblasts. In contrast, the NDGA fiber was not encapsulated. However, inflammatory cells, including monocytes, were present in the tissue mass associated with the fiber.

After two weeks in situ, the control fiber remained surrounded by a thick capsule of inflammatory cells. The surface of the fiber was fragmented where cells appeared to be invading the material. The morphology of the fiber indicated that the invading cells were altering the integrity of the structure. The NDGA fiber after two weeks in situ was intact and unaffected by neighboring cells. A thin layer of fibroblasts surrounded the margins of the fiber. However, no degradation of the fiber was detected.

By three weeks after implantation, the mass of cells surrounding the control fiber had proliferated to form a thick capsule. The fiber was clearly being degraded by the associated cells. It was fragmented and marginalized. The NDGA fiber remained intact after four weeks. The margins of the fiber were distinct, and there were no incongruities within the fiber. The encapsulating cell layer had not proliferated and remained virtually unchanged.

After six weeks, the control fiber was surrounded by a well organized, multilayer capsule of inflammatory cells. In addition, the peripheral fibrous, endomysium had hypertrophied, further encapsulating the fiber. Cells had invaded the fiber and were actively degrading the material. Invading cells could be seen inside the fiber. In contrast, the cells surrounding the NDGA fiber had proliferated along the left edge, and the fiber was no longer encapsulated. The fiber was relatively intact (aside from fragmentation artifact due to sectioning), the margins remained distinct, and there were invading cells apparent.

Western blots: The IgG preparations isolated from all rabbits was probed for antibodies to collagen using Western blots. Antibodies to the α, β and γ chains of bovine type I collagen were not detected on Western blots using a 1:100 dilution in the IgG preparations from any rabbit that had received control or NDGA cross-linked fibers. Authentic anti-bovine type I collagen reacted on these blots at a 1:5000 dilution, verifying the efficiency of the blotting procedure for the Western blot and subsequent development with the HRP-conjugated secondary antibody.

Dot blots: To probe for antibodies to molecular collagen, the IgG preparations from all rabbits were subjected to dot blots which contained the neutralized molecular collagen. Antibodies to molecular collagen were not detected in the IgG preparations from any rabbit at an IgG dilution of 1:100, whereas the authentic anti-collagen antibody was detected at 1:5000 dilution.

In order to probe for antibodies to the NDGA polymer and its adducts, two configurations of the NDGA cross-linked collagen were used in a modified ELISA assay. To provide the greatest surface area for interaction with the IgG preparation, control and NDGA cross-linked collagen fibrils were bound as a thin flat surface on the bottom of the wells in a 96-well plate. Whole control and NDGA cross-linked fibers were used in the second configuration.

Figure 67A:
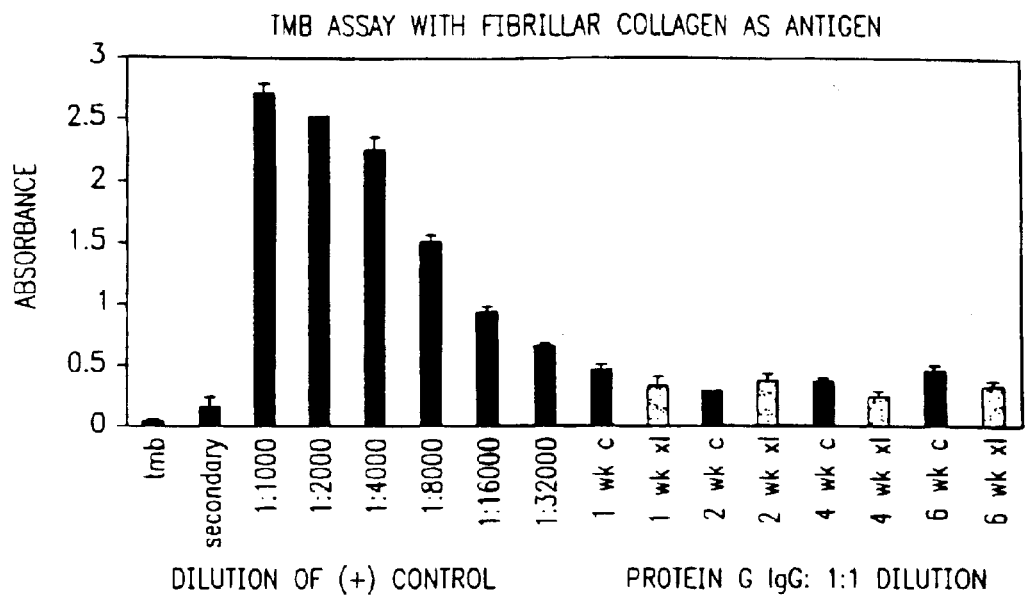
FIGS. 67A and 67B are bar graphs of ELISA samples versus absorbance for coated culture plates. Each value is a mean±S.D. of four replicate assays.
Figure 67B:
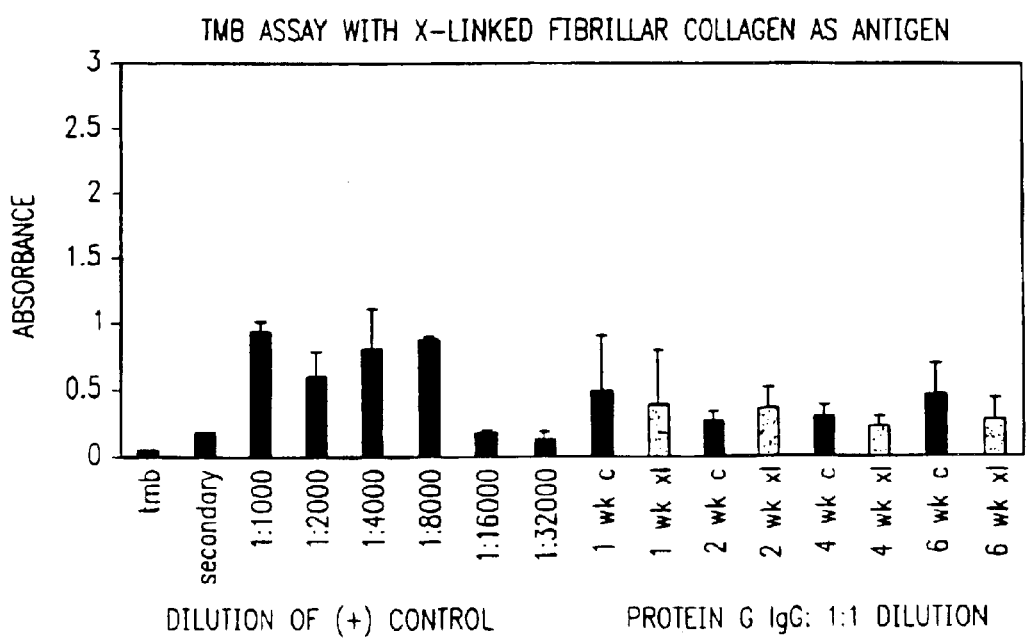

FIGS. 67A and 67B show the results from the 96-well plate protocol. As shown in FIG. 67A, the IgG preparations were probed for antibodies to fibrillar collagen as it exists in the fibers. The IgG preparations from each animal were used at a dilution of 1:1. The left two bars show the reaction with TMB only and the reaction without the secondary antibody. The positive control bars show the reactivity with an authentic rabbit anti-bovine type I collagen antibody at dilutions ranging from 1:1000 to 1:32,000. The positive control immunoreactivity was reliably detectable at the highest dilution, indicating that the modified ELISA assay was effective at detecting fibrillar collagen antibodies. Little immunoreactivity was detected in the IgG preparations from the rabbits that received control and NDGA cross-linked fibers. There was no statistical difference in the reactivity between the control and NDGA rabbits. These results indicate that none of the rabbits produced antibodies to fibrillar collagen.

The results of the ELISA assay using NDGA cross-linked collagen as the antigen are shown in FIG. 67B. The immunoreactivity of the authentic anti-bovine collagen antibody (positive control) was reduced by treating the collagen fiber with NDGA. Nonetheless, the positive reaction, though diminished, verified that the modified ELISA assay could detect antibodies if they were present in the IgG preparation. While there appeared to be slight immunoreactivity in the IgG preparations from the rabbits, there was no difference in the relative amount of reactivity in the IgG from rabbits that had received the control fibers versus those that received the NDGA fibers.

Figure 69:
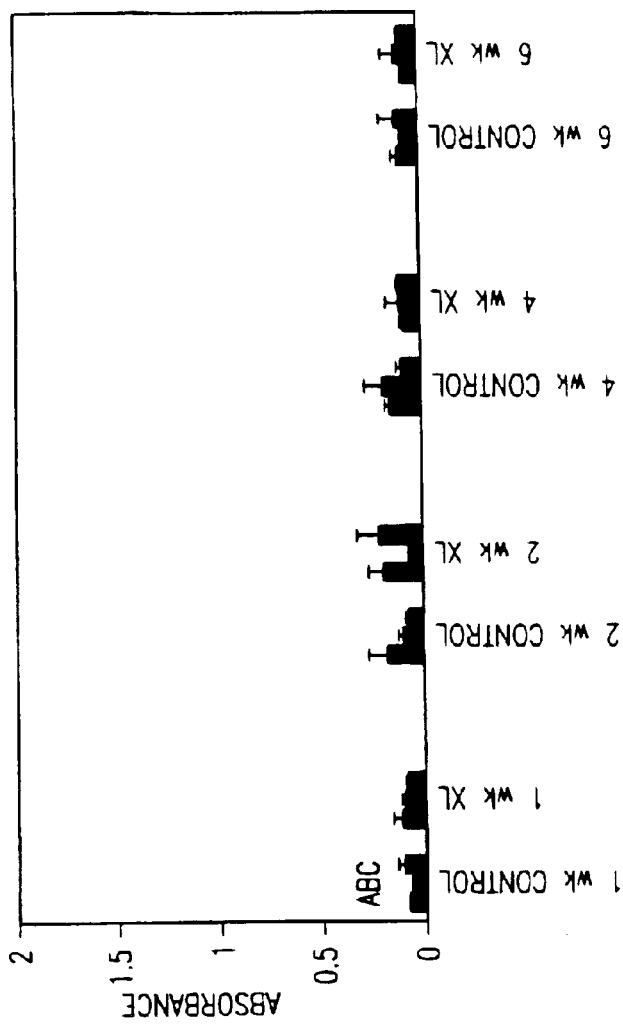
FIG. 69 is a bar graph of ELISA samples from each of three experimental rabbits at various time points for various treatments. Each trio of bars represent, from left to right, the values for animals a, b, and c, respectively. Each value is a mean±S.D. of four replicate assays.
Figure 68:
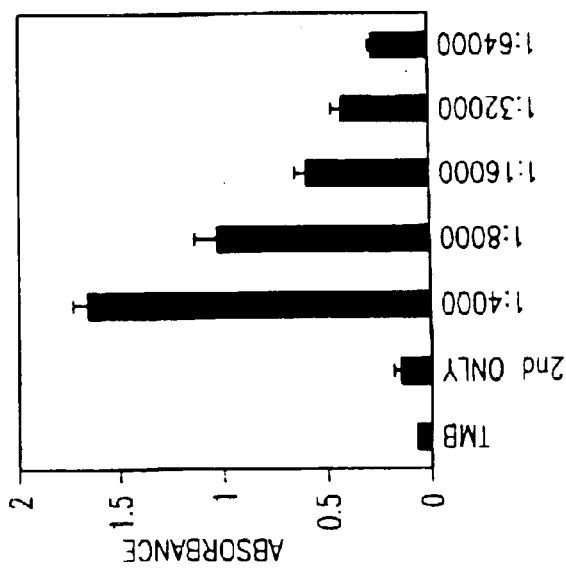
FIG. 68 is a bar graph of ELISA samples versus absorbance for whole fibers. Each value is a mean±S.D. of four replicate assays.

The second modified ELISA protocol used whole, intact fibers for the antigen. IgG from control rabbits was probed using control fibers. IgG from the rabbits with implanted NDGA fibers was probed with NDGA cross-linked fibers. The positive control antibody showed immunoreactivity with control fibers at dilutions of 1:64,000, verifying the reliability of this assay configuration (FIG. 68). The data from replicate assays from each animal and all time points are shown in FIG. 69. Little reactivity was detected in any rabbit at any time point. Two of the 2-week rabbits that received NDGA fibers showed somewhat higher immunoreactivity to the NDGA fiber. However, the difference was not statistically significant. The results indicate that the control rabbits did not produce antibodies to fibrillar collagen in the fibers, nor did the rabbits with NDGA fibers produce antibodies to the NDGA fiber.

In summary, this example confirms that collagen/polymer compositions described herein are biocompatible after implantation in an in vivo model.

Example 14

NDGA Treatment of Liquid Gelatin

Materials and Methods

Preparation: Application of the NDGA polymerization protocol to liquid gelatin at 37° C. was accomplished as follows. Gelatin was dissolved in phosphate buffered saline at elevated temperatures and then equilibrated to 37° C., NDGA was added, and the viscous liquid was incubated at 37° C. for 16 hours. Treatment of 5% liquid gelatin at 37° C. with NDGA resulted in the formation of a loose gel. This gel formed even when the solution was agitated continuously during incubation.

Results

To measure the viscosity of these gels, the following viscometric analysis that measured the force required to push a piston through a column of the gelatin gels was used. The gels were formed in tubes that were 8.3 mm in diameter and 1.5 cm high. A conical head 7.7 mm in diameter made of TEFLON® on the end of a piston was pushed through the gel with a motor driven piston. The force required to push the piston head through the gelatin was measured with a force transducer in line with the piston. The force and linear movement through the gel was continually recorded. After the TEFLON® head entered the gel, the force required to continue movement through the gel remained constant. This force is the force in grams in FIG. 70 The force was mathematically converted to viscosity by comparison with a standard curve produced from tests performed on viscometry standards in the same instrument. The visometry values are presented in centipoise in FIG. 71.

The gels were tested in a temperature controlled manifold fabricated in the laboratory that maintained the temperature at 37° C. during the test. A 5% gelatin gel that had been formed at 4° C. was tested at 22° C. to compare the viscosity of a bonafide gel to those of the gels formed at 37° C. from liquid gelatin.

Figure 70:
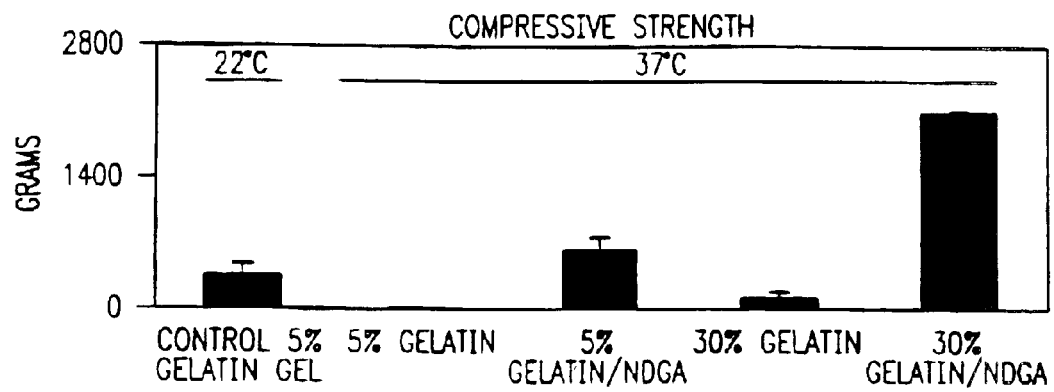
FIG. 70 is a bar graph of one viscomechanical property, compressive strength, of gelatin gels (5% and 30% concentrations), both non-treated and treated with NDGA at 37° C., and a control gelatin gel at 22° C.
Figure 71:
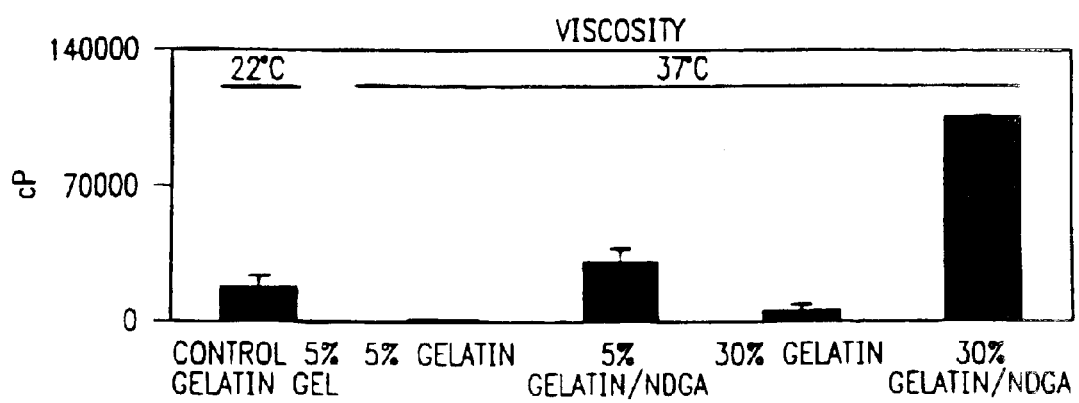
FIG. 71 is a bar graph of one viscomechanical property, viscosity, of gelatin gels (5% and 30% concentrations), both non-treated and treated with NDGA at 37° C., and a control gelatin gel at 22° C.

The viscosity of the 5% liquid gelatin could not be measured because it remained a liquid during the test and therefore was below the sensitivity of the instrument. We have assigned a value of <100 cP since that was the viscosity of the lowest viscosity standard used for calibration. The viscosity of the NDGA polymerized 5% liquid gelatin was 30,500 cP, nearly twice that of the 5% gelatin gel at 16,500 cP and much higher than the <100 cP for the untreated 5% liquid gelatin (FIG. 70). The viscosity of the 30% liquid gelatin treated with NDGA was 101,000 cP, compared to 4,800 cP of the 30% liquid gelatin. These results indicate that the NDGA will polymerize liquid gelatin at 37° C. forming a gel with mechanical properties comparable to gels formed at low temperatures. The NDGA polymerized liquid gelatin is adhesive as well.

Example 15

NDGA Treatment of Gelatin Foam

Materials and Methods

Preparation: Discs of gelatin foam produced by lyophilization of 5% gelatin hydrogels were treated with NDGA according to established protocols, including those described herein. GELFOAM was also treated with NDGA for comparison.

Results

These NDGA-gelatin foams did not melt at 37° C., indicating that the polymerization process stabilized the foams. The compressive properties of control and treated discs were then measured under unconfined, uniaxial loads at 37° C. The initial stiffness was computed to be between 10 and 40% strain. The ultimate stiffness was calculated from the steepest potion of the stress/strain curves, which occurred at strains above 40%. NDGA treatment increased the initial compressive stiffness of GELFOAM® by 6-fold (1.8 KPa untreated v. 12.0 KPa treated). The ultimate stiffness was increased 2-fold by NDGA (127 KPa untreated v. 255 KPa treated).

Example 16

Incorporation of Fibroblasts into Porous Fibers

Materials and Methods

Preparation: The porous fibers are prepared from the NDGA-treated fibers described above in Example 1. The NDGA-treated fibers are extruded through dialysis tubing containing purified collagen and frozen in one of the manners described below. The resulting fiber is lyophilized, then subjected to NDGA treatment as described above.

The porous collagen fibers are produced by lyophilization of collagen to form a foam, hence ice is the porogen. Porosity of materials formed by lyophilization depends on the freezing method. Three methods have been examined:

flash freezing by extruding the fibers into liquid nitrogen, freezing the fibers at −20° C. then extruding them, and hanging the extruded wet fibers and freezing at −20° C. All these fibers were then lyophilized. The resulting 'foams' varied in porosity. The flash frozen fiber foams had the smallest pores and resembled styrofoam. The frozen and extruded foams were more porous, but friable. The extruded and hung-frozen foams were more porous than the flash-frozen foams, but, in contrast to the frozen-extruded foams, appeared to retain structural integrity.

Results

The mechanical properties of these fiber foams were measured with tensile tests to failure. The flash-frozen fibers had the lowest tensile strength and stiffness (ca. 100 g/mm$^2$). The frozen-extruded fibers were somewhat stronger and stiffer (ca. 150 g/mm$^2$). The strongest and stiffest fibers were produced by the extruded than hung-frozen method (ca. 275 g/mm$^2$).

The hung-frozen fiber foam was used for cell loading experiments with calf endotenon fibroblasts. These cells were selected because they are responsible for producing the tendon matrix in vivo. The number of fibroblasts colonizing fiber-foams over 2 days in culture with an initial cell concentration of 200 cells/ml in 500 ml medium was measured to be approximately 12,500–15,000. The number of cells in the fiber reached a plateau by about 24 hours, suggesting that migration into the foam was essential for colonization. Colonization at early time points appears independent of cell concentration, indicating that fibroblast infiltration of the foams is a surface related phenomenon.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of this invention.

What is claimed is:

1. A composition comprising a polymeric material, a polymer that intercalates into the polymeric material, and at least one component selected from the group consisting of a cell, a cytokine and a therapeutic agent; the polymer comprising monomers, each monomer comprising a first quinone group, a second quinone group, and a linker of at least three carbon atoms between the first quinone group and the second quinone group, wherein no more than one peptide bond separates the first quinone group from the second quinone group.

2. The composition of claim 1, wherein the polymeric material is collagen.

3. The composition of claim 1, wherein the polymer is a homopolymer of the monomers, each monomer attached to at least one other monomer via a covalent bond formed between a ring carbon of a quinone group of one monomer and a ring carbon of a quinone group of another monomer.

4. The composition of claim 1, wherein the monomer further comprises a 2,3-dimethylbutylene group between the first quinone group and the second quinone group.

5. The composition of claim 1, wherein the monomer further comprises two additional quinone groups.

6. The composition of claim 2, wherein the collagen is selected from the group consisting of sea cucumber dermis collagen, bovine tendon collagen, and gelatin.

7. The composition of claim 2, wherein the collagen is in a form selected from the group consisting of microfibrils, fibrils, natural fibers, and synthetic fibers.

8. The composition of claim 1, wherein the component is a cell selected from the group consisting of fibroblasts, mesenchymal stem cells, chondrocytes, and molecularly engineered cells.

9. The composition of claim 1, wherein the component is a therapeutic agent selected from the group consisting of hydroxyapatite, growth factors, drugs that facilitate tissue growth, chemotactic factors, and extracellular matrix molecules.

10. The composition of claim 9, wherein the component is a growth factor selected from the group consisting of basic fibroblast growth factor, tumor growth factor beta, bone morphogenic protein, platelet-derived growth factor, and insulin-like growth factors.

11. The composition of claim 9, wherein the component is a chemotactic factor, and the chemotactic factor is fibronectin or hyaluronan.

12. The composition of claim 9, wherein the component is an extracellular matrix molecule selected from the group consisting of aggrecan, biglycan, and decorin.

13. The composition of claim 2, wherein the component is a cytokine or therapeutic agent.

14. A method of delivering a component to a mammal, the method comprising administering to the mammal the composition of claim 1, wherein the component is the component to be delivered.

15. A composition comprising a polymeric material, a polymer that intercalates into the polymeric material, and at least one component selected from the group consisting of a cell, a cytokine, and a therapeutic agent; the polymer comprising monomers, each monomer comprising a first quinone group, and a second reacted group, provided that the reacted group is not an amino or carbonyl group participating in a peptide bond within the monomer.

16. The composition of claim 15, wherein the polymer is a homopolymer of the monomers, each monomer attached to at least one other monomer via a covalent bond formed between a ring carbon of a quinone group of one monomer and a ring carbon of a quinone group of another monomer.

17. The composition of claim 15, wherein the polymeric material is collagen.

18. The composition of claim 15, wherein the component is a cell selected from the group consisting of fibroblasts, mesenchymal stem cells, chondrocytes, and molecularly engineered cells.

19. The composition of claim 15, wherein the component is a therapeutic agent selected from the group consisting of hydroxyapatite, growth factors, drugs that facilitate tissue growth, chemotactic factors, and extracellular matrix molecules.

20. The composition of claim 19, wherein the component is a growth factor selected from the group consisting of basic fibroblast growth factor, tumor growth factor beta, bone morphogenic protein, platelet-derived growth factor, and insulin-like growth factors.

21. The composition of claim 19, wherein the component is a chemotactic factor, and the chemotactic factor is fibronectin or hyaluronan.

22. The composition of claim 17, wherein the component is a cytokine or therapeutic agent.

23. A method of delivering a component to a mammal, the method comprising administering to the mammal the composition of claim 15, wherein the component is the component to be delivered.

24. A method of making a composition, the method comprising:

combining a polymeric material and a polymer that intercalates into the polymeric material, the polymer comprising monomers, each monomer comprising a catechol group, a reactive group, and a linker of at least three carbon atoms between the catechol group and the reactive group; and adding to the polymeric material and polymer at least one component selected from the group consisting of a cell, a cytokine, and a therapeutic agent.

25. The composition of claim 24, wherein the polymeric material is collagen.

26. The method of claim 24, wherein the reactive group is a catechol group.

27. A composition comprising: (a) a polymeric material; (b) a polymer made from one or more catechol-containing monomers; and (c) at least one component selected from the group consisting of a cell, a cytokine, and a therapeutic agent.

28. The composition of claim 27, wherein the catechol-containing monomer is a monomer comprising a first catechol group and a reactive group selected from the group consisting of a second catechol group and an aldehyde group.

29. The composition of claim 27, wherein the catechol-containing monomer is nordihydroguaiaretic acid, 2-Arm, 3-Arm, 4-Arm, or 9-Arm.

30. The composition of claim 27, wherein the component is a cell selected from the group consisting of fibroblasts, mesenchymal stem cells, chondrocytes, and molecularly engineered cells.

31. The composition of claim 27, wherein the component is a therapeutic agent selected from the group consisting of hydroxyapatite, growth factors, drugs that facilitate tissue growth, chemotactic factors, and extracellular matrix molecules.

32. The composition of claim 31, wherein the component is a growth factor selected from the group consisting of: basic fibroblast growth factor, tumor growth factor beta, bone morphogenic protein, platelet-derived growth factor, and insulin-like growth factors.

33. The composition of claim 31, wherein the component is a chemotactic factor, and the chemotactic factor is fibronectin or hyaluronan.

34. The composition of claim 27, wherein the polymeric material is collagen, the catechol containing monomer is nordihydroguaiaretic acid, and the component is a cytokine or therapeutic agent.

35. A method of delivering a component to a mammal, the method comprising administering to the mammal the composition of claim 27, wherein the component is the component to be delivered.

36. A composition comprising: (a) a collagen fiber comprising intercalated therein a catechol-containing monomer; (b) a collagen foam comprising a catechol-containing monomer; and (c) at least one component selected from the group consisting of a cell, cytokine, and a therapeutic agent.

37. The composition of claim 36, wherein the fiber is surrounded by the foam.

38. The composition of claim 36, wherein the foam comprises pores of a size to allow infiltration of cells into the foam.

39. The composition of claim 36, wherein the cells are fibroblasts, mesenchymal stem cells, chondrocytes, or molecularly engineered cells.

40. The composition of claim 36, wherein the catechol-containing monomer is nordihydroguaiaretic acid, 2-Arm, 3-Arm, 4-Arm, or 9-Arm.

41. A method of engineering tissue comprising use of the composition of claim 36.

42. The method of claim 41, wherein the tissue is tendon.

43. A method of making a composition of claim 36, comprising combining (a) a collagen fiber comprising intercalated therein a catechol-containing monomer and (b) a collagen foam comprising a catechol-containing monomer.

44. The method of claim 43, wherein the collagen fiber is combined with collagen foam, and the resulting composition is treated with a catechol-containing monomer.

45. The composition of claim 36, wherein the component is a therapeutic agent selected from the group consisting of hydroxyapatite, growth factors, drugs that facilitate tissue growth, chemotactic factors, and extracellular matrix molecules.

46. The composition of claim 45, wherein the component is a growth factor selected from the group consisting of basic fibroblast growth factor, tumor growth factor beta, bone morphogenic protein, platelet-derived growth factor, and insulin-like growth factors.

47. The composition of claim 36, wherein the component is a chemotactic factor, and the chemotactic factor is fibronectin or hyaluronan.

48. A method of delivering a component to a mammal, the method comprising administering to the mammal the composition of claim 36, wherein the component is the component to be delivered.

49. The composition of claim 36, wherein the catechol containing monomer is nordihydroguaiaretic acid and the component is a cytokine or therapeutic agent.

* * * * *